(12) United States Patent
Mizuno et al.

(10) Patent No.: US 9,961,233 B2
(45) Date of Patent: May 1, 2018

(54) INFORMATION PROCESSING APPARATUS, METHOD FOR CONTROLLING INFORMATION PROCESSING APPARATUS, AND STORAGE MEDIUM TO DISPLAY AN INITIAL SCREEN

(71) Applicant: CANON KABUSHIKI KAISHA, Tokyo (JP)

(72) Inventors: Takafumi Mizuno, Higashimurayama (JP); Yoko Takenaka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/125,374

(22) PCT Filed: Mar. 12, 2015

(86) PCT No.: PCT/JP2015/001370
§ 371 (c)(1),
(2) Date: Sep. 12, 2016

(87) PCT Pub. No.: WO2015/136940
PCT Pub. Date: Sep. 17, 2015

(65) Prior Publication Data
US 2017/0094121 A1 Mar. 30, 2017

(30) Foreign Application Priority Data

Mar. 14, 2014 (JP) .................. 2014-051884
May 21, 2014 (JP) .................. 2014-105286

(51) Int. Cl.
*H04N 1/44* (2006.01)
*G06F 3/0482* (2013.01)
(Continued)

(52) U.S. Cl.
CPC ......... *H04N 1/4433* (2013.01); *G06F 3/0482* (2013.01); *G06F 3/0484* (2013.01);
(Continued)

(58) Field of Classification Search
CPC ............ H04N 1/4433; H04N 1/00514; H04N 2201/0094; G06F 3/0484; G06F 3/04847; G06F 3/0482
See application file for complete search history.

(56) References Cited

U.S. PATENT DOCUMENTS 7,173,730 B1 * 2/2007 Suzuki ............... H04N 1/00209
358/1.15
2002/0126322 A1 9/2002 Kadowaki
(Continued)

FOREIGN PATENT DOCUMENTS

CN 101930347 A 12/2010
CN 103516944 A 1/2014
(Continued)

*Primary Examiner* — Ming Hon
(74) *Attorney, Agent, or Firm* — Canon U.S.A., Inc. IP Division

(57) ABSTRACT

An information processing apparatus includes first, second, and third setting units, and a display unit. The first setting unit sets a common initial screen according to an operation performed by a user having an administrator authority. The second setting unit sets an initial screen for each user according to an operation performed by each user. The third setting unit sets whether to display the initial screen for each user, according to an operation performed by the administrator authority user. Where the initial screen for each user is to be displayed, the display unit displays the initial screen set by the second setting unit when the information processing apparatus starts to be used. Where the initial screen for each user is not to be displayed, the display unit displays the initial screen set by the first setting unit when the information processing apparatus starts to be used.

24 Claims, 32 Drawing Sheets

(51) Int. Cl.
  *H04N 1/00* (2006.01)
  *G06F 3/0484* (2013.01)

(52) U.S. Cl.
  CPC ..... *G06F 3/04847* (2013.01); *H04N 1/00514* (2013.01); *H04N 2201/0094* (2013.01)

(56) References Cited

U.S. PATENT DOCUMENTS

| | | | | |
|---|---|---|---|---|
| 2006/0232810 | A1* | 10/2006 | Kishino | G06F 3/1204 358/1.13 |
| 2006/0268306 | A1* | 11/2006 | Kojima | H04N 1/00233 358/1.13 |
| 2008/0304092 | A1 | 12/2008 | Ebuchi | |
| 2009/0128843 | A1* | 5/2009 | Lao | G06F 3/1205 358/1.15 |
| 2009/0157906 | A1* | 6/2009 | Yanagi | G06F 3/1205 710/5 |
| 2009/0310180 | A1* | 12/2009 | Uchida | H04N 1/0035 358/1.15 |
| 2010/0251253 | A1* | 9/2010 | Pike | G06F 9/5083 718/104 |
| 2010/0333183 | A1* | 12/2010 | Yago | G06F 3/1222 726/5 |
| 2011/0267636 | A1 | 11/2011 | Kamasuka | |
| 2012/0081737 | A1* | 4/2012 | Pandit | G06F 3/1205 358/1.15 |
| 2013/0208303 | A1* | 8/2013 | Uchida | G06F 3/0482 358/1.15 |
| 2015/0215481 | A1* | 7/2015 | Faust | H04N 1/00225 358/1.13 |

FOREIGN PATENT DOCUMENTS

| | | |
|---|---|---|
| JP | 2005175530 A | 6/2005 |
| JP | 2007-124068 A | 5/2007 |
| JP | 2008219950 A | 9/2008 |
| JP | 2011-008378 A | 1/2011 |
| JP | 2011-123824 A | 6/2011 |
| JP | 2011-233031 A | 11/2011 |

\* cited by examiner

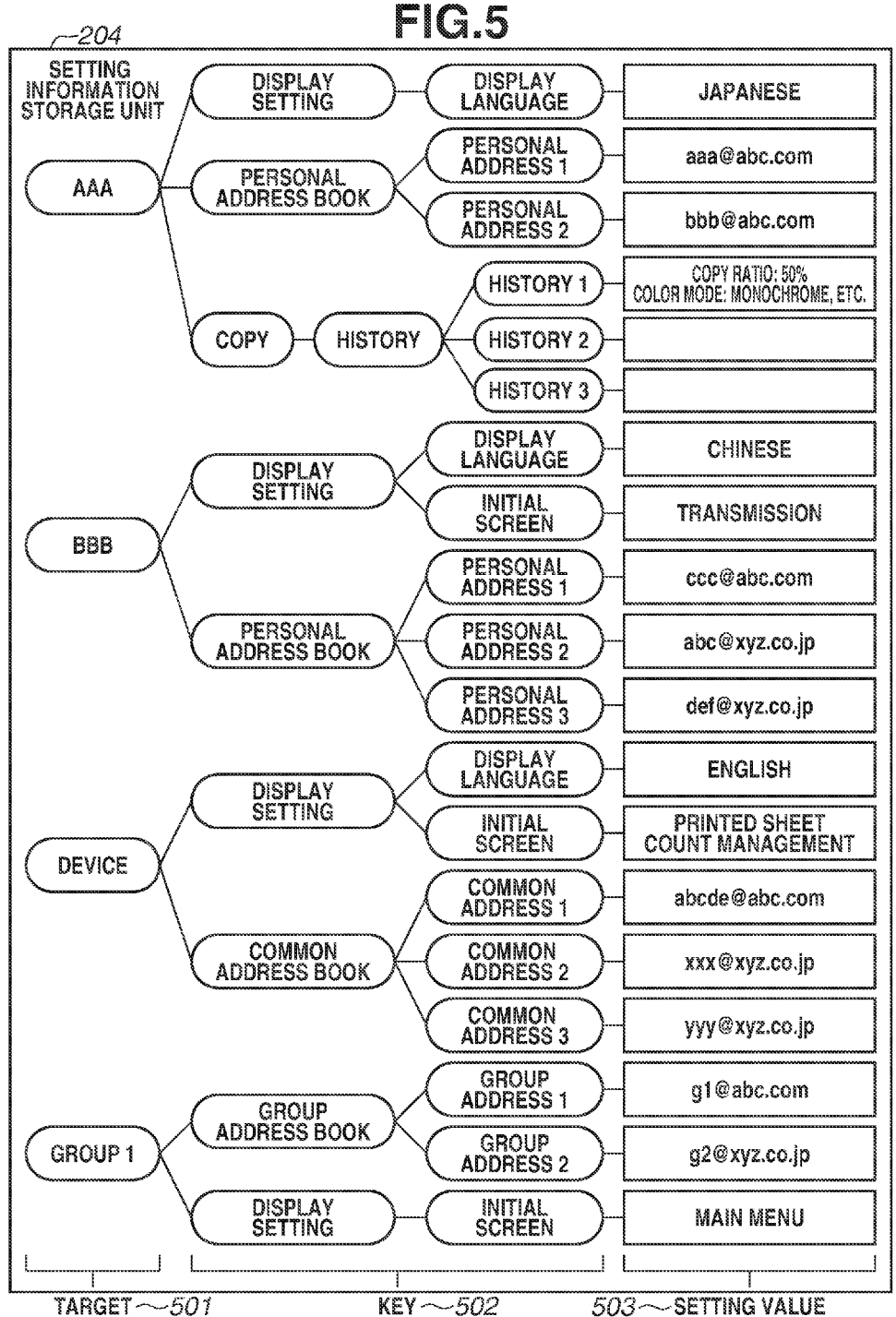

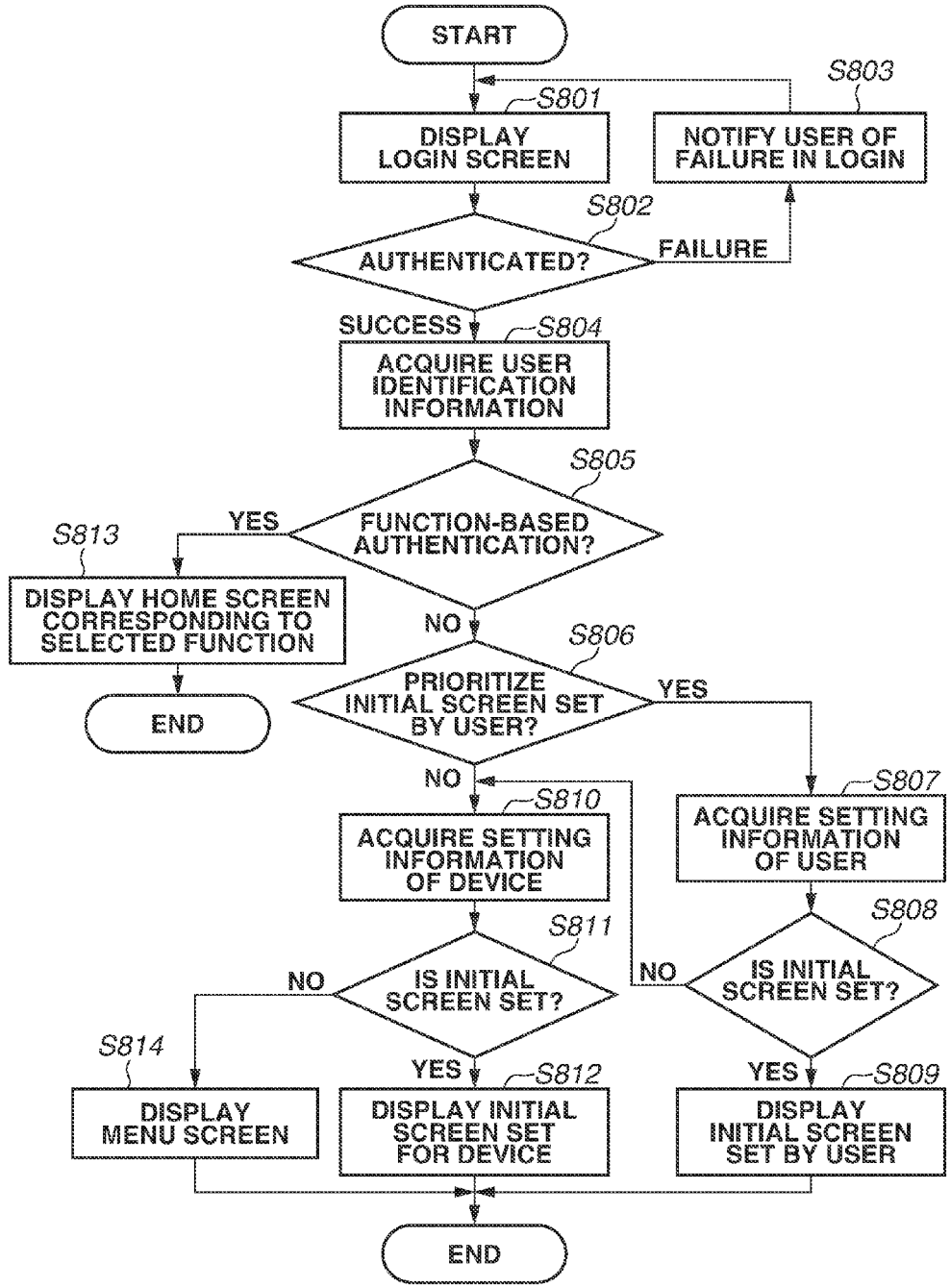

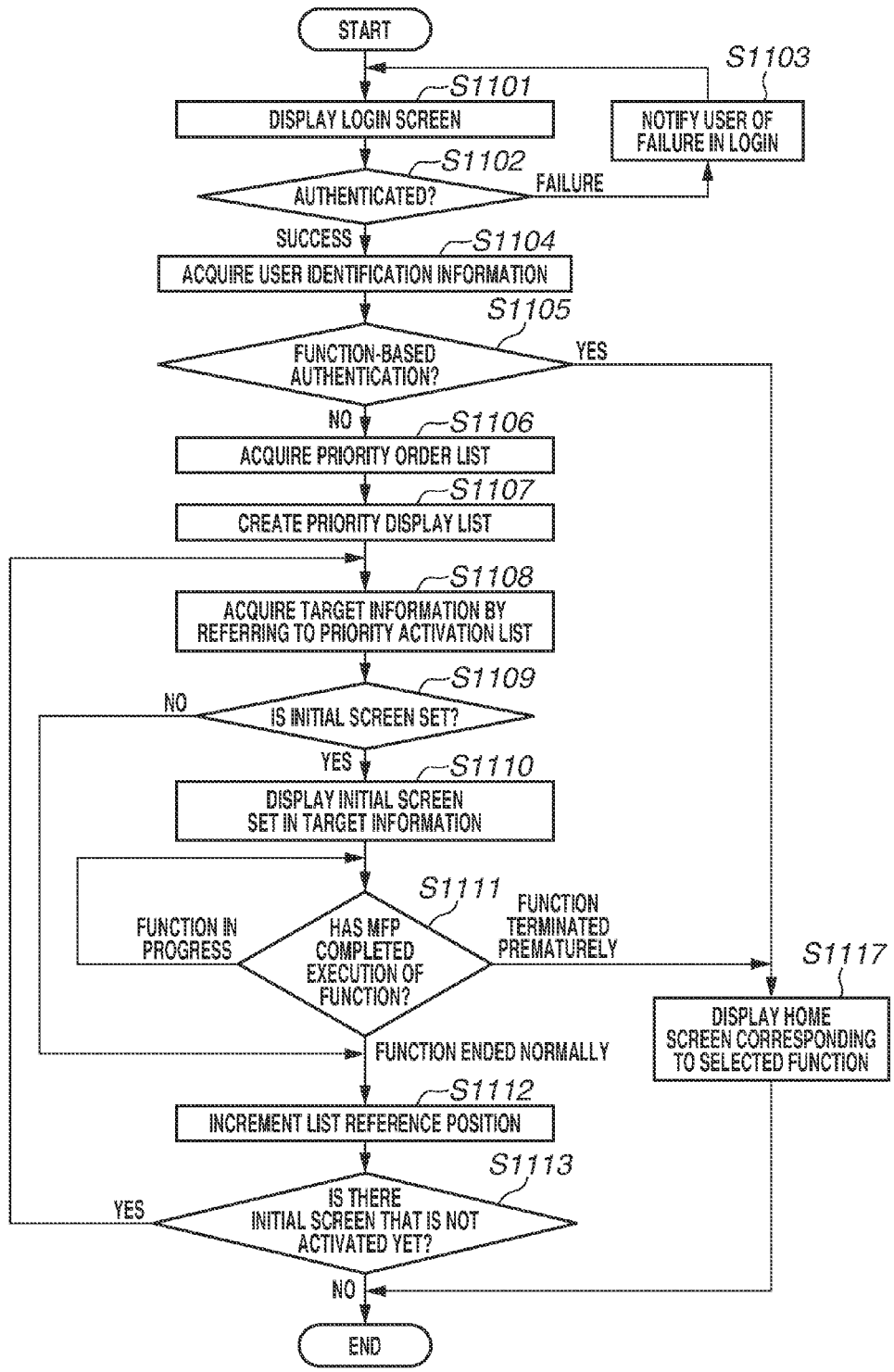

FIG.12A

| | MANAGEMENT SETTINGS | COPY | PRINT |
|---|---|---|---|

<PRIORITY ORDER SETTING OF INITIAL SCREEN>

| PRIORITY ORDER | TARGET |
|---|---|
| 1 | GROUP 1 |
| 2 | DEVICE |
| 3 | GROUP 3 |
| 4 | GROUP 5 |
| 5 | USER |
| 6 | GROUP 4 |
| 7 | GROUP 2 |

~1210
⬆ ~1211
⬇ ~1212

[ CANCEL ]  [ OK ]

| PRIORITY ORDER | TARGET |
|---|---|
| 1 | GROUP 1 |
| 2 | DEVICE |
| 5 | USER |
| 6 | GROUP 4 |

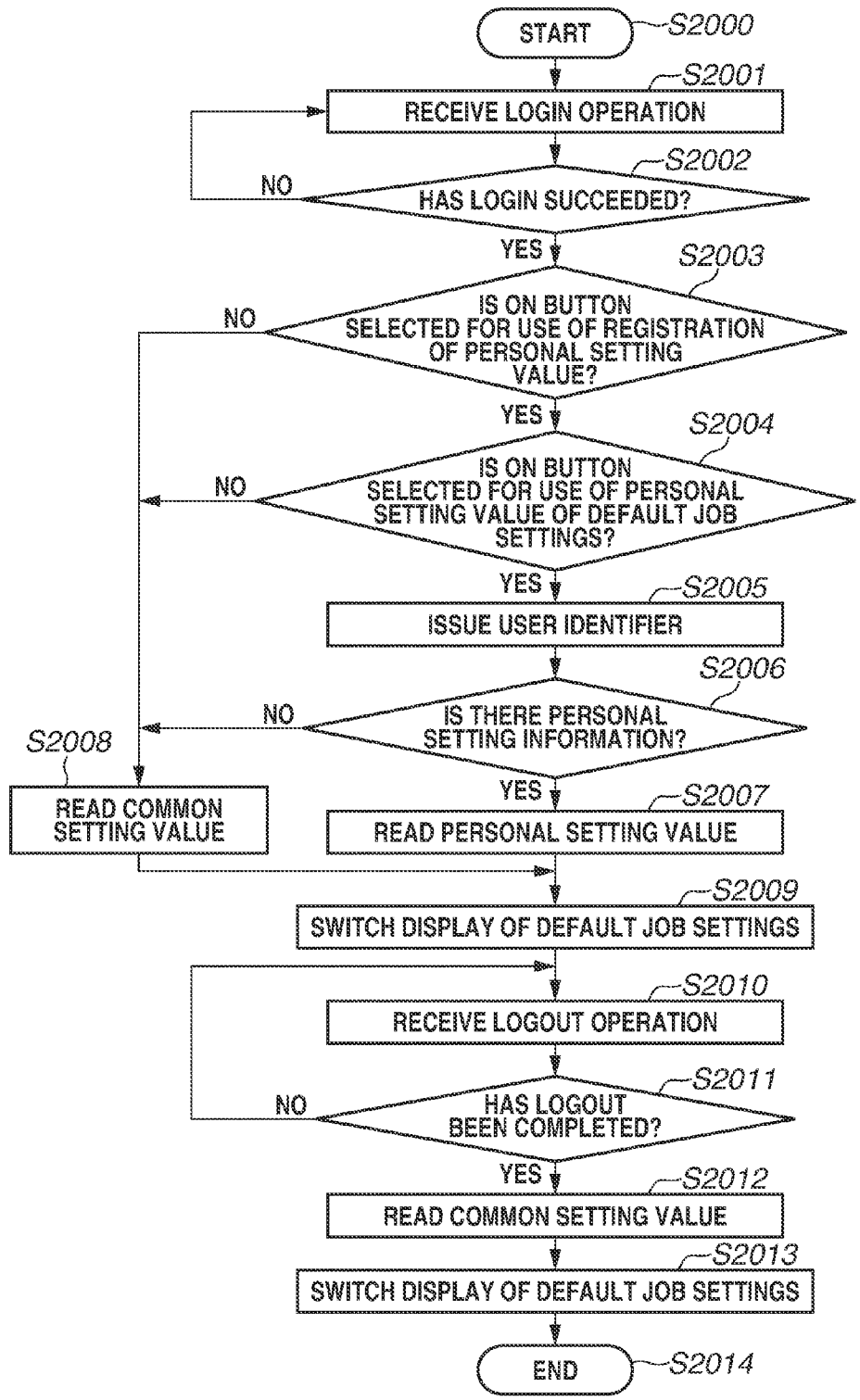

INFORMATION PROCESSING APPARATUS, METHOD FOR CONTROLLING INFORMATION PROCESSING APPARATUS, AND STORAGE MEDIUM TO DISPLAY AN INITIAL SCREEN

TECHNICAL FIELD

The present invention relates to an information processing apparatus, a method for controlling the information processing apparatus, and a storage medium.

BACKGROUND ART

There have been known information processing apparatuses that have a basic function such as a print function, a copy function, a function of transmitting image data, and a function of storing image data. Alternatively, there have been also known information processing apparatuses that have a basic function such as calculation processing and image processing, like a personal computer (PC). Some of such information processing apparatuses are configured to allow a new function to be added later, in addition to the above-described basic function. Further, when a user starts to use the above-described information processing apparatus, the information processing apparatuses display a main menu screen for the user selecting the above-described basic function and the new function added later, on a display unit of the information processing apparatus, thereby receiving an operation from the user.

Further, there have been known information processing apparatuses that allow an administrator to preset a screen to be displayed when the information processing apparatus starts to be used, as an initial screen of the information processing apparatus (PTL 1). PTL 1 discusses selecting either of the copy function and the function of transmitting image data, and setting a screen therefor as the initial screen to be displayed when the information processing apparatus starts to be used. Once the initial screen is set, the set initial screen is displayed when the information processing apparatus starts to be used.

Further, providing an information processing apparatus with a user authentication function has been known. Such an information processing apparatus requests a user to input authentication information such as a user identification (ID) and a password when the user starts to use the information processing apparatus, and authenticates the user based on the input authentication information. If the above-described initial screen is set, the initial screen is displayed in response to a success in the user authentication.

PTL 1 discusses setting, as the initial screen, a screen to be displayed when the information processing apparatus starts to be used. In addition to the setting of the initial screen, providing the information processing apparatus with a customization function that allows an initial setting value to be set for each user is conceivable. The customization function is a function of setting a personal setting value for each user, and thereby allowing the information processing apparatus to change an initial value and an operation thereof for each user according to the personal setting value.

A possible function as one type of the customization function is to set, for each user, an initial screen to be displayed when the information processing apparatus starts to be used. This function allows a user to preset a screen corresponding to a function that the user frequently uses as the initial screen to thereby cause the preset initial screen to be displayed when the user starts to use the information processing apparatus.

On the other hand, as a demand from the administrator, there is such a demand that the administrator wants to cause the information processing apparatus to always display an initial screen set as common information of the information processing apparatus. For example, there is such a demand that the administrator wants to cause the information processing apparatus to display, as the initial screen, a screen corresponding to a function of notifying a user of the number of printed sheets and the number of copied sheets, regardless of which user uses the information processing apparatus.

In this manner, the customization function involves such a problem that, even in a case where the administrator sets an initial screen so as to cause the information processing apparatus to always display the set initial screen when the information processing apparatus starts to be used, if priority is placed on the initial screen set for each user, the initial screen intended by the administrator is not displayed. Nevertheless, configuring the information processing apparatus so as to always display the initial screen set by the administrator results in a failure to take advantage of the convenience of the customization function, leading to deterioration in the usability.

CITATION LIST

Patent Literature

PTL 1: Japanese Patent Application Laid-Open No. 2007-124068

SUMMARY OF INVENTION

Solution to Problem

The present invention is directed to a mechanism for appropriately determining an initial screen to be displayed when an information processing apparatus starts to be used.

According to an aspect of the present invention, an information processing apparatus includes a first setting unit configured to set a common initial screen according to an operation performed by a user having an administrator authority, a second setting unit configured to set an initial screen for each user according to an operation performed by each user, a third setting unit configured to set whether to display the initial screen for each user, according to an operation performed by the user having the administrator authority, and a display unit configured to, in a case where it is set by the third setting unit that the initial screen for each user is to be displayed, display the initial screen set by the second setting unit when the information processing apparatus starts to be used, and in a case where it is set by the third setting unit that the initial screen for each user is not to be displayed, display the initial screen set by the first setting unit when the information processing apparatus starts to be used.

Further features of the present invention will become apparent from the following description of exemplary embodiments with reference to the attached drawings.

BRIEF DESCRIPTION OF DRAWINGS

FIG. 5 illustrates a data model of a setting information storage unit of the MFP 101 according to the first to third exemplary embodiments.

FIG. 8 is a flowchart illustrating a login operation of the MFP 101 according to the first to third exemplary embodiments.

FIG. 11 is a flowchart illustrating a login operation of the MFP 101 according to the first to third exemplary embodiments.

FIG. 12A illustrates an operation screen of the MFP 101 according to the first to third exemplary embodiments.

FIG. 12B illustrates a data model of a priority display list of the MFP 101 according to the first to third exemplary embodiments.

FIG. 31 is a flowchart illustrating an example of default job setting switching processing according to the fourth to sixth exemplary embodiments.

DESCRIPTION OF EMBODIMENTS

Various exemplary embodiments, features, and aspects of the invention will be described in detail below with reference to the drawings. It is to be understood that the following exemplary embodiments are not intended to limit the scope of the invention set forth in the appended claims and that all combinations of features described in the exemplary embodiments are not necessarily essential to the technical solution provided by the present invention.

First Exemplary Embodiment

Figure 1:
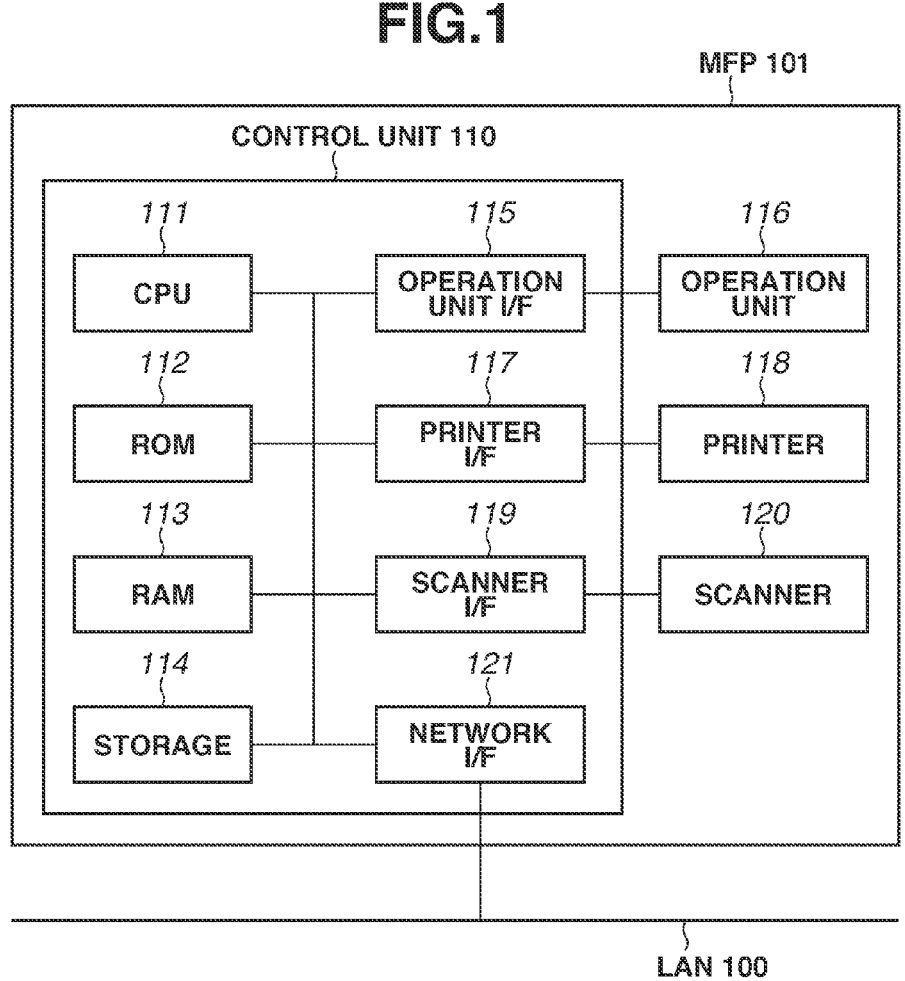
FIG. 1 is a block diagram illustrating a hardware configuration of a multifunction peripheral (MFP) 101 according to first to third exemplary embodiments.

First, a first exemplary embodiment of the present invention will be described. FIG. 1 is a block diagram illustrating a hardware configuration of a multifunction peripheral (MFP) 101 according to the first exemplary embodiment. The MFP 101 is an example of an information processing apparatus. The present exemplary embodiment will be described with use of the MFP as an example of the information processing apparatus, but the information processing apparatus does not necessarily have to be the MFP, as long as the information processing apparatus is an information processing apparatus having the user authentication function.

A control unit 110 including a central processing unit (CPU) 111 controls an operation of the entire MFP 101. The CPU 111 performs various kinds of control such as reading control and print control by reading a control program stored in a read-only memory (ROM) 112 or a storage 114. A random access memory (RAM) 113 is a main storage memory of the CPU 111, and is used as a work area and a temporary storage area for loading various kinds of programs stored in the storage 114. The storage 114 stores image data, the various kinds of programs, and various kinds of setting information. Further, in the present exemplary embodiment, an auxiliary storage device such as a hard disk drive (HDD) is assumed to be used as the storage 114, but the storage 114 may be a flash disk such as a solid state drive (SSD).

The MFP 101 is assumed to be configured in such a manner that the single CPU 111 performs, with use of a single memory (the RAM 113), respective processes illustrated in flowcharts to be described below, but may be configured in another manner. For example, the MFP 101 can be configured in such a manner that a plurality of CPUs and a plurality of RAMs, ROMs, and storages cooperate to perform the respective processes illustrated in the flowcharts to be described below. Further, the MFP 101 may be configured to perform a part of the processes with use of a hardware circuit.

An operation unit interface (I/F) 115 connects an operation unit 116 and the control unit 110. The operation unit 116 includes a liquid crystal display unit having a touch panel, a keyboard, and the like. The operation unit 116 functions as a reception unit that receives an instruction from a user, and a display unit that displays information to the user.

A printer I/F 117 connects a printer 118 and the control unit 110. Image data to be printed by the printer 118 is transferred from the control unit 110 to the printer 118 via the printer I/F 117, and an image based on the image data is printed onto a sheet such as paper.

A scanner I/F 119 connects a scanner 120 and the control unit 110. The scanner 120 reads a document set on the MFP 101 to generate image data (an image file), and transfers the generated image data to the storage 114 of the control unit 110 via the scanner I/F 119. The MFP 101 can print the image data generated by the scanner 120 by transferring the image data to the printer 118 (a copy function). Further, the MFP 101 can also transmit the image data generated by the scanner 120, with use of various kinds of transmission protocols (a transmission function). Further, the MFP 101 can also store the image data generated by the scanner 120 into a storage area readable and writeable by the MFP 101 (a storage function).

A network I/F 121 connects the control unit 110 (the MFP 101) to a local area network (LAN) 100. The network I/F 121 transmits image data and information to an external apparatus (a mail server, a file server, a PC, or the like) on the LAN 100, and receives information from the external apparatus on the LAN 100. Further, the MFP 101 includes a not-illustrated modem, and can also perform fax transmission or reception via a public switched telephone network (PSTN) (a fax function).

Figure 2:
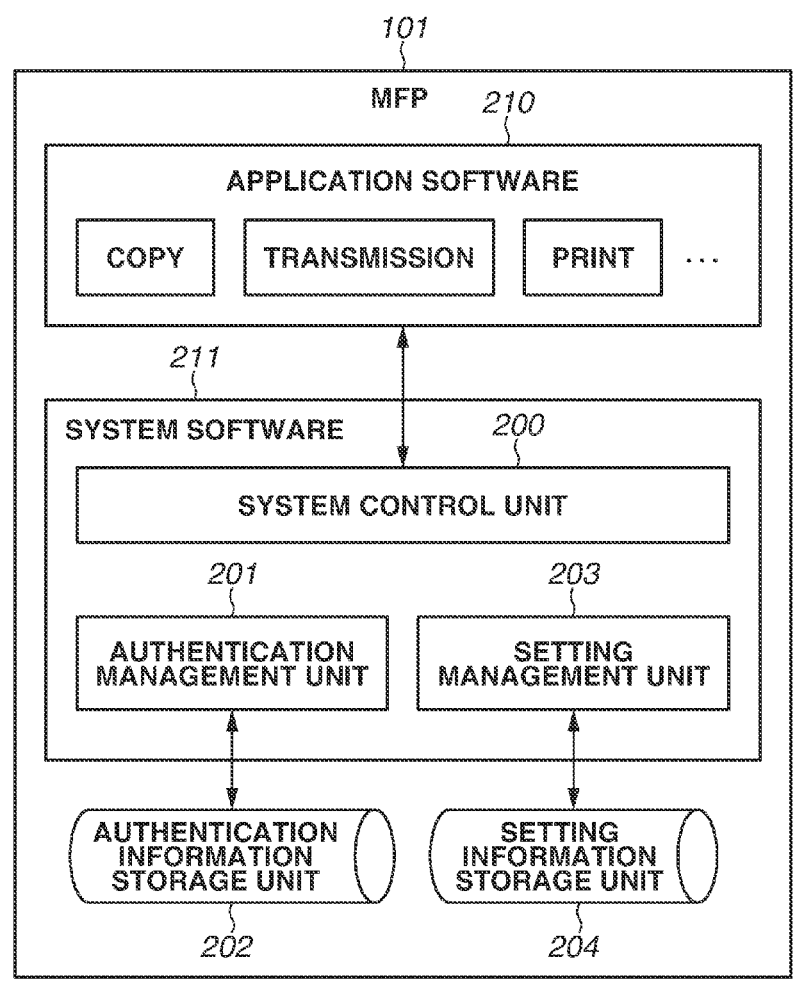
FIG. 2 is a block diagram illustrating a software configuration of the MFP 101 according to the first to third exemplary embodiments.

FIG. 2 is a block diagram illustrating an example of a part of a software configuration of the MFP 101 according to the first exemplary embodiment. FIG. 2 illustrates an example of a part of software included in the MFP 101 for the purpose of describing the present exemplary embodiment, and the MFP 101 may also include other software.

Programs for realizing application software 210 and system software 211 illustrated in FIG. 2 are stored in the ROM 112 or the storage 114. The above-described programs are loaded into the RAM 113 and are executed by the CPU 111 as necessary, for example, when the MFP 101 is powered on or when a function of the MFP 101 is used.

A system control unit 200 is system software for controlling the entire MFP 101, and realizes respective steps illustrated in the flowcharts to be described below, in cooperation with the application software 210 and the system software 211.

An authentication management unit 201 is system software for controlling access to an authentication information storage unit 202, which is a database storing user information in the storage 114. A setting management unit 203 is system software for controlling access to a setting information storage unit 204, which is a database storing setting information in the storage 114.

The application software 210 is software for realizing a function that the MFP 101 provides to users. The MFP 101 according to the present exemplary embodiment includes the application software 210 corresponding to the following functions.

The system control unit 200 executes and manages the application software 210 corresponding to the above-described copy function, transmission function, and storage function, thereby providing these functions to the users.

Further, the application software 210 provides, to the users, functions such as a help function of displaying a help screen, a main menu function of displaying a list of functions usable in the MFP 101 in a selectable manner, and a function of managing the number of printed sheets, namely, the printed sheet count management function of notifying a user of a use state. Each of the functions described in the present exemplary embodiment is an example of the function that the MFP 101 provides to the users, and the MFP 101 may include another function. For example, the MFP 101 according to the present exemplary embodiment allows application software providing a new function to be installed later into a main body of the apparatus. Such new functions are also included in the functions that the MFP 101 provides to the users. Further, the MFP 101 includes a web browser, and can use a web application from a web server (not-illustrated) on the LAN 100 via the network I/F 121. Functions provided by such web applications may be also included in the functions that the MFP 101 provides to the users.

Figure 6A:
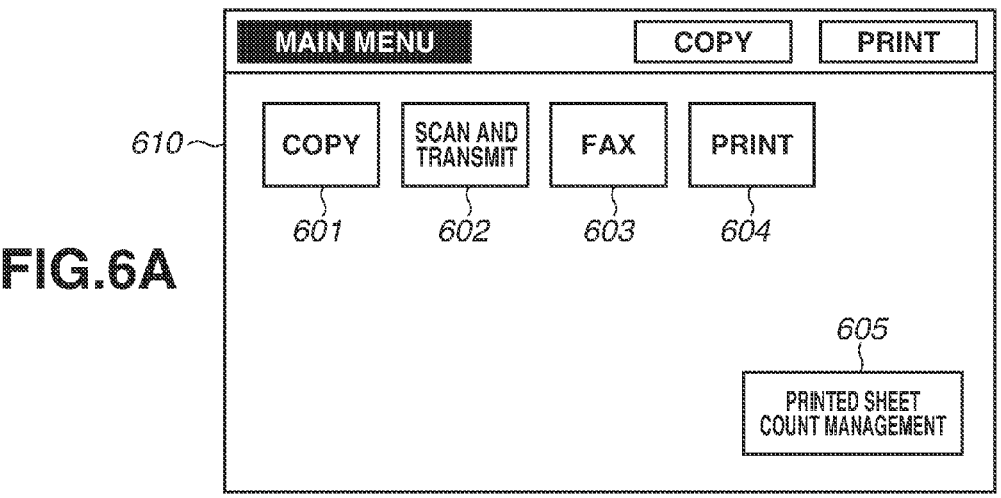
FIG. 6A illustrates an operation screen of the MFP 101 according to the first to third exemplary embodiments.
Figure 6B:
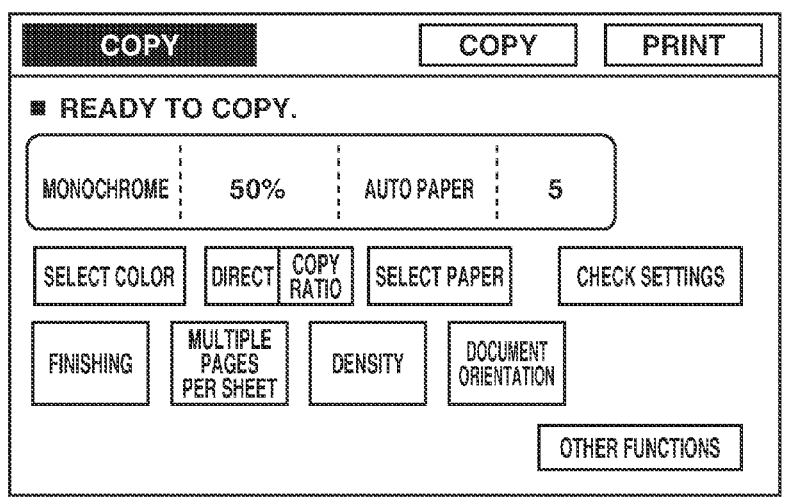
FIG. 6B illustrates an operation screen of the MFP 101 according to the first to third exemplary embodiments.
Figure 6C:
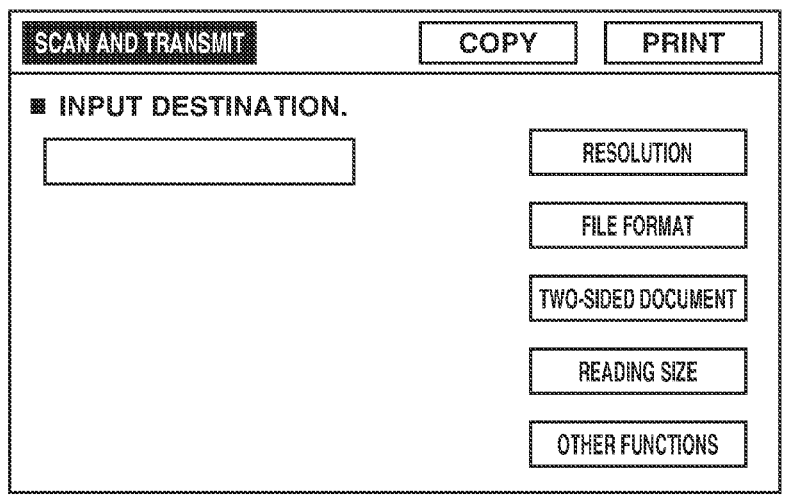
FIG. 6C illustrates an operation screen of the MFP 101 according to the first to third exemplary embodiments.
Figure 7A:
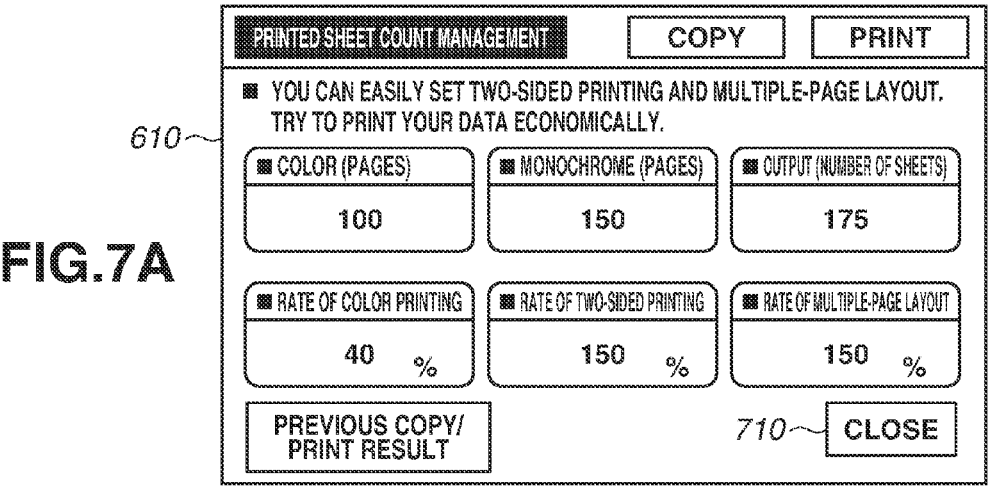
FIG. 7A illustrates an operation screen of the MFP 101 according to the first to third exemplary embodiments.
Figure 7B:
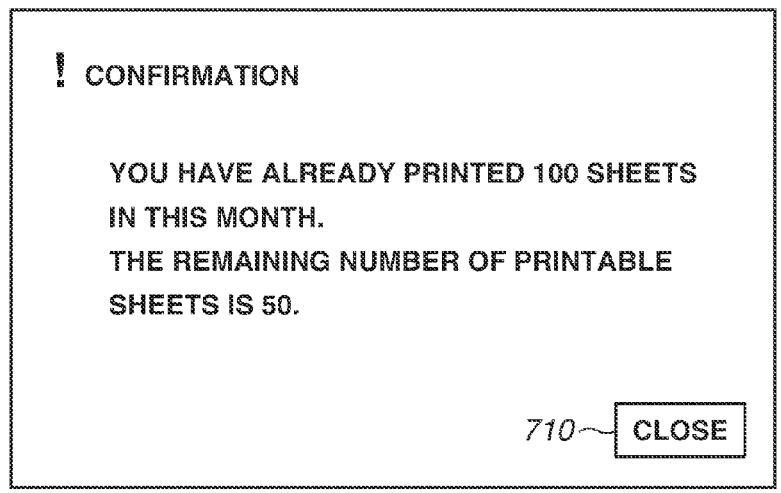
FIG. 7B illustrates an operation screen of the MFP 101 according to the first to third exemplary embodiments.
Figure 7C:
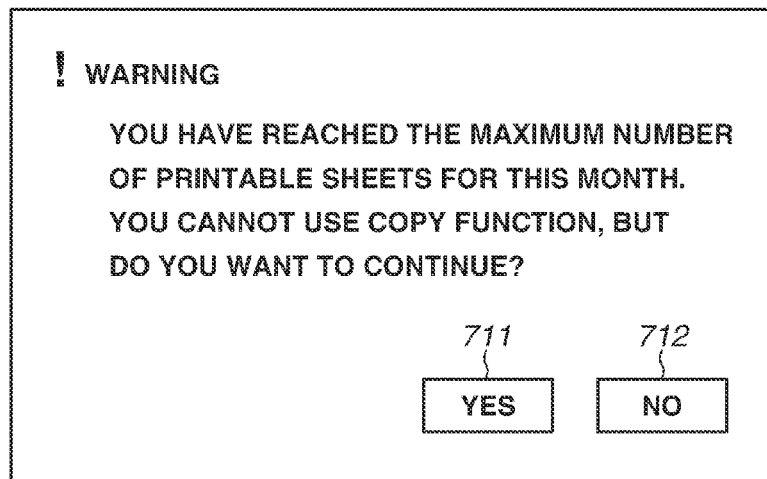
FIG. 7C illustrates an operation screen of the MFP 101 according to the first to third exemplary embodiments.

FIGS. 6A, 6B, 6C, 7A, 7B, and 7C each illustrate an example of a screen displayed on the operation unit 116 when a function included in the MFP 101 is activated. FIG. 6A illustrates an example of a main menu screen displayed when the main menu function is activated, and FIG. 6B illustrates an example of a copy setting screen displayed when the copy function is activated. Further, FIG. 6C illustrates an example of a transmission setting screen displayed when the transmission function is activated. FIGS. 7A, 7B, and 7C each illustrate an example of a management screen displayed when the printed sheet count management function is activated. The screen corresponding to the activated function is displayed in an area 610 in this manner, and the activated function enters a state of receiving an input and an operation from a user via the operation unit 116.

The application software 210 controls each hardware device via each I/F of the control unit 110 by cooperating with the system control unit 200. Further, the application software 210 can access authentication information stored in the authentication information storage unit 202 and setting information stored in the setting information storage unit 204 by cooperating with the authentication management unit 201 and the setting management unit 203 as necessary.

<Overview of Authentication Processing>

The MFP 101 can authenticate a user by comparing authentication information (a username and a password) input by the user with the authentication information stored in the authentication information storage unit 202. If these authentication information pieces match each other as a result of the comparison, the MFP 101 determines the authentication to be successful and permits the user to log in to the MFP 101. If these authentication information pieces do not match each other, the MFP 101 determines the authentication to be failure, and does not permit the user to log in to the MFP 101.

Further, a plurality of users is registered in the database of the authentication information storage unit 202, and the MFP 101 can also register a new user, delete a user, and update the user information in this database. Further, the MFP 101 can also manage a plurality of users as a group. The MFP 101 can add a user to the group or remove the user from the group by updating the above-described user information. Information about the group is also stored in the database of the authentication information storage unit 202.

Further, when authenticating a user, the MFP 101 may connect to an external authentication server via the network I/F 121, and thus use a result of authentication by the external authentication server, instead of the authentication with use of the authentication information storage unit 202 within the MFP 101 (hereinafter referred to as local authentication). In this case, the MFP 101 exchanges the authentication information with the external authentication server with use of a known technique such as Lightweight Directory Access Protocol (LDAP).

Figure 3:
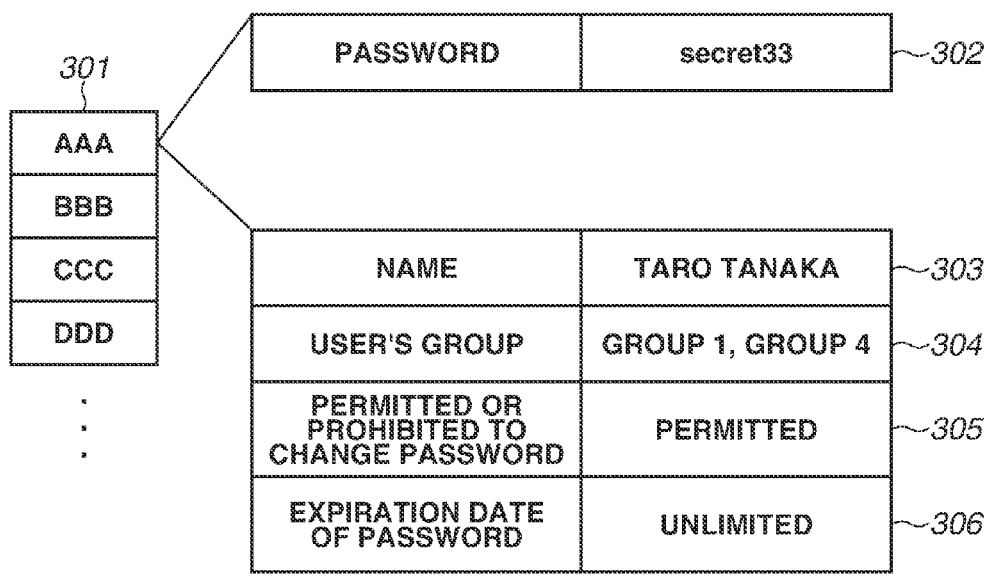
FIG. 3 illustrates a data model of an authentication information storage unit of the MFP 101 according to the first to third exemplary embodiments.

FIG. 3 illustrates an example of a data structure of the authentication information storage unit 202 according to the first exemplary embodiment. The authentication information storage unit 202 manages information 301 and information 302, which are necessary for authenticating a user, and user information items 303 to 306 in association with one another for each user. The information 301 is a username (a user ID) that uniquely indicates a user. FIG. 3 illustrates data of a user corresponding to a username "AAA".

The information 302 indicates the password for authenticating the user "AAA". The information 303 indicates that the name of the user "AAA" is "Taro Tanaka". The information 304 indicates that the user "AAA" belongs to a group called "Group 1" and a group called "Group 4". A user can belong to one or more group(s), and can also avoid belonging to any group. The information 305 indicates whether the user "AAA" himself/herself can change the password managed as the information 302. If the information 305 is set to "prohibited", the password indicated by the information 302 can be changed only by an administrator.

The information 306 indicates an expiration date of the password managed as the information 302. If the information 306 is set to "unlimited", the user can use the password indicated by the information 302 indefinitely. If a certain expiration date is set as the information 306, the user is requested to change the password when the expiration date is approaching.

Figure 4:
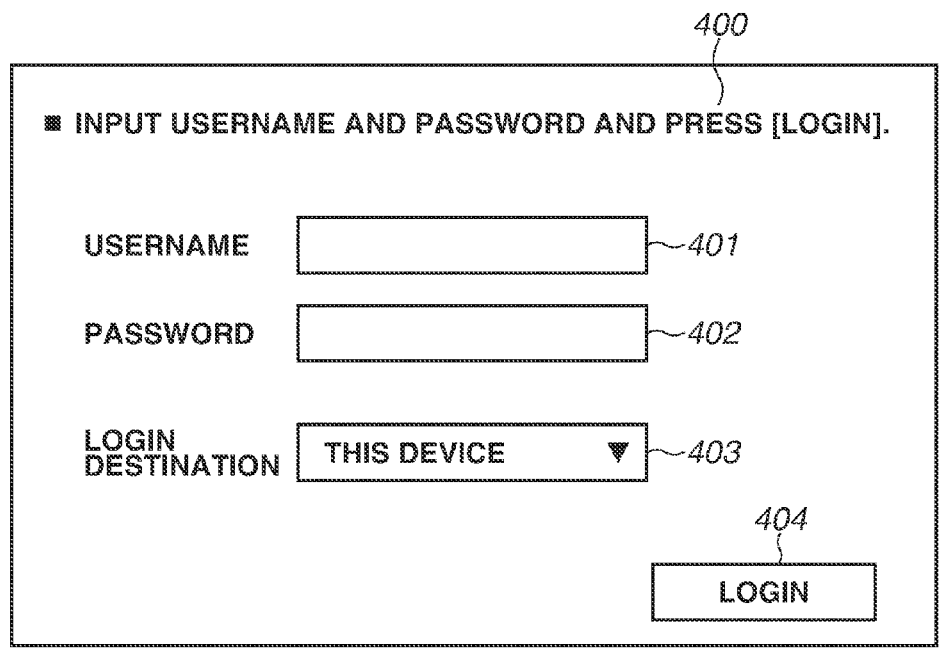
FIG. 4 illustrates an operation screen of the MFP 101 according to the first to third exemplary embodiments.

FIG. 4 illustrates an example of a login screen for receiving login processing that is displayed on the operation unit 116 when the MFP 101 authenticates a user. Via the screen illustrated in FIG. 4, the user can input the authentication information necessary for logging in to the MFP 101. Information 400 is a message for prompting the user to input the username and the password. An area 401 is an area for inputting the username, and an area 402 is an area for inputting the password.

Further, an area 403 is an area for selecting a login destination, and the user can select an authentication destination from a drop-down list. In a case where the above-described local authentication is carried out with use of the authentication information storage unit 202 of the MFP 101, the user selects this device as the login destination. On the other hand, in a case where the authentication is carried out with use of the external authentication server, the user selects the name of the external authentication server, and authentication is performed via the selected authentication server. The external authentication server can be selected only when the administrator pre-configures a setting for using the external authentication server.

An operation key 404 is an operation key for starting the authentication. When the user presses the operation key 404, the MFP 101 verifies whether the authentication information input in the area 401 and the area 402 is correct. If a result of the verification indicates that the input authentication information is correct, the MFP 101 determines the authentication to be successful and permits the user to log in to the MFP 101. If the input authentication information does not match the stored authentication information, the MFP 101 determines the authentication to be failure, and does not permit the user to log in to the MFP 101.

Further, in the present exemplary embodiment, the MFP 101 carries out the user authentication only when the MFP 101 is set by the administrator to carry out the user authentication. When the MFP 101 is not set to carry out the user authentication (when the administrator disables the user authentication), the MFP 101 does not carry out the user authentication.

Further, as possible timings when the MFP 101 carries out the user authentication, there are two timings, a timing when the MFP 101 starts to be operated, and a timing when a function is selected. In a case where the MFP 101 carries out the user authentication when the MFP 101 starts to be operated, the MFP 101 carries out the user authentication at a timing when a user starts to use the MFP 101. If the user is successfully authenticated, the user can use the various kinds of functions of the MFP 101.

On the other hand, instead of carrying out the authentication when the user starts to operate the MFP 101, the MFP 101 can also carry out the user authentication when each function included in the MFP 101 is selected (at the timing when a function is selected) (this authentication will be hereinafter referred to as function-based authentication). In a case where the MFP 101 carries out the function-based authentication, the administrator sets a function requiring the user authentication, and the MFP 101 carries out the user authentication at a timing when the set function is used.

Now, as an example of the function-based authentication, suppose that the MFP 101 is set so as to carry out the authentication when the "scan and transmission" function and the "fax" function are used. In this case, assume that the functions other than the "scan and transmission" function and the "fax" function can be used without execution of the user authentication. At the timing when a user starts to use the MFP 101, for example, the main menu function that allows the user to select each function is activated. FIG. 6A illustrates an example of the main menu screen for receiving a selection of each function included in the MFP 101 that is displayed on the operation unit 116. The area 610 is an area for displaying an operation screen corresponding to each function. The user can select each function via the main menu screen displayed in the area 610. When the user selects an operation key 601 via the operation unit 116, the "copy" function is activated. When the user selects an operation key 604 via the operation unit 116, the "print" function is activated.

On the other hand, when the user selects the "scan and transmission" function or the "fax" function respectively indicated by an operation key 602 or an operation key 603, the MFP 101 carries out the user authentication. If the user is successfully authenticated, the function selected by the user is activated.

<Overview of Customization Processing>

When a user logs in to the MFP 101, customization processing of the MFP 101 is performed. The customization processing is processing of acquiring below-described personal setting information stored in the setting information storage unit 204, via the setting management unit 203, and reflecting the acquired personal setting information into a setting of the MFP 101. Further, when the user logs out of the MFP 101, device setting information stored in the setting information storage unit 204 is read via the setting management unit 203, and is reflected into each setting of the MFP 101.

In such customization processes, the setting of the MFP 101 is performed based on the device setting information, the personal setting information, and group setting information that are stored in the setting information storage unit 204.

A user can pre-register the personal setting information to be used when the user uses the MFP 101. Further, the administrator of the MFP 101 can register and change the device setting information, the personal setting information, and the group setting information via a management screen of the MFP 101. The device setting information is setting information common in the MFP 101, so only a single piece of setting information is registered as the device setting information. On the other hand, individual setting information (personal information) is registered for each user as the user setting information. Individual setting information is also registered for each group as the group setting information.

First, the device setting information is a single piece of setting information common in the MFP 101 (common information). For example, the device setting information contains setting information such as a language used in the MFP 101, an initial screen to be displayed when the MFP 101 starts to be used, and address book information commonly used by all of the users. Further, the device setting information can be also used as an initial setting of the MFP 101 when the above-described authentication function is not set.

Next, setting information for each user is stored in the personal setting information. For example, the personal setting information contains setting information such as a language used by the user, an initial screen to be displayed when the user starts to use the MFP 101, and address book information for each user.

The group setting information is setting information provided to users belonging to each group, and for example, contains setting information such as an address book common in the group, a language used by the users belonging to the group, and an initial screen to be displayed when these users start to use the MFP 101.

FIG. 5 illustrates an example of a data structure of the setting information storage unit 204.

First, a target 501 is information for identifying the type of the setting information. Information indicating any of the device setting information, the personal setting information, and the group setting information is stored as the target 501. Further, a username for identifying a user is stored in the case of the personal setting information while a group name for identifying a group is stored in the case of the group setting information.

A key 502 is information for identifying a setting item, and a setting value 503 is a setting value corresponding to the setting item. The setting management unit 203 can acquire and store the setting value 503 set for the setting item, based on a combination of the target 501 and the key 502.

Next, each setting item will be described. FIG. 5 exemplifies "device" as the information for identifying a device, "AAA", "BBB", and "CCC" as the usernames for identifying respective users, and "Group 1" as the group name for identifying a group. Assume that the personal setting information for each of "AAA" and "BBB" is already preset by the administrator or the user, and the corresponding personal setting information is stored in the setting information storage unit 204. Further, assume that the personal setting information for "CCC" is not set by the administrator or the user, and the corresponding personal setting information is not stored in the setting information storage unit 204.

For example, the setting management unit 203 can acquire a setting value "Japanese" set as a display language for "AAA", by accessing the setting information storage unit 204 while specifying the target "AAA" and a key "display setting—display language". Further, the setting management unit 203 can acquire a setting value "Chinese" set as the display language for "BBB", by accessing the setting information storage unit 204 while specifying the target "BBB" and the key "display setting—display language" in a similar manner to the case of "AAA".

Further, the setting management unit 203 can acquire "ccc@abc.com" that is a first transmission destination in a personal address book for "BBB", by accessing the setting information storage unit 204 while specifying the target "BBB" and a key "personal address book—personal address 1".

Further, if the target is "device", the setting management unit 203 can acquire a setting value "English" set as a common display language, by accessing the device setting information while specifying the key "display setting—display language".

In this manner, the setting management unit 203 can refer to the device setting information, the personal setting information, and the group setting information that are stored in the setting information storage unit 204, with use of the information for identifying the target 501 and the key 502.

If the user is successfully authenticated, the system control unit 200 refers to each setting value 503 via the setting management unit 203 as appropriate, and changes the setting of the MFP 101. For example, when the user authentication for "BBB" has succeeded, the system control unit 200 refers to the setting of the display language, and sets the setting of the display language to be displayed on the operation unit 116 of the MFP 101 to "Chinese" set by the user. Further, the system control unit 200 refers to the setting of the initial screen for "BBB", activates the transmission function after the login, and displays the operation screen corresponding to the transmission function on the operation unit 116.

Further, the application software 210 corresponding to each function can refer to each setting value 503 via the setting management unit 203 as appropriate. For example, suppose that the user authentication for "BBB" has succeeded, and the transmission function is activated as the function corresponding to the initial screen (hereinafter referred to as an initial function). The transmission function allows the user to select a destination from the address book when specifying a transmission destination. As illustrated in FIG. 5, types of the address book include the common address book usable by all of the users, the personal address book usable for each user, and the group address book usable for each group. When the application software 210 corresponding to the transmission function is activated, the application software 210 corresponding to the transmission function acquires the personal address book for the user BBB, by accessing the personal setting information while specifying the target "BBB" and the key "personal address book". Further, the application software 210 corresponding to the transmission function acquires the common address book, by accessing the device setting information while specifying the target "device" and the key "common address book". Further, the application software 210 corresponding to the transmission function acquires the group address books by referring to the group setting information to which the user BBB belongs. In this manner, the transmission function provides an address book customized for each user to the user.

Further, the application software 210 corresponding to each function can also refer to a history of a setting previously configured by the user, for example.

<Display of Initial Screen in Login Processing>

FIG. 8 is a flowchart illustrating a display of the initial screen at the time of a login to the MFP 101. Each operation (step) illustrated in the flowchart of FIG. 8 is realized by the CPU 111 of the MFP 101 executing the programs for realizing the system software 211 and the application software 210 that are stored in the storage 114 or the ROM 112.

As described above, the processes in the flowchart illustrated in FIG. 8 are performed when the authentication (login) is requested at either a timing when the MFP 101 starts to be operated or a timing when a function is selected. In the following description, the flowchart illustrated in FIG. 8 will be described assuming that the authentication information is verified in the MFP 101. However, the authentication information may be verified in the external server.

In step S801, the system control unit 200 receives an input of the authentication information and an instruction for the authentication via the above-described login screen illustrated in FIG. 4.

When the system control unit 200 detects that a user presses the operation key 404, the processing proceeds to step S802.

In step S802, the system control unit 200 compares the authentication information acquired in step S801 with the authentication information stored in the authentication information storage unit 202. If a result of the comparison indicates a success in the authentication (SUCCESS in step S802), the processing proceeds to step S804. If a result of the comparison indicates a failure in the authentication (FAILURE in step S802), the processing proceeds to step S803. In step S803, the system control unit 200 notifies the user that the login has failed, via the operation unit 116. Then, the processing returns to step S801, in which the system control unit 200 receives an instruction for the authentication.

In step S804, the system control unit 200 acquires the username input from the user as user identification information.

In step S805, the system control unit 200 determines whether the function-based authentication is employed as the authentication method. If the function-based authentication is employed as the authentication method (YES in step S805), the processing proceeds to step S813. In step S813, the system control unit 200 activates a function selected by the user, displays a screen corresponding to the function, and then ends the login processing. If the function-based authentication is not employed as the authentication method (NO in step S805), the processing proceeds to step S806.

In step S806, the system control unit 200 determines whether to prioritize the initial screen set by the user.

As described above, the setting information storage unit 204 may store two initial screens, the initial screen for each individual user that is registered by each user as the personal setting information, and the initial screen registered as the device setting information of the MFP 101.

For example, suppose that a screen corresponding to the printed sheet count management function, as illustrated in FIGS. 7A to 7C, is set as the initial screen in the device setting information. The printed sheet count management function is a function of setting a maximum number of sheets printable in a certain time period (for example, one month) for each user, and recording the number of printed sheets for each user to display the number of printed sheets on the operation unit 116 (FIG. 7A). An operation key 710 is an operation key used for closing the screen displayed by the printed sheet count management function.

Further, the printed sheet count management function can also impose a restriction, by restricting use of the print function (as illustrated in FIG. 7C) or restricting color printing so as to permit only monochrome printing, when the number of sheets printed by the login user reaches the maximum number. An operation key 711 is an operation key used for closing the screen displayed by the printed sheet count management function. An operation key 712 is an operation key used for ending the use of the MFP 101 (logging out of the MFP 101).

Further, the printed sheet count management function can also notify the user that the remaining number of sheets printable by the user is getting small (for example, 50 sheets or less) (as illustrated in FIG. 7B).

In this manner, when the initial screen set by each user is displayed although the administrator sets the initial screen, the screen intended by the administrator cannot be displayed.

Therefore, in the present exemplary embodiment, the MFP 101 is configured to allow the administrator to preset a priority setting for specifying which initial screen should be prioritized, the initial screen set in the device setting information or the initial screen set in the personal setting information. In the present exemplary embodiment, for example, home screens of respective functions such as the copy function, the transmission function, the fax function, the print function, and the printed sheet count management function can be set as the initial screen. The home screen described here means a screen to be displayed first when a user uses each function.

Further, the MFP 101 may be configured to allow the main menu screen to be set as the initial screen. Further, a home screen corresponding to the function provided by the above-described new application software installed in the main body of the apparatus and provided to the users can be set as the initial screen. Further, a home screen provided by the web application executed via the web browser can be also set as the initial screen. Further, in the present exemplary embodiment, the MFP 101 is configured in such a manner that, when the administrator or a user sets the initial screen into the device setting information or the personal setting information, for example, the MFP 101 displays a list of items settable as the initial screen as a drop-down list or the like so that one screen is selected therefrom. However, the MFP 101 may be configured in another manner.

For example, the MFP 101 may be configured in such a manner that, when the initial screen is to be set in the device setting information, the MFP 101 displays usernames or the like as a list, and receives selection of a username, thereby acquiring an initial screen corresponding to the selected user to set the acquired initial screen as the initial screen in the device setting information. Alternatively, the MFP 101 may be configured to display not only the usernames but also initial screens set by these users as a list on a screen, and set the initial screen in the device setting information via the displayed screen.

Figure 9A:
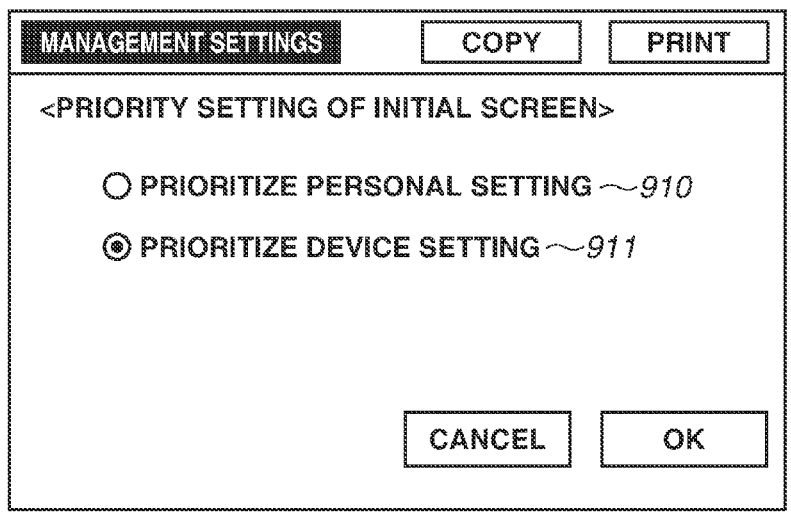
FIG. 9A illustrates an operation screen of the MFP 101 according to the first to third exemplary embodiments.

FIG. 9A illustrates an example of a management setting screen that the MFP 101 displays on the operation unit 116. FIG. 9A illustrates a case where a radio button 911 is specified. The administrator can set the initial screen to be prioritized, via the screen illustrated in FIG. 9A. If a radio button 910 is specified, the MFP 101 is set so as to activate the function corresponding to the initial screen registered with the personal setting information, and display the set initial screen. If the radio button 911 is specified, the MFP 101 is set so as to activate the function corresponding to the initial screen registered with the device setting information, and display the set initial screen.

Information about a setting configured on the screen illustrated in FIG. 9A is stored as the setting item in the device setting information in the setting information storage unit 204 via the setting management unit 203.

Referring back to the description of FIG. 8, in step S806, the system control unit 200 acquires the priority setting of the initial screen from the device setting information in the setting information storage unit 204 via the setting management unit 203. If the MFP 101 is set so as to prioritize the initial screen set by the user (YES in step S806), the processing proceeds to step S807. On the other hand, if the MFP 101 is not set so as to prioritize the initial screen set by the user (if the MFP 101 is set so as to prioritize the initial screen in the device setting information) (NO in step S806), the processing proceeds to step S810.

In step S807, the system control unit 200 acquires the setting value of the initial screen for the login user via the setting management unit 203 by specifying the user identification information acquired in step S804 and the initial screen as keys.

In step S808, the system control unit 200 determines whether the initial screen is set, based on the acquired setting value of the initial screen. If the system control unit 200 can acquire the setting value corresponding to the initial screen (YES in step S808), the processing proceeds to step S809, in which the system control unit 200 activates the function corresponding to the initial screen set by the user as the initial screen, displays the set initial screen, and then ends the login processing.

On the other hand, if the system control unit 200 cannot acquire the setting value corresponding to the initial screen (NO in step S808), the processing proceeds to step S810. When the personal setting information corresponding to the user identification information is not registered, or when the personal setting information is registered but the setting item corresponding to the initial screen is not set, since the setting value of the initial screen is not stored, the system control unit 200 determines that the initial screen is not set.

In step S810, the system control unit 200 acquires the setting value of the initial screen from the device setting information in the setting information storage unit 204 via the setting management unit 203. In step S811, the system control unit 200 determines whether the initial screen is set, based on the acquired setting value of the initial screen. If the system control unit 200 can acquire the setting value corresponding to the initial screen (YES in step S811), the processing proceeds to step S812, in which the system control unit 200 activates the initial function corresponding to the initial screen set by the administrator, displays the set initial screen, and then ends the login processing. On the other hand, if the system control unit 200 cannot acquire the setting value corresponding to the initial screen (NO in step S811), the processing proceeds to step S814. In step S814, the system control unit 200 activates, for example, the main menu function and displays the main menu screen (FIG. 6A) on the operation unit 116, in a similar manner to the operation performed when the user authentication is not carried out.

In the actual login processing, the system control unit 200 not only displays the initial screen as described with reference to the flowchart of FIG. 8, but also performs processing for reflecting the other personal settings, such as switching the language setting used in the MFP 101 to the language registered as the personal setting by the login user.

Further, in the present exemplary embodiment, the activation of the function corresponding to the initial screen is assumed to be the activation of the program for realizing the application software 210 corresponding to the initial screen, but the activation of the function corresponding to the initial screen is not limited thereto. For example, the application software 210 may be activated in the background when the MFP 101 starts to be used. In this case, in step S809 or S812, the system control unit 200 changes the application software 210 activated in the background into a foreground process, and displays the home screen corresponding to the function on the operation unit 116. The application activated in the foreground can receive an operation input via the home screen displayed on the operation unit 116. Further, the "initial screen" in the present exemplary embodiment may be a screen to be displayed first when the MFP 101 becomes ready to be used after the user authentication, or may be a screen to be finally displayed after several screens make transition when the MFP 101 becomes ready to be used. Alternatively, the MFP 101 may be configured to allow any one of the above-described several screens to be set as the initial screen.

In this manner, according to the present exemplary embodiment, when the initial screen is displayed when the MFP 101 starts to be used, it can be set which initial screen should be preferentially displayed, the common initial screen set by the administrator or the initial screen preregistered by the user. As a result, if the administrator desires to display a certain initial screen, the MFP 101 can display the initial screen set by the administrator. On the other hand, if the initial screen preregistered by the user is prioritized (YES in step S806), the MFP 101 can display the initial screen set by the user. Further, when the function-based authentication is employed as the authentication method, even if the initial screen is set, the MFP 101 can display the home screen corresponding to the function selected by the user without displaying the initial screen. These mechanisms allow the MFP 101 to display the initial screen highly conveniently for the user and the administrator.

Second Exemplary Embodiment

Next, a second exemplary embodiment of the present invention will be described. In the first exemplary embodiment, the description has been given of an example in which the MFP 101 displays the initial screen set by the administrator if the initial screen intended by the administrator is prioritized. In the second exemplary embodiment, the description will be given of login control of displaying the initial screen set by the user after the initial screen intended by the administrator is closed, in addition to the operation according to the first exemplary embodiment. In the second exemplary embodiment, a hardware configuration of a prerequisite apparatus is similar to the first exemplary embodiment. Similar features of the second exemplary embodiment to the first exemplary embodiment will not be described in detail below.

Figure 9B:
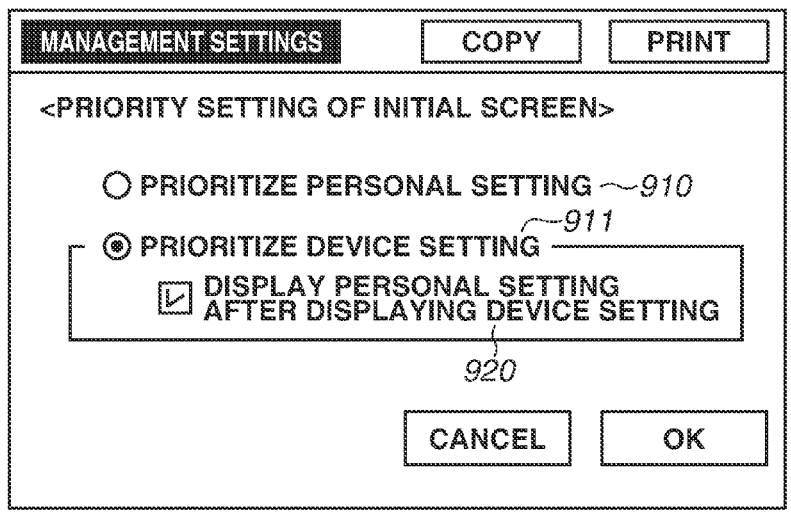
FIG. 9B illustrates an operation screen of the MFP 101 according to the first to third exemplary embodiments.

FIG. 9B illustrates an example of a management setting screen that the MFP 101 displays on the operation unit 116. FIG. 9B illustrates a state where the radio button 911 is specified. The administrator can set the initial screen to be prioritized via the screen illustrated in FIG. 9B. If the radio button 910 is specified, the MFP 101 is set so as to display the initial screen registered with the personal setting information. If the radio button 911 is specified, the MFP 101 is set so as to display the initial screen registered with the device setting information.

An item 920 is an additional setting for the radio button 911. If the radio button 911 is specified and the item 920 is checked, the MFP 101 is set so as to display the initial screen set by the user after the initial screen intended by the administrator is closed.

The priority setting set via the screen illustrated in FIG. 9B is stored as the setting item in the device setting information in the setting information storage unit 204 via the setting management unit 203.

For example, the display of the initial screen will be described based on the setting information illustrated in FIG. 5 by way of example. The user AAA does not set the initial screen, and the user BBB sets the home screen of the transmission function as the initial screen. Further, assume that the home screen of the printed sheet count management function is set as the initial screen of the device.

When the user AAA logs in, the home screen of the printed sheet count management function, which is the initial screen set for the device, is displayed. When the user AAA closes the screen of the printed sheet count management function that is illustrated in FIGS. 7A to 7C, since the user AAA does not set the initial screen for himself/herself, the main menu is activated and the main menu screen illustrated in FIG. 6A is displayed on the operation unit 116.

On the other hand, when the user BBB logs in, the home screen of the printed sheet count management function is displayed in a similar manner to the display when the user AAA logs in. When the user BBB closes the screen of the printed sheet count management function that is illustrated in FIGS. 7A to 7C, the home screen of the transmission function (FIG. 6C), which is the initial screen set for the user BBB, is displayed. If the user issues an instruction to activate another function during the displays of these initial screens, the MFP 101 activates the function based on the user's instruction instead of the initial screen set for each user, and displays the home screen corresponding to the selected function on the operation unit 116.

For example, by pressing a main menu key prepared as a hard key outside the screen or another hard key for directly calling a specific function, the user can directly activate another function associated with the main menu screen or the hard key.

In this case, the MFP 101 prioritizes activation of the other function, and does not display the initial screen set for the user.

<Display of Initial Screen in Login Processing>

Figure 10:
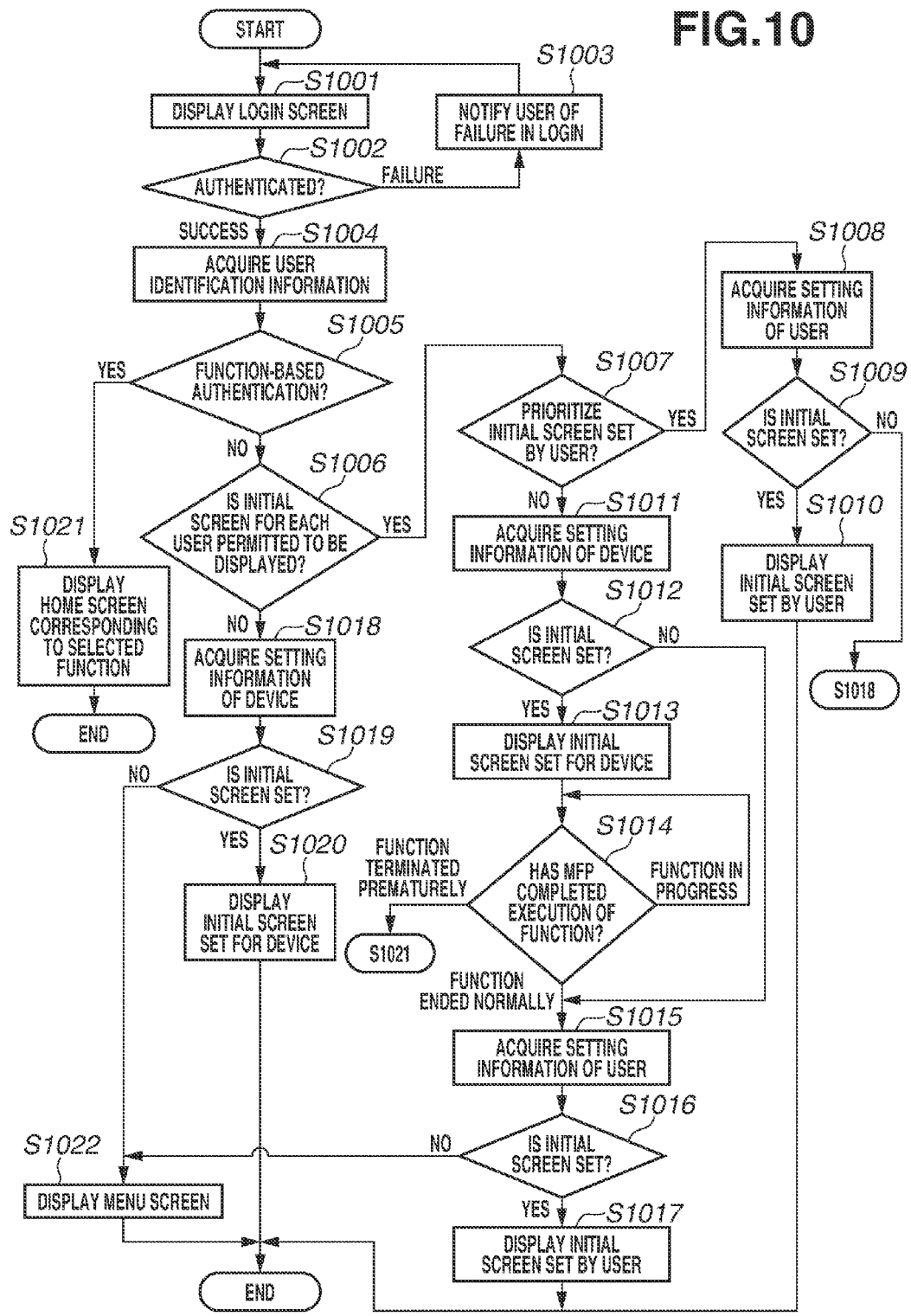
FIG. 10 is a flowchart illustrating a login operation of the MFP 101 according to the first to third exemplary embodiments.

FIG. 10 is a flowchart illustrating login processing according to the second exemplary embodiment. Each operation (step) illustrated in the flowchart of FIG. 10 is realized by the CPU 111 of the MFP 101 executing the programs for realizing the system software 211 and the application software 210 that are stored in the storage 114 or the ROM 112.

In steps S1001 to S1003, the system control unit 200 carries out the user authentication. If the user is successfully authenticated in step S1002 (SUCCESS in step S1002), the processing proceeds to step S1004.

In step S1004, the system control unit 200 acquires the username of the user that has succeeded in the login, as the user identification information.

In step S1005, the system control unit 200 determines whether the function-based authentication is employed as the authentication method. If the function-based authentication is employed as the authentication method (YES in step S1005), the processing proceeds to step S1021, in which the system control unit 200 activates a function selected by the user, displays a home screen corresponding to the selected function, and then ends the login processing. If the function-based authentication is not employed as the authentication method (NO in step S1005), the processing proceeds to step S1006.

In step S1006, the CPU 111 acquires the priority setting from the device setting information in the setting information storage unit 204 via the setting management unit 203. If the MFP 101 is set by the priority setting so as to prioritize the personal setting or display the personal setting after displaying the device setting, the CPU 111 determines that the initial screen set by the user is permitted to be displayed (YES in step S1006), whereby the processing proceeds to step S1007. On the other hand, if the MFP 101 is set so as to prioritize the device setting and is not set so as to display the personal setting after displaying the device setting, the CPU 111 determines that the initial screen set by the user is not permitted to be displayed (NO in step S1006), whereby the processing proceeds to step S1018. In steps S1018 to S1020, the system control unit 200 activates the function corresponding to the initial screen based on the initial setting information of the device, displays the set initial screen, and then ends the login processing, in a similar manner to the above-described steps S810 to S812. If the system control unit 200 determines that the initial screen is not set in step S1019 (NO in step S1019), the processing proceeds to step S1022, in which the system control unit 200, for example, activates the main menu function and displays the main menu screen (FIG. 6A) on the operation unit 116 in a similar manner to the operation performed when the user authentication is not carried out.

On the other hand, in step S1007, the system control unit 200 determines whether the MFP 101 is set so as to prioritize the initial screen set by the user. If the MFP 101 is set so as to prioritize the initial screen set by the user (YES in step S1007), the processing proceeds to step S1008. If the MFP 101 is not set so as to prioritize the initial screen set by the user (if the MFP 101 is set so as to prioritize the device setting information) (NO in step S1007), the processing proceeds to step S1011.

In step S1008, the system control unit 200 acquires the setting value of the initial screen set for the login user, via the setting management unit 203 by specifying the user identification information acquired in step S1004 and the initial screen as keys.

In step S1009, the system control unit 200 determines whether the initial screen is set, based on the acquired setting value of the initial screen. If the system control unit 200 can acquire the setting value corresponding to the initial screen (YES in step S1009), the processing proceeds to step S1010, in which the system control unit 200 activates the function corresponding to the initial screen set by the user as the initial screen, displays the set initial screen, and then ends the login processing. On the other hand, if the system control unit 200 cannot acquire the setting value corresponding to the initial screen (NO in step S1009), the processing proceeds to step S1018. Then, in steps S1018 to S1020, the system control unit 200 displays the initial screen based on the device setting information. When the personal setting information corresponding to the user identification information is not registered, or when the personal setting information is registered but the setting item corresponding to the initial screen is not set, since the setting value of the initial screen is not stored, the system control unit 200 determines that the initial screen is not set.

On the other hand, if the MFP 101 is not set so as to prioritize the user setting information (NO in step S1007), the processing proceeds to step S1011. In step S1011, the system control unit 200 acquires the setting value of the initial screen from the device setting information in the setting information storage unit 204 via the setting management unit 203. In step S1012, the system control unit 200 determines whether the initial screen is set, based on the acquired setting value of the initial screen. If the system control unit 200 can acquire the setting value corresponding to the initial screen (YES in step S1012), the processing proceeds to step S1013, in which the system control unit 200 activates the initial function corresponding to the initial screen set by the administrator, and displays the set initial screen. On the other hand, if the system control unit 200 cannot acquire the setting value corresponding to the initial screen (NO in step S1012), the processing proceeds to step S1015. Then, the system control unit 200 displays the initial function based on the user setting information as indicated in steps S1015 to S1017.

In step S1014, the CPU 111 determines whether the MFP 101 has completed the execution of the function corresponding to the initial screen activated based on the device setting information. If the CPU 111 detects that the display screen of the initial function is closed by a user operation via the operation unit 116, or if the CPU 111 detects that job execution by the initial function has completed, the CPU 111 determines that the MFP 101 has normally ended the execution of the function corresponding to the initial screen (FUNCTION ENDED NORMALLY in step S1014), and then the processing proceeds to step S1015.

On the other hand, if the CPU 111 detects an instruction to activate another function (the application software 210) by a user operation via the operation unit 116 while the MFP 101 is carrying out the function corresponding to the initial screen based on the device setting information, the CPU 111 determines that the use of the function corresponding to the initial screen is terminated prematurely (FUNCTION TERMINATED PREMATURELY in step S1014). If the CPU 111 determines that the function corresponding to the initial screen is terminated prematurely (FUNCTION TERMINATED PREMATURELY in step S1014), the CPU 111 activates the other function based on the instruction, displays a home screen corresponding to the selected function, and then ends the login processing. On the other hand, if the function corresponding to the initial screen is in progress (FUNCTION IN PROGRESS in step S1014), the CPU 111 waits for completion of the execution or cancel of the execution.

The detection of these instructions can be achieved by cooperation between the system software 211 that realizes the system control unit 200, and the application software 210 corresponding to the initial function. For example, the application software 210 corresponding to the initial function notifies the system control unit 200 of a status at the time of an end of the execution. If it is detected that the function is closed by the user operation via the screen displayed on the operation unit 116, or the execution of a job to be carried out by each function has been completed, the application software 210 notifies the system control unit 200 of a normal end. On the other hand, in other cases, the application software 210 notifies the system control unit 200 of premature termination. In this case, if the system control unit 200 receives the normal end as the status at the time of an end of the execution by the application software 210 corresponding to the initial function (FUNCTION ENDED NORMALLY in step S1014), the processing proceeds to step S1015. On the other hand, if the system control unit 200 receives the premature termination (FUNCTION TERMINATED PREMATURELY in step S1014), the processing proceeds to step S1021, in which the system control unit 200 activates the application software 210 corresponding to the function selected by the user, and then ends the login processing.

In step S1015, the system control unit 200 acquires the setting value of the initial screen set for the login user. In step S1016, the system control unit 200 determines whether the initial screen is set, based on the acquired setting value of the initial screen. If the initial screen is set (YES in step S1016), the processing proceeds to step S1017, in which the system control unit 200 displays the initial screen according to the setting value, and then ends the login processing. On the other hand, if the initial screen is not set (NO in step S1016), the processing proceeds to step S1022. In step S1022, the system control unit 200, for example, activates the main menu function and displays the main menu screen (FIG. 6A) on the operation unit 116.

According to the present exemplary embodiment, the MFP 101 can preferentially display the initial screen set by the administrator after the login, and display the initial screen set by the user after completing the execution of the function corresponding to the initial screen set by the administrator. With such mechanism, the initial screen can be displayed highly conveniently for the user and the administrator while further improving the convenience of the user compared to the first exemplary embodiment.

Third Exemplary Embodiment

Next, a third exemplary embodiment of the present invention will be described. In the second exemplary embodiment, the description has been given of the example in which the MFP 101 preferentially displays the initial screen set by the administrator after the login, and displays the initial screen set by the user after completing the execution of the function corresponding to the initial screen set by the administrator. In the present exemplary embodiment, the description will be given of login control of determining, based on a preset priority order, the display order of the initial screen according to the group setting information in addition to the initial screen according to the device setting information and the initial screen according to the user setting information, and then displaying the initial screens. In the third exemplary embodiment, a hardware configuration of a prerequisite apparatus is similar to the first and second exemplary embodiments. Similar features of the third exemplary embodiment to the first and second exemplary embodiments will not be described in detail below.

As described above, a user can belong to a plurality of groups. Further, the groups can have the respective initial screens set as the setting items.

In the present exemplary embodiment, the administrator presets a priority order for specifying which initial screen should be prioritized, the initial screen in the device setting information, the initial screen in the personal setting information, or the initial screen in the group setting information.

FIG. 12A illustrates an example of a management setting screen that the MFP 101 displays on the operation unit 116. Information 1210 notifies a user of information about the priority order of the initial screens in the MFP 101. The user can select a target (setting information) displayed in the information 1210, via the operation unit 116. FIG. 12A illustrates a state where "Group 3" is selected.

An operation key 1211 is an operation key used to interchange a position of the selected target and a position of a target immediately above the selected target in the priority order. When the operation key 1211 is pressed with "Group 3" being selected, "Group 3" is moved into a row of a second position in the priority order while "device" is moved into a row of a third position in the priority order, so that their positions in the priority order are interchanged. When the operation key 1211 is pressed again, the positions of "Group 3" and "Group 1" in the priority order are interchanged. On the other hand, an operation key 1212 is an operation key used to interchange the position of the selected target and a position of a target immediately below the selected target in the priority order. The user can set which initial screen should be preferentially displayed, the initial screen in the device setting information, the initial screen in the personal setting information, or the initial screen in the group setting information, by selecting the target and pressing the operation key 1211 and the operation key 1212 in this manner. A priority order list set via the screen illustrated in FIG. 12A is stored as the setting item in the device setting information in the setting information storage unit 204 via the setting management unit 203.

<Display of Initial Screen in Login Processing>

FIG. 11 is a flowchart illustrating login processing according to the third exemplary embodiment. Each operation (step) illustrated in the flowchart of FIG. 11 is realized by the CPU 111 of the MFP 101 executing the control program and the application program corresponding to each function that are stored in the ROM 112 or the storage 114.

In steps S1101 to S1103, the system control unit 200 carries out the user authentication. If the user is successfully authenticated in step S1102 (SUCCESS in step S1102), the processing proceeds to step S1104.

In step S1104, the system control unit 200 acquires the username of the user that has succeeded in the login and the name of a group to which the user belongs, as the user identification information.

In step S1105, the system control unit 200 determines whether the function-based authentication is employed as the authentication method. If the function-based authentication is employed as the authentication method (YES in step S1105), the processing proceeds to step S1117, in which the system control unit 200 activates a function selected by the user, displays a home screen corresponding to the selected function, and then ends the login processing. If the function-based authentication is not employed as the authentication method (NO in step S1105), the processing proceeds to step S1106.

In step S1106, the system control unit 200 acquires the priority order list stored in the device setting information in the setting information storage unit 204 via the setting management unit 203. The timings of the acquisition in steps S1104 and 1106 are not limited to the above-described examples. For example, the priority order list acquired in step S1106 may be acquired when the MFP 101 carries out the user authentication. Further, the group name acquired in step S1104 may be acquired at any timing as long as the timing is after the user is successfully authenticated (YES in step S1102).

In step S1107, the system control unit 200 creates a priority display list based on the name of the group to which the login user belongs that has been acquired in step S1104, and the priority order list acquired in step S1106. Further, the system control unit 200 acquires address information storing an item having a highest position in the priority order as an access pointer for accessing the priority display list.

FIG. 12B illustrates a priority display list 1220 of the initial screen that is created in step S1107, and illustrates the priority display list of a case where the user AAA belongs to the group 1 and the group 4 by way of example.

In step S1108, the system control unit 200 refers to the priority display list based on the access pointer, and acquires target information. In step S1109, the system control unit 200 determines whether the initial screen is set, based on the acquired setting value of the initial screen. If the system control unit 200 can acquire the setting value corresponding to the initial screen (YES in step S1109), the processing proceeds to step S1110. On the other hand, if the system control unit 200 cannot acquire the setting value corresponding to the initial screen (NO in step S1109), the processing proceeds to step S1112.

In step S1110, the system control unit 200 activates the initial function corresponding to the initial screen and displays the set initial screen, based on the initial screen corresponding to the target information acquired in step S1108.

In step S1111, the system control unit 200 determines whether the MFP 101 has completed the execution of the function corresponding to the initial screen, by performing similar processing to step S1014. If the system control unit 200 determines that the MFP 101 has normally ended the execution of the function corresponding to the initial screen (FUNCTION ENDED NORMALLY in step S1111), the processing proceeds to step S1112. On the other hand, if the system control unit 200 detects an instruction to activate another function while the MFP 101 is carrying out the function corresponding to the initial screen, the system control unit 200 determines that the function corresponding to the initial screen is terminated prematurely (FUNCTION TERMINATED PREMATURELY in step S1111). In this case, the system control unit 200 activates the function based on the instruction, displays a home screen corresponding to the selected function, and then ends the login processing. On the other hand, if the function corresponding to the initial screen is in progress (FUNCTION IN PROGRESS in step S1111), the system control unit 200 waits for completion of the execution or cancel of the execution.

In step S1112, the system control unit 200 increments the access pointer for referring to the priority display list. In step S1113, the system control unit 200 determines whether there is any initial screen that is not displayed yet. If there is an initial screen that is not displayed yet (YES in step S1113), the processing returns to step S1108, in which the system control unit 200 displays an initial screen in the priority display list that is not referred to yet. On the other hand, if there is no initial screen that is not displayed yet (NO in step S1113), the system control unit 200 ends the login processing.

If the initial screen is not displayed in steps S1108 to S1112, i.e., if no initial screen is registered with any of the user setting information, the device setting information, and the group setting information of the group to which the user belongs, the system control unit 200 performs the following processing. In this case, for example, when displaying the initial screen in step S1110, the system control unit 200 sets a flag indicating that the initial screen is displayed. If the determination result indicates NO in step S1113 (NO in step S1113), the system control unit 200 determines whether the flag is set. If the flag is set, the system control unit 200 ends the login processing. On the other hand, if the flag is not set, the system control unit 200, for example, activates the main menu function and displays the main menu screen (FIG. 6A) on the operation unit 116.

According to the present exemplary embodiment, in addition to the initial screen according to the device setting information and the initial screen according to the user setting information, the initial screen according to the group setting information can be displayed based on the order indicated by the priority list preset by the administrator. With such mechanism, even when there is a plurality of initial screens to be displayed, the initial screens can be appropriately displayed based on the priority order.

The present invention has been described with use of the MFP as an example of the information processing apparatus according to the above-described first to third exemplary embodiments, but the information processing apparatus does not necessarily have to be the MFP as long as the information processing apparatus is an information processing apparatus having the user authentication function.

Further, the "initial screen" in the first to third exemplary embodiments may be interpreted to indicate an entire display sequence in a case where a plurality of screens is displayed sequentially when the information processing apparatus becomes ready to be used. For example, the present invention can be also applied to a case of setting a different display sequence when the information processing apparatus becomes ready to be used, such as a case of sequentially displaying a first screen, a second screen, and a third screen in this order, and a case of sequentially displaying the first screen, the third screen, and the second screen in this order. Alternatively, the present invention can be also applied to a case where the number of transitioning screens is changed according to a setting of the display sequence, such as a case of sequentially displaying only the second screen after the first screen in a normal screen mode while sequentially displaying the first screen, the second screen, and the third screen in a detailed screen mode. In this case, it can be set which display sequence should be prioritized to display the screens, a common display sequence set by the administrator or a display sequence preregistered by the user. As a result, when the display sequence is set by the administrator, the information processing apparatus can start to be used according to the screen transition set by the administrator.

Fourth Exemplary Embodiment

FIGS. 13 to 31 illustrate fourth to sixth exemplary embodiments. The fourth to sixth exemplary embodiments use an image forming apparatus 2200 as an example of the information processing apparatus.

Figure 13:
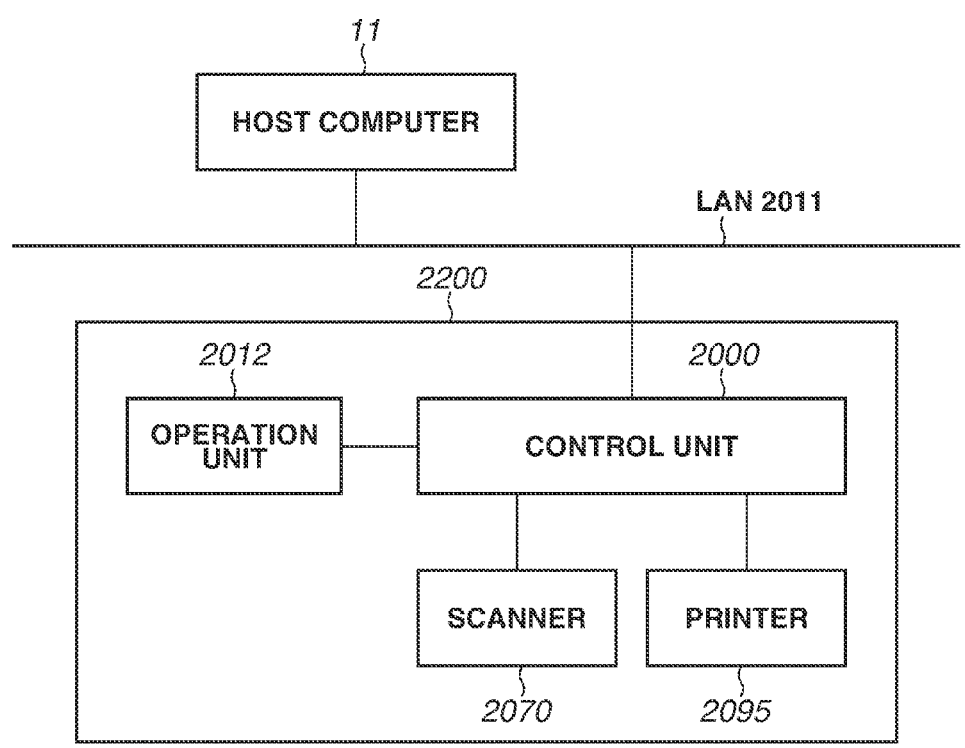
FIG. 13 illustrates an example of a system configuration of an image output system according to fourth to sixth exemplary embodiments.

FIG. 13 illustrates an example of a system configuration of an image output system that includes a host computer 11 and the image forming apparatus 2200 according to the fourth to sixth exemplary embodiments. In the image output system illustrated in FIG. 13, the host computer 11 and the image forming apparatus 2200 can communicate with each other according to a predetermined protocol via a LAN 2011. FIG. 13 illustrates the image output system assuming that the image output system includes a single image forming apparatus 2200, but the image output system may include a plurality of image forming apparatuses 2200. Further, FIG. 13 illustrates the image output system assuming that the host computer 11 and the image forming apparatus 2200 are separate apparatuses from each other, but the host computer 11 and the image forming apparatus 2200 may be configured as a single apparatus.

The image forming apparatus 2200 includes a scanner 2070 that is an image input device, a printer 2095 that is an image output device, a control unit 2000, and an operation unit 2012 that is a user interface. Each of the scanner 2070, the printer 2095, and the operation unit 2012 is connected to the control unit 2000. The control unit 2000 is connected to a network such as the LAN 2011.

The host computer 11 is an information processing apparatus that functions as a client machine, and includes a display device, a keyboard, a pointing device, and a main body of the computer. A CPU of the host computer 11 loads an operating system (OS) program and various kinds of application programs that are stored in an external storage device mounted within the main body of the computer into a RAM to execute them. As a result, the CPU of the host computer 11 realizes a function of the host computer 11. The host computer 11 communicates with the image forming apparatus 2200 via a not-illustrated network card and the network, and displays acquired information on a display. The host computer 11 is configured in such a manner that web browser software can operate therein, and can communicate with the image forming apparatus 2200 having a web server function that will be described below according to the predetermined protocol.

Figure 14:
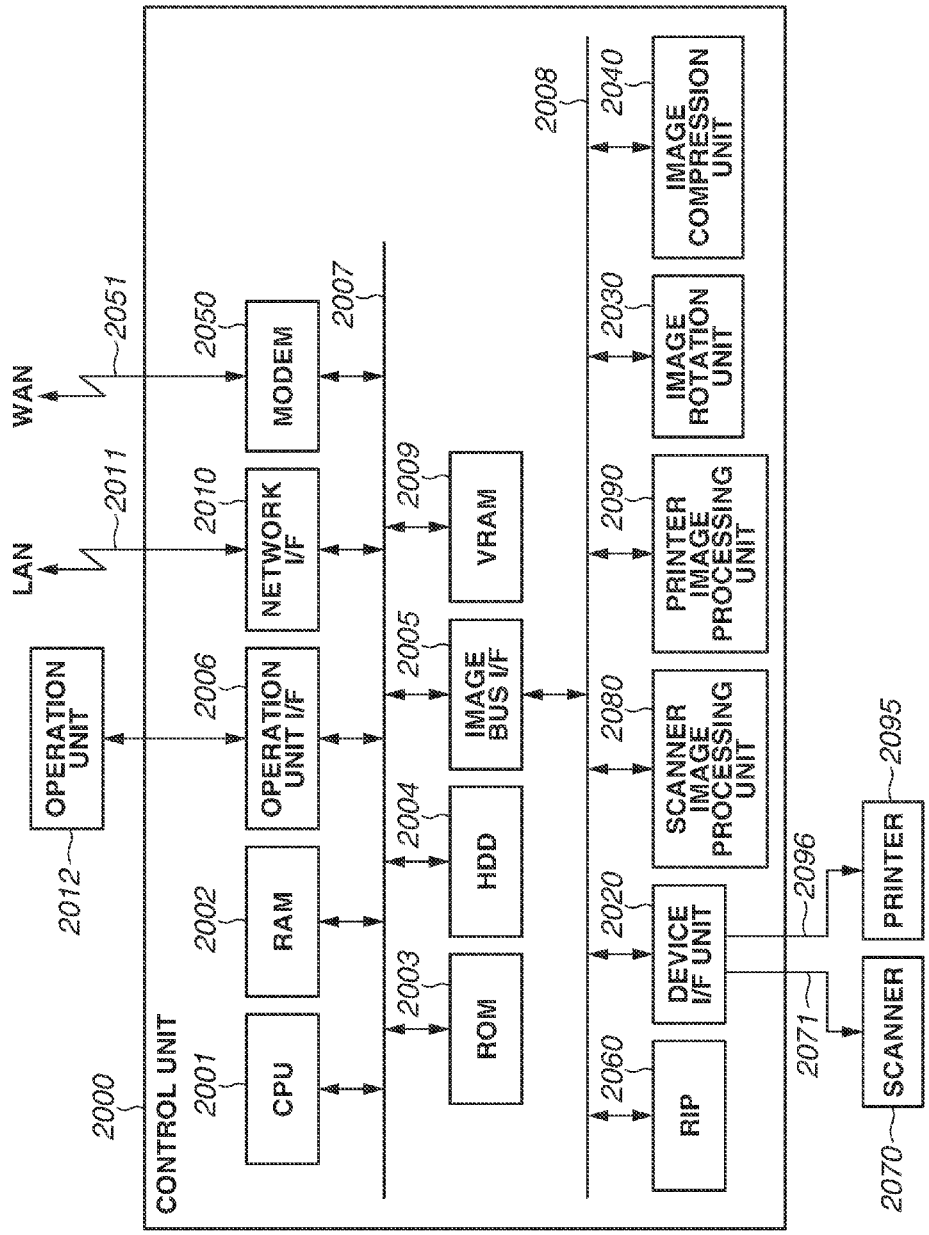
FIG. 14 illustrates an example of a configuration of a control unit of an image forming apparatus according to the fourth to sixth exemplary embodiments.

FIG. 14 illustrates an example of a configuration of the control unit 2000 of the image forming apparatus 2200 according to the fourth to sixth exemplary embodiments that is illustrated in FIG. 13. In FIG. 14, the same units as the units illustrated in FIG. 13 are assigned the same reference numerals.

The control unit 2000 is connected to the scanner 2070 that is the image input device, and the printer 2095 that is the image output device. Further, the control unit 2000 is connected to the LAN 2011 and a public line (wide area network (WAN)) 2051, thereby inputting and outputting image information and device information from and to an external apparatus.

A CPU 2001 is a controller that controls the entire image forming apparatus 2200. A RAM 2002 is a work memory that allows the CPU 2001 to operate, and is also an image memory for temporarily storing image data. A ROM 2003 functions as a boot ROM, and stores a boot program of the image forming apparatus 2200. An HDD 2004 stores a software program, image data, and the like. The CPU 2001 loads the program stored in the ROM 2003 or the HDD 2004 into the RAM 2002 to execute it, thereby realizing the software configuration (including an OS) of the image forming apparatus 2200 and processing (information processing) illustrated in flowcharts to be described below.

An operation unit I/F 2006 functions as an interface unit to the operation unit 2012, and outputs image data to be displayed on the operation unit 2012 to the operation unit 2012. Further, the operation unit I/F 2006 notifies the CPU 2002 of instruction information input by a user via the operation unit 2012. A video RAM (VRAM) 2009 is a memory storing display screen data generated by the CPU 2001. More specifically, the CPU 2001 generates screen information based on display data acquired from the HDD 2004, and stores image data arranged so as to be displayed on the operation unit 2012, into the VRAM 2009. A network I/F 2010 is connected to the LAN 2011, and inputs and outputs information from and to an external apparatus. A modem 2050 is connected to the WAN 2051, and inputs and outputs information from and to an external apparatus. The above-described devices are disposed on a system bus 2007.

An image bus I/F 2005 is a bus bridge that connects the system bus 2007 to an image bus 2008 capable of transferring image data at a high speed, and converts a data structure. The image bus 2008 is embodied by a Peripheral Component Interconnect (PCI) bus or Institute of Electrical and Electronics Engineers (IEEE) 1394. The following devices are disposed on the image bus 2008. A raster image processor (RIP) 2060 rasterizes a Program Design Language (PDL) code into a bitmap image. A device I/F unit 2020 connects the CPU 2001 to the scanner 2070 connected via an image input unit interface 2071 and to the printer 2095 connected via a print unit interface 2096, and converts image data synchronously or asynchronously. A scanner image processing unit 2080 corrects, processes, and edits input image data. A printer image processing unit 2090, for example, corrects the printer 2095 and converts a resolution for print output image data. An image rotation unit 2030 rotates image data. An image compression unit 2040 compresses and decompresses multivalued image data according to the Joint Photographic Experts Group (JPEG) method, and compresses and decompresses binarized image data according to the Joint Bi-level Image Experts Group (JBIG) method, the Modified Modified READ (MMR) method, or the Modified Huffman (MH) method.

Figure 15:
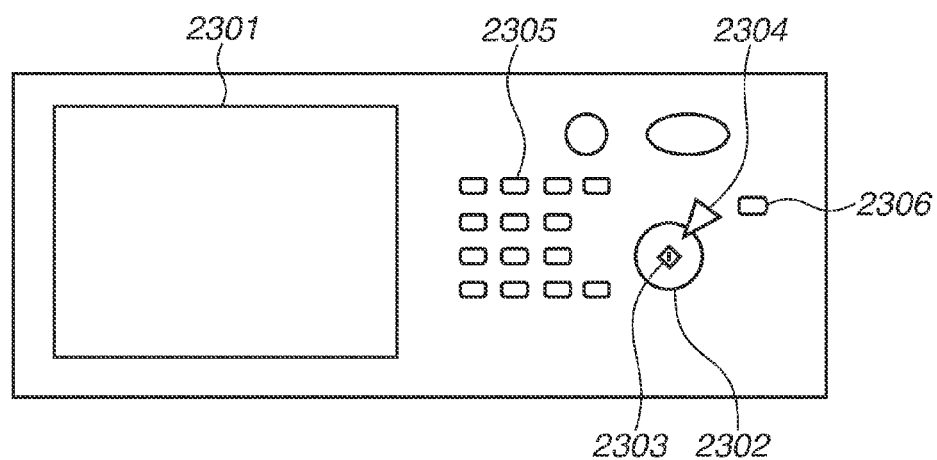
FIG. 15 illustrates an example of a device configuration of an operation unit according to the fourth to sixth exemplary embodiments.

FIG. 15 illustrates an example of a device configuration of the operation unit 2012. A liquid crystal display unit 2301 includes a touch panel sheet attached on a liquid crystal display, thereby displaying an operation screen of the system and soft keys while notifying the CPU 2001 of position information about a certain displayed key when the key is pressed. A start key 2302 is a key that a user presses to start an operation of reading an image on a document, for example. The start key 2302 includes light-emitting diodes (LEDs) 2303 of two colors, i.e., green and red, at a central portion thereof, and indicates whether the start key 2302 is ready to be used, with use of these colors. A stop key 2304 is a key that the user presses to stop an operation of the image forming apparatus 2200 in progress. A numeric keypad 2305 includes a group of numeric buttons and character buttons, and includes keys that the user presses to set the number of copies and to instruct the image forming apparatus 2200 to switch a screen on the liquid crystal display unit 2301. A user mode key 2306 is a key that the user presses to configure device settings.

Figure 16:
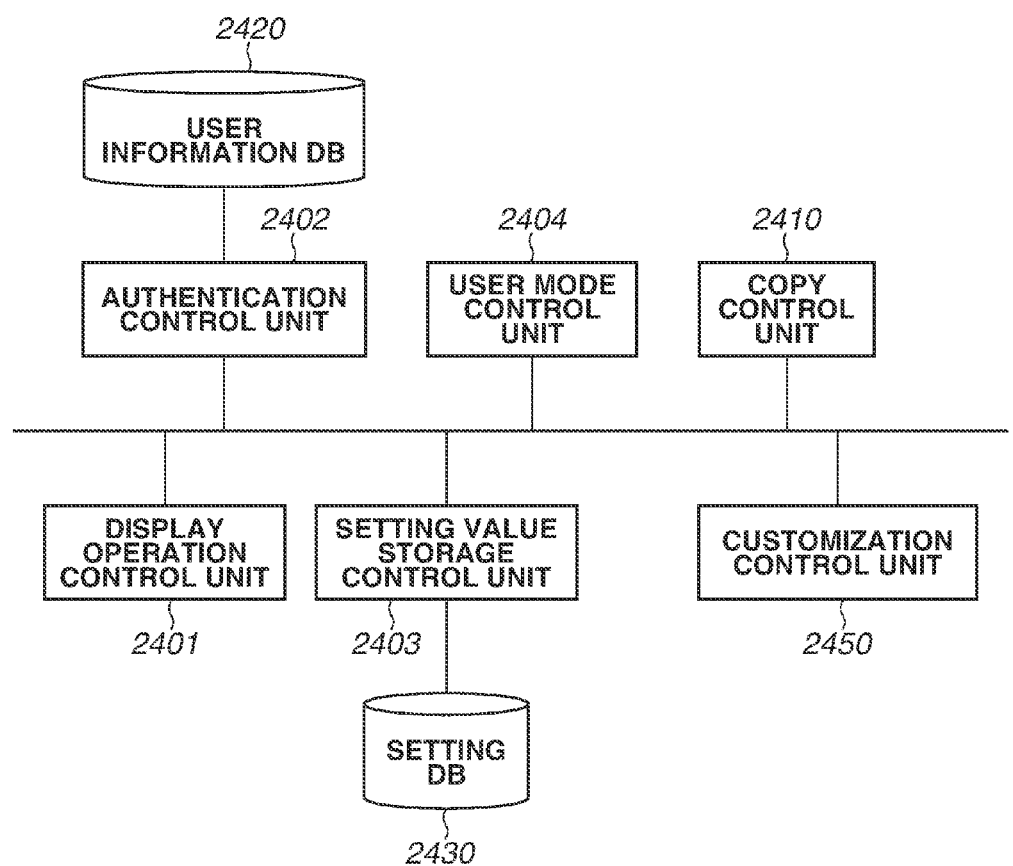
FIG. 16 illustrates an example of a software configuration of the image forming apparatus according to the fourth to sixth exemplary embodiments.

FIG. 16 illustrates an example of a software configuration of the image forming apparatus 2200. A program corresponding to each control unit illustrated in FIG. 16 is stored in the HDD 2004 or the like, and is loaded into the RAM 2002 to be executed by the CPU 2001 as necessary at the time of a startup, use of a function, and the like. This realizes each control unit illustrated in FIG. 16. The image forming apparatus 2200 includes control units such as a display operation control unit 2401, an authentication control unit 2402, a setting value storage control unit 2403, and a user mode control unit 2404.

The image forming apparatus 2200 has one or more function(s) (hereinafter referred to as Function(s)). A control unit is prepared for each of the Functions, and a copy control unit 2410 is illustrated as an example thereof (FIG. 16). It is apparent that control units are respectively prepared for the Functions involved in the processing of the image forming apparatus 2200 other than the Function illustrated in FIG. 16. Examples of the other Functions include a secure print Function that has a function of reserving a print job input from a driver in the image forming apparatus 2200, and allowing only an authenticated user or a user who knows a password associated with the input print job to print the data. Further, the examples of the other Functions include a box Function that has a function of storing image data into the image forming apparatus 2200, and a help Function that has a function of displaying a help screen, and a fax Function of receiving a fax document from a public communication network.

The display operation control unit 2401 controls the operation unit I/F 2006. For example, the display operation control unit 2401 performs display on the liquid crystal display unit 2301 via the operation unit I/F 2006 based on an instruction from another control unit, and acquires instruction information input by a user via the liquid crystal display unit 2301. The display operation control unit 2401 notifies each control unit of the acquired information as necessary. The authentication control unit 2402 performs authentication processing for identifying a user (hereinafter referred to as a login), and determines whether an operator of the image forming apparatus 2200 is a valid user of the image forming apparatus 2200. Further, the authentication control unit 2402 controls a database storing user information (hereinafter referred to as a user information database (DB) 2420) in the HDD 2004.

Figure 17:
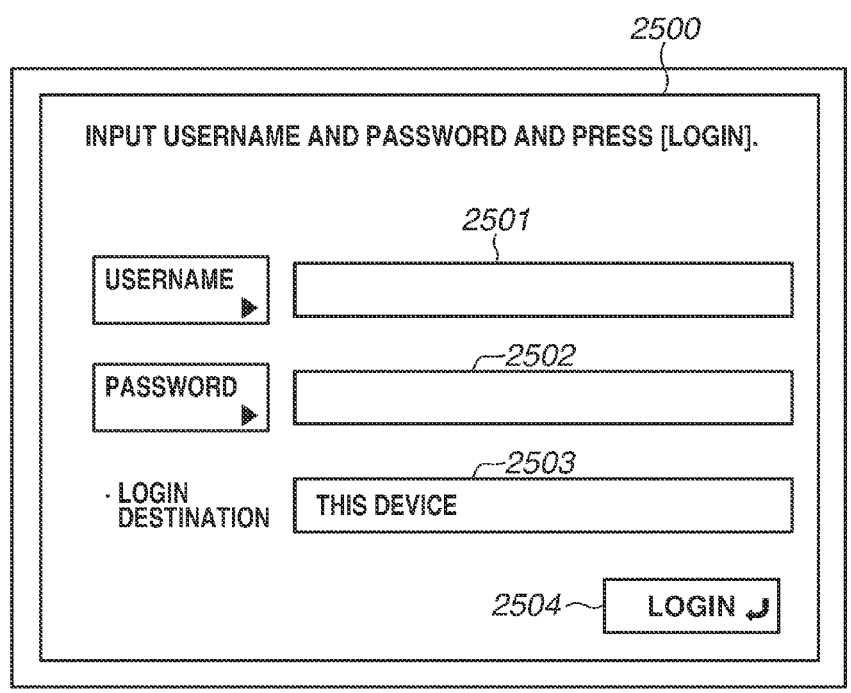
FIG. 17 illustrates an example of a login screen according to the fourth to sixth exemplary embodiments.

FIG. 17 illustrates an example of a login screen for receiving the login processing. In the screen example illustrated in FIG. 17, a login screen 2500 includes a username input form 2501, a password input form 2502, a login destination selection button 2503, and a login button 2504. On the login screen 2500, a user inputs a username and a password into the username input form 2501 and the password input form 2502, respectively. Further, the user selects a login destination with use of the login destination selection button 2503, and selects (or presses) the login button 2504. As a result, the display operation control unit 2401 receives a login request.

Figure 18:
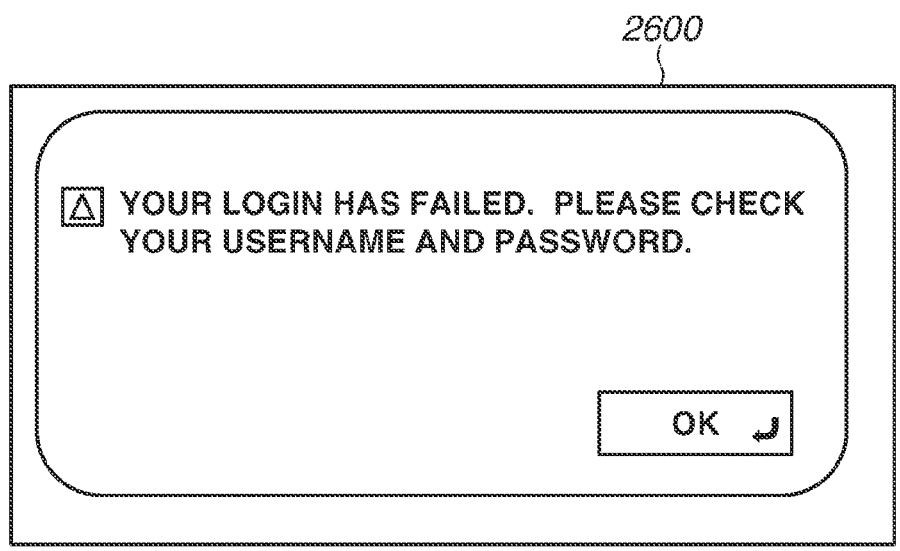
FIG. 18 illustrates an example of a display at the time of a login error according to the fourth to sixth exemplary embodiments.

The authentication control unit 2402 receives the input username and password from the display operation control unit 2401, and verifies whether the received username and password match a username and a password stored in the user information DB 2420. If the received username and password do not match the stored username and password as a result of the verification, the authentication control unit 2402 determines that the login has failed, and notifies the user that the login has failed with use of a screen 2600 as illustrated in FIG. 18 via the display operation control unit 2401. FIG. 18 illustrates an example of the screen indicating that the login has failed. On the other hand, if the received username and password match the stored username and password as a result of the verification, the authentication control unit 2402 determines that the authentication has succeeded, and then changes an authentication state from a not-login state to a login state, and issues an identifier for uniquely identifying the user (hereinafter referred to as a user identifier). The authentication control unit 2402 performs processing for reflecting a personal setting value that will be described below, via the setting value storage control unit 2403 to be described below. The processing for reflecting the personal setting value will be described in detail in descriptions of step S1506 and the like illustrated in FIG. 26 to be described below. The authentication control unit 2402 notifies the user that the login has succeeded via the display operation control unit 2401, and then ends the login processing.

The authentication method is not limited thereto, and may be another authentication method such as the one using a noncontact integrated circuit (IC) card. Further, the image forming apparatus 2200 may be configured in such a manner that the authentication is performed with use of an external authentication server, for example, like Active Directory (AD), instead of preparing the user information DB 2420 in the image forming apparatus 2200. In this case, the authentication control unit 2402 requests authentication verification from the external authentication server via the network I/F 2010. Further, the image forming apparatus 2200 may be configured to be able to switch the user information DB 2420 in the image forming apparatus 2200 and the external authentication server. In a case where the image forming apparatus 2200 is configured in this manner, for example, the user selects which authentication server the user requests to perform the authentication, with use of the login destination selection button 2503 on the screen as illustrated in FIG. 17.

Changing the login state to the not-login state is referred to as a logout. Upon receiving a logout instruction from the user via the liquid crystal display unit 2301, the authentication control unit 2402 changes the authentication state from the login state to the not-login state. The authentication control unit 2402 performs processing for reflecting a setting value of a common setting that will be described below, via the setting value storage control unit 2403 to be described below. The processing for reflecting the setting value of the common setting will be described in detail in descriptions of step S1507 and the like illustrated in FIG. 26 to be described below.

Further, the authentication control unit 2402 provides a function of, for example, registering, deleting, and updating the user information. Further, the authentication control unit 2402 stores the user identifier for uniquely identifying a user in the user information DB 2420.

Next, the setting value storage control unit 2403 will be described. The setting value storage control unit 2403 is a control unit for storing the common setting information and the personal setting information into a setting DB 2430. The common setting information is setting information to which all users refer. The personal setting information is setting information to which only each user can refer. Each type of setting information contains at least one set of a setting item and a setting value set for the setting item. The setting value storage control unit 2403 stores each type of setting information in the setting DB 2430 in the HDD 2004. A set of a key for identifying the setting item, and the setting value is stored in the setting DB 2430 as the setting information. The setting DB 2430 is expressed by a hierarchical structure. Information about the target is included in a first hierarchical level. The target contains information for identifying whether the setting information is the common setting information or the personal setting information, and in the case of the personal setting, the target further contains any of user identifiers 21401a to 21401c (FIGS. 19A, 19B, and 19C) that are identifiers for identifying respective users. In FIGS. 19A, 19B, 19C, and 19D, "common" is set as the information for identifying the common setting information, and "usernames" are used as the user identifies 21401a to 21401c for the purpose of illustration. A corresponding setting value is determined based on a combination of the target and the key. As illustrated in FIGS. 19A, 19B, 19C, and 19D, the personal setting information is set in the setting DB 2430 while being associated with the user identification information.

Figure 19A:
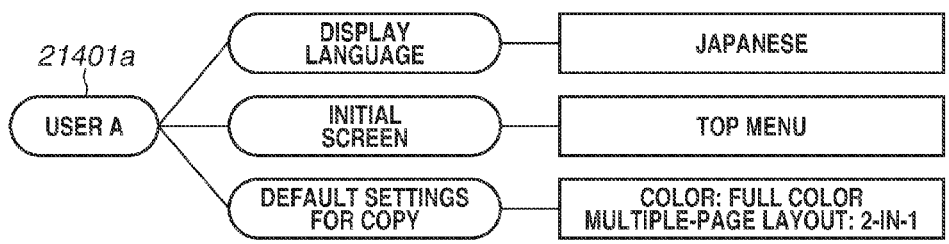
FIG. 19A illustrates an example of personal setting information according to the fourth to sixth exemplary embodiments.
Figure 19B:
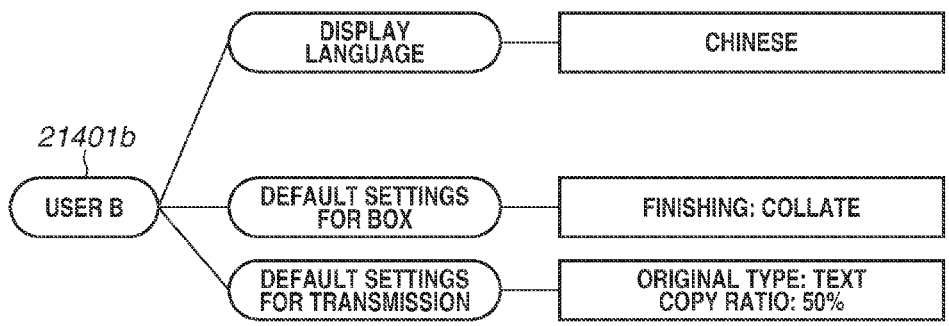
FIG. 19B illustrates an example of personal setting information according to the fourth to sixth exemplary embodiments.
Figure 19C:
FIG. 19C illustrates an example of personal setting information according to the fourth to sixth exemplary embodiments.
Figure 19D:
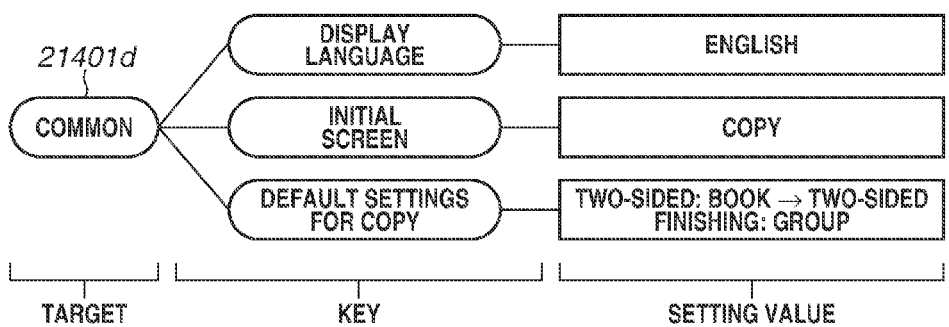
FIG. 19D illustrates an example of common setting information according to the fourth to sixth exemplary embodiments.

In the example illustrated in FIG. 19A, the setting value corresponding to the target "User A" and the key "display language" is "Japanese". The setting value corresponding to the target "User B" and the key "display language" is "Chinese". As another example, the setting value corresponding to the target "User B" and a key "default settings for transmission" is "original type: text, and copy ratio: 50%". While the personal setting information is stored for each user and the same number of personal setting information pieces as the number of users are stored, the common setting information is only a single piece of setting information in the image forming apparatus 2200. In the example illustrated in FIG. 19D, the setting value corresponding to the target "common" and the key "display language" is "English".

Among the setting information pieces in the setting DB 2430, some personal setting information pieces have the same key as the common setting information, and other personal setting information pieces do not have the same key as the common setting information. For the personal setting information having the same key, the common setting value may be handled as an initial value of a case where the personal setting value is not registered. Referring to the setting information illustrated in FIG. 19C by way of example, the personal setting value of the key "display language" is not registered for the target "User C". In this case, "English", which is the common setting value, is employed as the setting value of the display language for the user C.

The setting value storage control unit 2403 reads the personal setting value in the setting DB 2430 when a user logs in, and reflects the personal setting value into each setting information piece of the image forming apparatus 2200. Therefore, the user can use the image forming apparatus 2200 customized according to the personal setting information registered by the user himself/herself. Further, the setting value storage control unit 2403 reads the common setting value in the setting DB 2430 when the user logs out, and reflects the common setting value into each setting information piece of the image forming apparatus 2200.

Therefore, a function permitted to be used in the not-login state can be used according to the common setting value.

Next, the user mode control unit 2404 will be described. The user mode control unit 2404 has a function of registering and changing the setting values in the common setting information and the personal setting information (hereinafter referred to as a user mode). The user mode control unit 2404 displays a setting change screen for changing each common setting value and each personal setting value, on the liquid crystal display unit 2301. FIGS. 20A, 20B, 20C, 20D, and 20E each illustrate an example of the screen of the user mode. The user mode screen expresses each setting in a hierarchical structure. When an "ENVIRONMENT SETTINGS" button 2711 is pressed on a top hierarchal screen 2710, the screen transitions to an environment setting change screen 2720. Further, when a "DISPLAY SETTINGS" button 2721 is pressed, the screen transitions to a display setting change screen 2730. When a "CHANGE DISPLAY LANGUAGE/KEYBOARD" button 2731 is pressed on the display setting change screen 2730, the screen transitions to a display language setting change screen 2800 for changing the setting value of the display language. On the display language setting change screen 2800, a user selects an arbitrary language from a language selection list 2801 to set the selected language as the setting value of the display language. Further, when a "SCREEN TO BE DISPLAYED AFTER STARTUP/RECOVERY" button 2732 is pressed on the display setting change screen 2730, the screen transitions to an initial screen setting change screen 2810 for changing the setting value of the initial screen. On the initial screen setting change screen 2810, the user selects an arbitrary screen from an initial screen selection list 2811 to set the selected screen as the initial screen.

When the user issues an instruction to change the setting value on each setting change screen, the user mode control unit 2404 transfers the setting value of the target to the setting value storage control unit 2403. The setting value storage control unit 2403 reflects the changed setting value into the setting DB 2430. At this time, the setting value storage control unit 2403 reflects the setting value as the personal setting value in a case where the authentication control unit 2402 determines that the user is in the login state. On the other hand, the setting value storage control unit 2403 reflects the setting value as the common setting value in a case where the authentication control unit 2402 determines that the user is in the not-login state.

Further, the items the settings of which can be changed in the user mode may include an item that only a user having a special authority can set. For example, a user having an administrator authority of the image forming apparatus 2200, or the like can change both the setting value of the common setting information and the setting value of the personal setting information, while a user having a general user authority can change only the personal setting value for the user himself/herself. Alternatively, the image forming apparatus 2200 may be configured to allow the user having the general user authority to change the common setting value of a part of the items among the items in the common setting information. As a result, the image forming apparatus 2200 can improve the convenience of the general user while satisfying the demand from the administrator. It is apparent that the image forming apparatus 2200 may be configured in such a manner that the special authority can be set to a plurality of users.

Next, the copy control unit 2410 will be described. The copy control unit 2410 controls a function of reading a paper document to copy and print it (hereinafter referred to as the copy function). The copy control unit 2410 reads image data from the scanner 2070, performs image processing on the read image data by the scanner image processing unit 2080, and outputs the image-processed image data to the printer 2095.

Examples of setting information for the copy function include layout (N-in-1) setting information for specifying whether to create a single sheet of copy image from N sheets of document, and two-sided setting information for specifying whether to read one side or two sides of a document. Further, other examples of the setting information for the copy function include color mode setting information for specifying a color to print image data such as full color, monochrome, and a single color. These setting items used when the copy function is carried out are referred to as job setting information. Further, an initial value originally set on a copy job setting screen 2900 for specifying the job setting information for the copy function (FIG. 21A) is referred to as a default job setting value. When a tool button 2901 is pressed on the copy job setting screen 2900, the user mode control unit 2404 displays a default setting change screen 2910. Further, when a "REGISTER" button 2911 is selected, the user mode control unit 2404 displays a setting change confirmation list screen 2920, and displays the default job setting value currently set as the copy function in a setting change confirmation list 2921. When a user presses a "YES" button 2922 on the setting change confirmation list screen 2920, the user mode control unit 2404 registers the setting value into the setting DB 2430. Assume that the registration instruction from the user also contains information for specifying whether the setting value should be registered as the common setting value or the personal setting value.

If the personal setting information is registered in the setting DB 2430, the copy control unit 2410 reads the default job setting value in the personal setting information, and displays the read default job setting value on the copy job setting screen 2900. On the other hand, if the personal setting information is not registered in the setting DB 2430, the copy control unit 2410 reads the default job setting value in the common setting information, and displays the read default job setting value on the copy job setting screen 2900. Further, a user can also set the default job setting value for not only the copy function but also another Function. Further, the copy function includes a function of storing a history of the job setting information used when a user carries out the copy function, and reading the job setting information stored in the history, via the copy job setting screen 2900 (hereinafter referred to as a call function). The call function can store a plurality of job setting information pieces, but assume that the call function can store three job setting information pieces at most as an upper limit by way of example. The copy control unit 2410 stores the job setting information into the setting DB 2430 every time the user carries out the copy function, like storing them as the last history, the second last history, and the third last history, and then deletes the job setting information from the oldest history over the upper limit.

Figure 22:
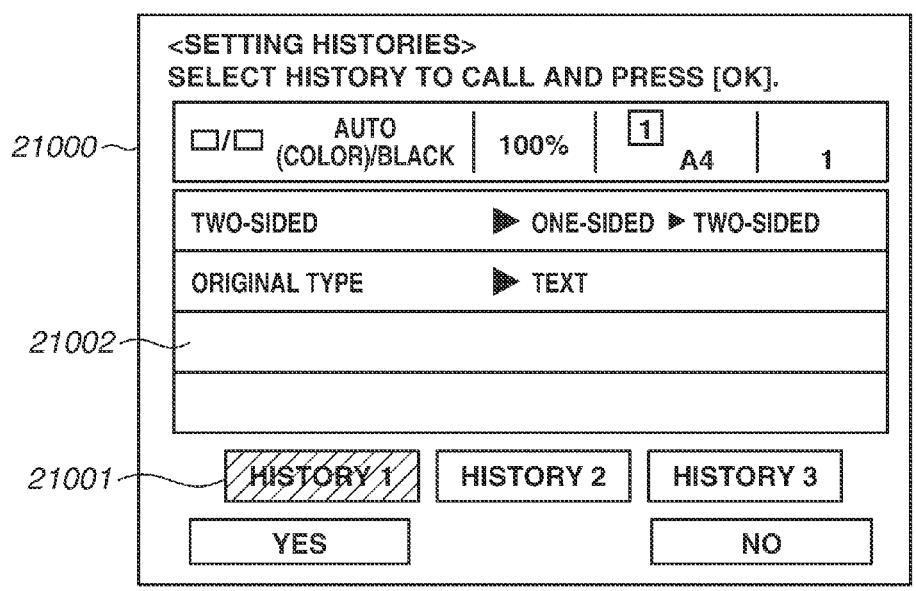
FIG. 22 illustrates an example of a call screen for calling a history of a job setting according to the fourth to sixth exemplary embodiments.
Figure 23A:
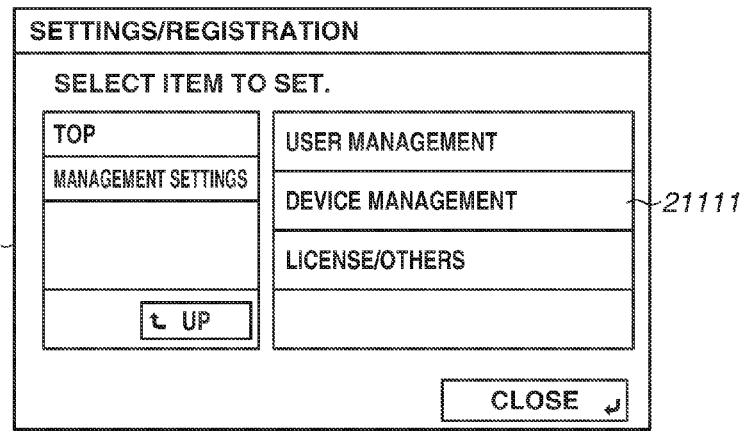
FIG. 23A is a diagram (a first diagram) illustrating an example of a customization setting screen according to the fourth to sixth exemplary embodiments.
Figure 23B:
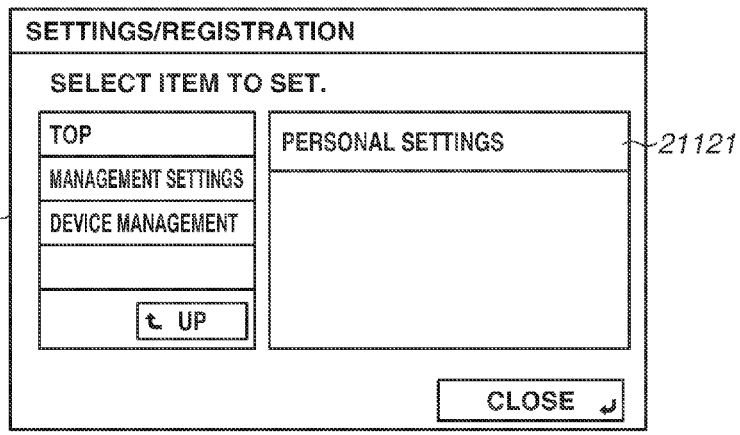
FIG. 23B is a diagram (a first diagram) illustrating an example of a customization setting screen according to the fourth to sixth exemplary embodiments.
Figure 23C:
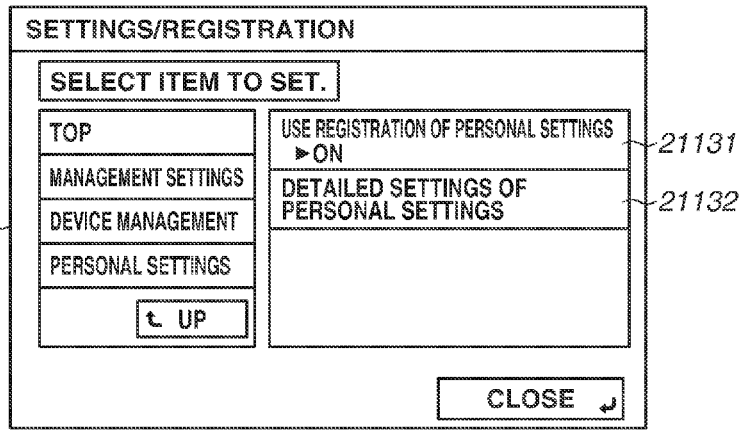
FIG. 23C is a diagram (a first diagram) illustrating an example of a customization setting screen according to the fourth to sixth exemplary embodiments.
Figure 24:
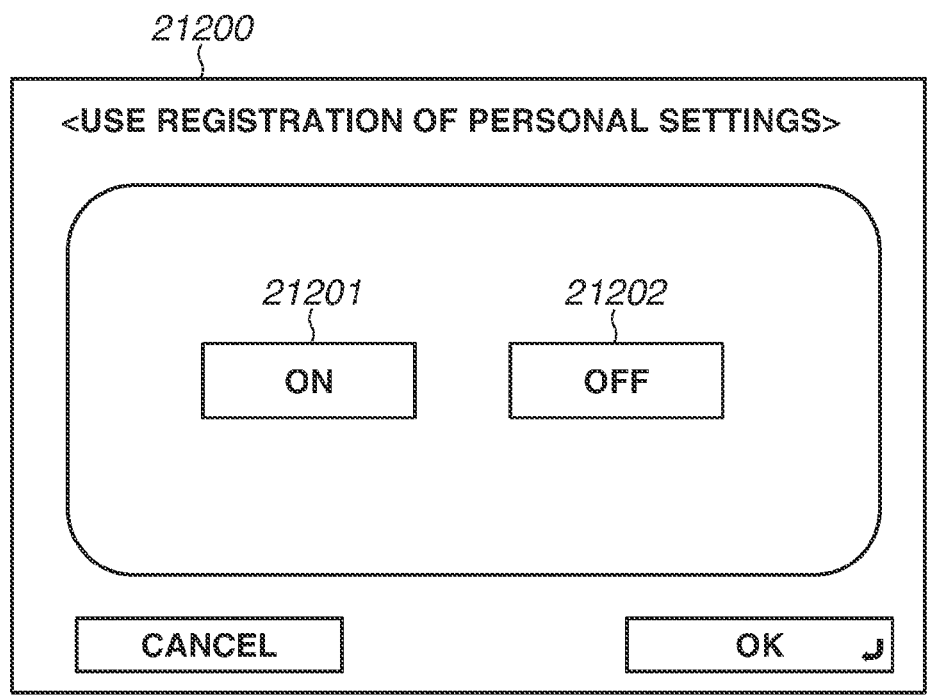
FIG. 24 is a diagram (a second diagram) illustrating an example of a customization setting screen according to the fourth to sixth exemplary embodiments.

FIG. 22 illustrates an example of a call screen for calling the history of the job setting information. A call screen 21000 includes call history specifying buttons 21001, and a job setting confirmation list 21002. The call history specifying buttons 21001 are buttons for a user specifying how many previous history is to be called. In the example illustrated in FIG. 22, the last history, the second last history, and the third last history are called by selecting "HISTORY 1", "HISTORY 2", and "HISTORY 3", respectively. The content of the job setting information corresponding to each history is displayed in the job setting confirmation list 21002. In the example illustrated in FIG. 22, the setting value of two-sided information is set to "from one-sided to two-sided", and the setting value of original type information is set to "text" in the job setting information corresponding to "HISTORY 1". When the user carries out the copy function, the copy control unit 2410 stores the history of the job setting information as the common setting information to which all of the users can refer, and/or stores the history of the job setting information as the personal setting information to which only the corresponding user can refer. The copy control unit 2410 may store the history of the job setting information as both the common setting information and the personal setting information, or may store the history of the job setting information as only either one of the common setting information and the personal setting information depending on a mode. Further, the image forming apparatus 2200 can store the history of the job setting information for not only the copy function but also another Function. The image forming apparatus 2200 may store the history for each Function, or may store the history as a common history shared among all of the Functions.

Next, a customization control unit 2450 will be described. The customization control unit 2450 imposes a restriction about whether a setting of a customization target item can be changed as the personal setting value. When the setting of the customization target item can be set as the personal setting value, the customization control unit 2450 performs the processing for reflecting the personal setting value according to the authentication by the authentication control unit 2402.

Figure 20A:
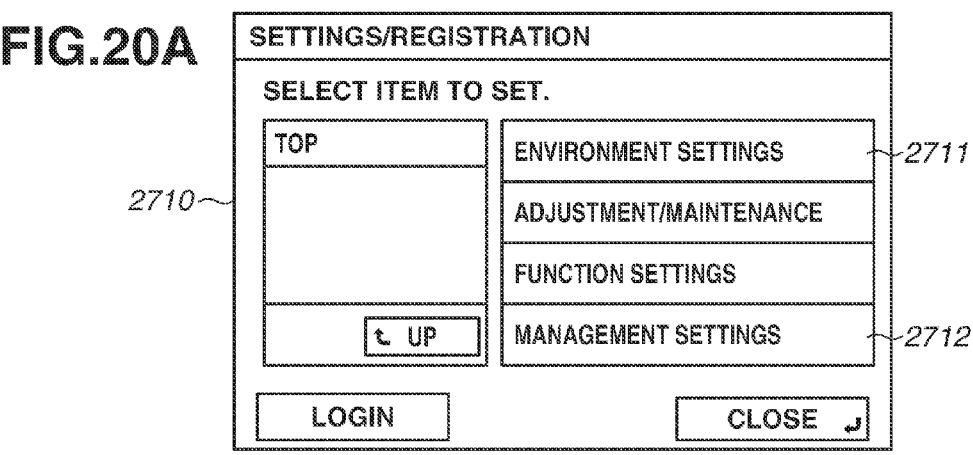
FIG. 20A illustrates an example of a user mode screen according to the fourth to sixth exemplary embodiments.
Figure 20B:
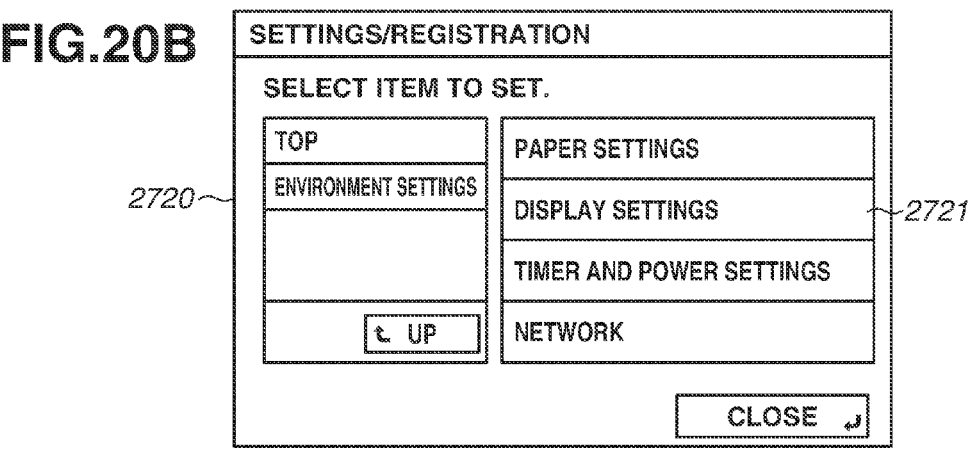
FIG. 20B illustrates an example of a user mode screen according to the fourth to sixth exemplary embodiments.
Figure 20C:
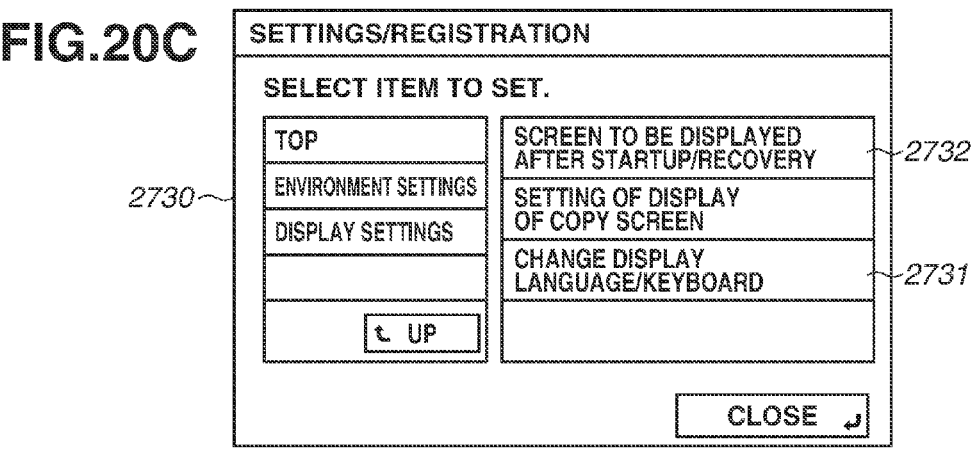
FIG. 20C illustrates an example of a user mode screen according to the fourth to sixth exemplary embodiments.
Figure 20D:
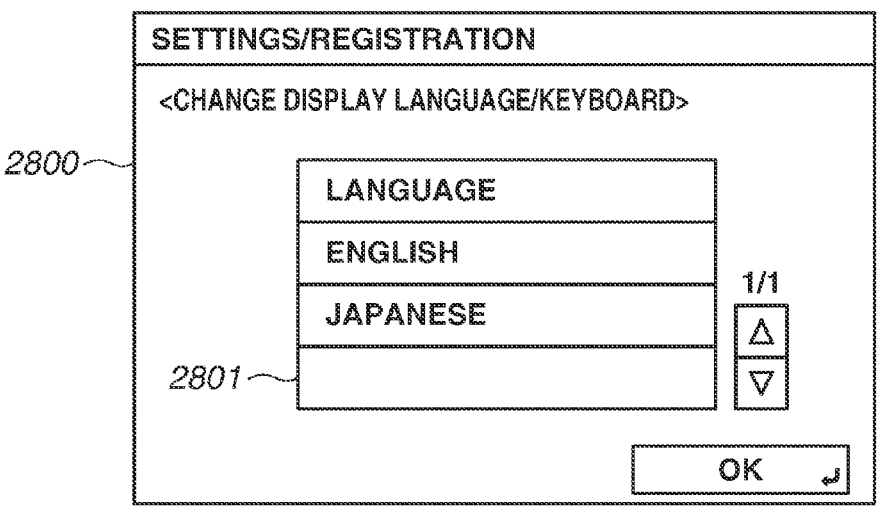
FIG. 20D illustrates an example of a user mode screen according to the fourth to sixth exemplary embodiments.
Figure 20E:
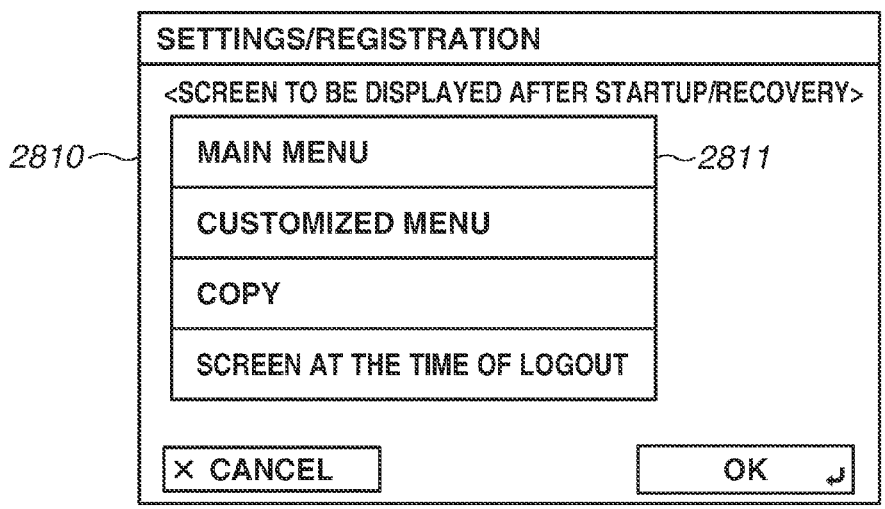
FIG. 20E illustrates an example of a user mode screen according to the fourth to sixth exemplary embodiments.
Figure 21A:
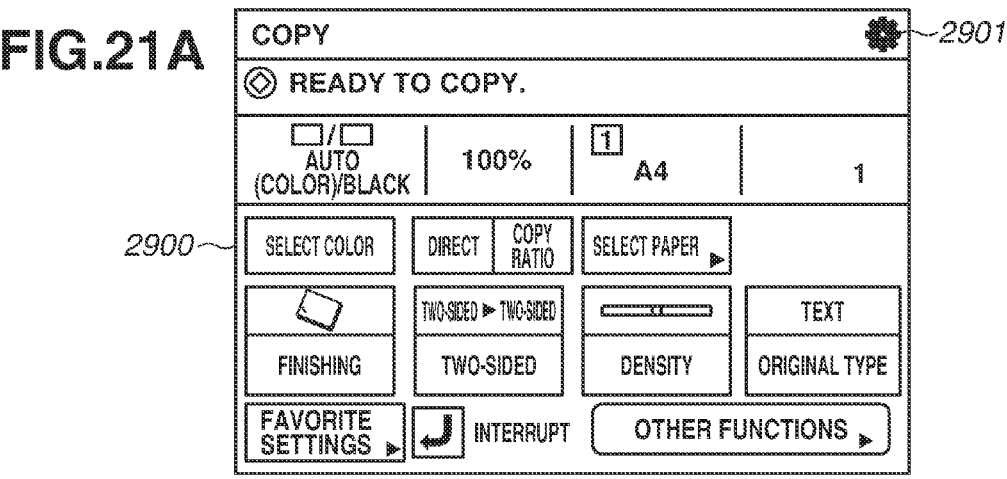
FIG. 21A illustrates an example of a copy job setting screen according to the fourth to sixth exemplary embodiments.
Figure 21B:
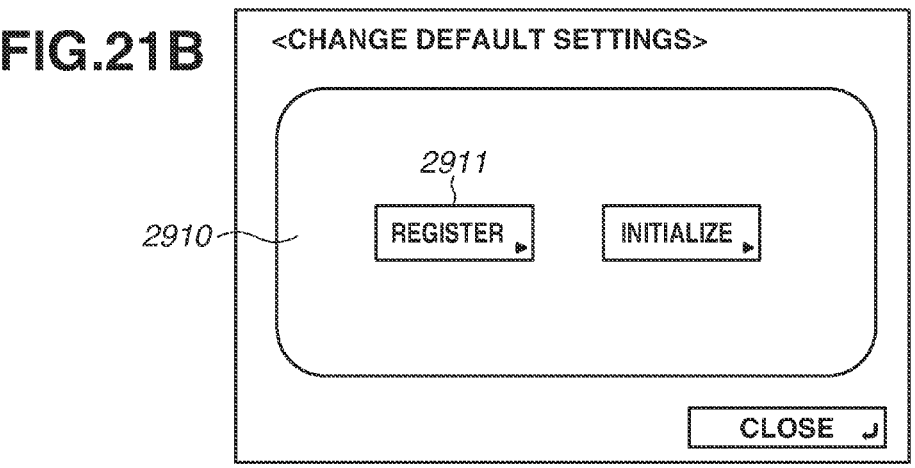
FIG. 21B illustrates an example of a copy job setting screen according to the fourth to sixth exemplary embodiments.
Figure 21C:
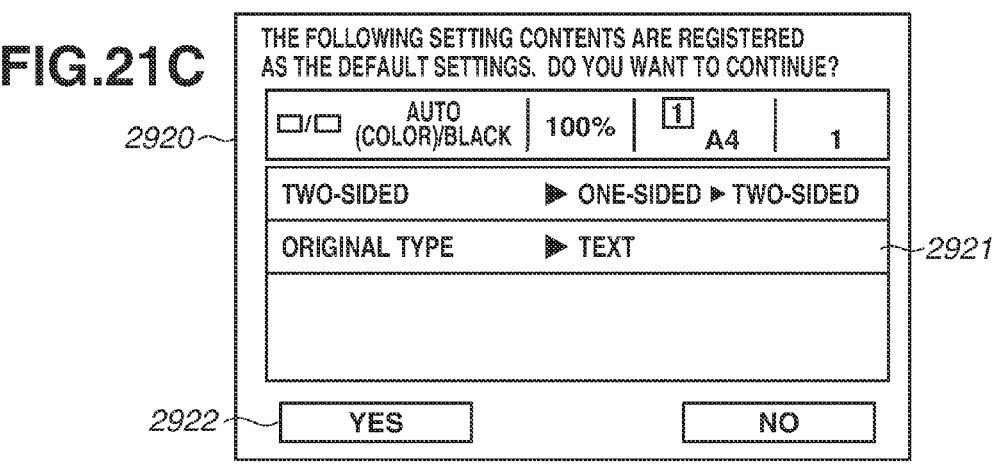
FIG. 21C illustrates an example of a copy job setting screen according to the fourth to sixth exemplary embodiments.

Screens for configuring a customization setting will be described with reference to FIGS. 23A, 23B, 23C, 24, and 25. When a "MANAGEMENT SETTINGS" button 2712 is pressed on the above-described top hierarchical screen 2710 of the user mode that is illustrated in FIG. 20A, the screen transitions to a management setting change screen 21110 illustrated in FIG. 23A. Further, when a "DEVICE MANAGEMENT" button 21111 is pressed, the screen transitions to a device management change screen 21120. A "PERSONAL SETTINGS" button 21121 on the device management change screen 21120 can be pressed only by the user having the administrator authority of the image forming apparatus 2200 that is successfully authenticated by the authentication control unit 2402. When the device management change screen 21120 is displayed by a user who does not have the administrator authority, the "PERSONAL SETTINGS" button 21121 is grayed out or is not displayed, thereby prohibiting the user from selecting this button. When the "PERSONAL SETTINGS" button 21121 is pressed, the screen transitions to a personal setting change screen 21130. When a "USE REGISTRATION OF PERSONAL SETTINGS" button 21131 is pressed on the personal setting change screen 21130, a customization setting screen 21200 (FIG. 24) is displayed. The customization setting screen 21200 is an example of a first setting screen.

The user having the administrator authority can set permission or prohibition of registration regarding whether to permit or prohibit registration of the setting information in the image forming apparatus 2200 as the personal setting information, on the customization setting screen 21200. In a case where an ON button 21201 for permitting the registration of the personal setting information is selected (in the case of permission setting), the customization control unit 2450 can register the setting information of the customization target item in the image forming apparatus 2200 as the personal setting information. On the other hand, in a case where an OFF button 21202 for prohibiting the registration of the personal setting information is selected (in the case of not permission setting), the customization control unit 2450 can register all setting information pieces in the image forming apparatus 2200 as the common setting information.

Figure 25:
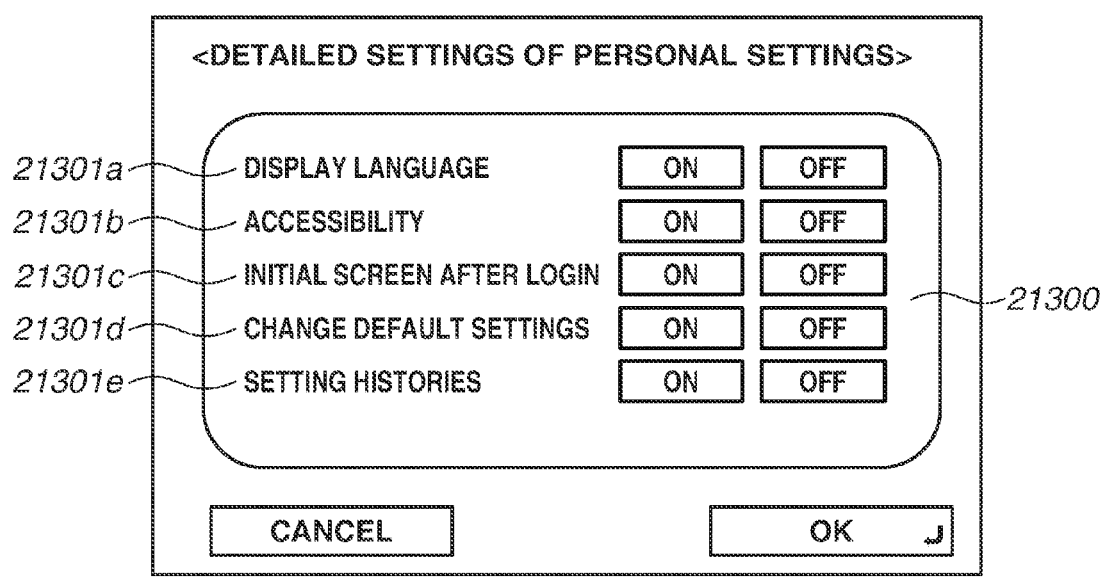
FIG. 25 is a diagram (a third diagram) illustrating an example of a customization setting screen according to the fourth to sixth exemplary embodiments.

FIG. 25 illustrates an example of a customization detailed setting screen. When a "DETAILED SETTINGS OF PERSONAL SETTINGS" button 21132 is pressed on the above-described personal setting change screen 21130 illustrated in FIG. 23C, a customization detailed setting screen 21300 illustrated in FIG. 25 is displayed. The customization detailed setting screen 21300 is an example of a second setting screen. The "DETAILED SETTINGS OF PERSONAL SETTINGS" button 21132 can be selected only when the ON button 21201 is selected on the customization setting screen 21200. When the OFF button 21202 is selected on the customization setting screen 21200, the "DETAILED SETTINGS OF PERSONAL SETTINGS" button 21132 is grayed out or is not displayed, thereby prohibiting the user from selecting this button.

On the customization detailed setting screen 21300, it can be set whether to permit or prohibit the registration of the personal setting value for each customization target item in the image forming apparatus 2200. An ON button for registering the personal setting value or an OFF button for not registering the personal setting value can be selected at each of items 21301a to 21301e of customization detailed settings, for each of the setting items that are customization targets in the image forming apparatus 2200.

The item 21301a is an item for selecting whether to register the setting value related to the display language in the user mode as the personal setting value. The item 21301b is an item for selecting whether to register a screen setting value related to accessibility such as an audio setting and a screen color reversal setting in the user mode as the personal setting value. The item 21301c is an item for selecting whether to set the screen related to the initial screen in the user mode for each user. The item 21301d is an item for selecting whether to register, as the personal setting value, the default job setting value of a job in each function such as the copy function, the transmission function, and the box function. The item 21301e is an item for selecting whether to register, as the personal setting value, the setting value to be read by the call function in each function such as the copy function and the transmission function. The customization target items illustrated in FIG. 25 are mere examples, and the customization target items may include another item that is not illustrated in FIG. 25.

By the above-described processing, the administrator can manage the customization target item while switching whether the setting can be changed as the personal setting value, for each of the setting items that are the customization targets, which makes it possible to realize both satisfaction of the demand from the administrator and improvement of the convenience of the general user. Further, the administrator can manage whether the setting can be changed as the personal setting value while separately handling the items related to the display such as the items 21301a to 21301c and the items related to the function such as the items 21301d and the 21301e, which makes it possible to further improve the convenience of both the administrator and the general user.

Figure 26:
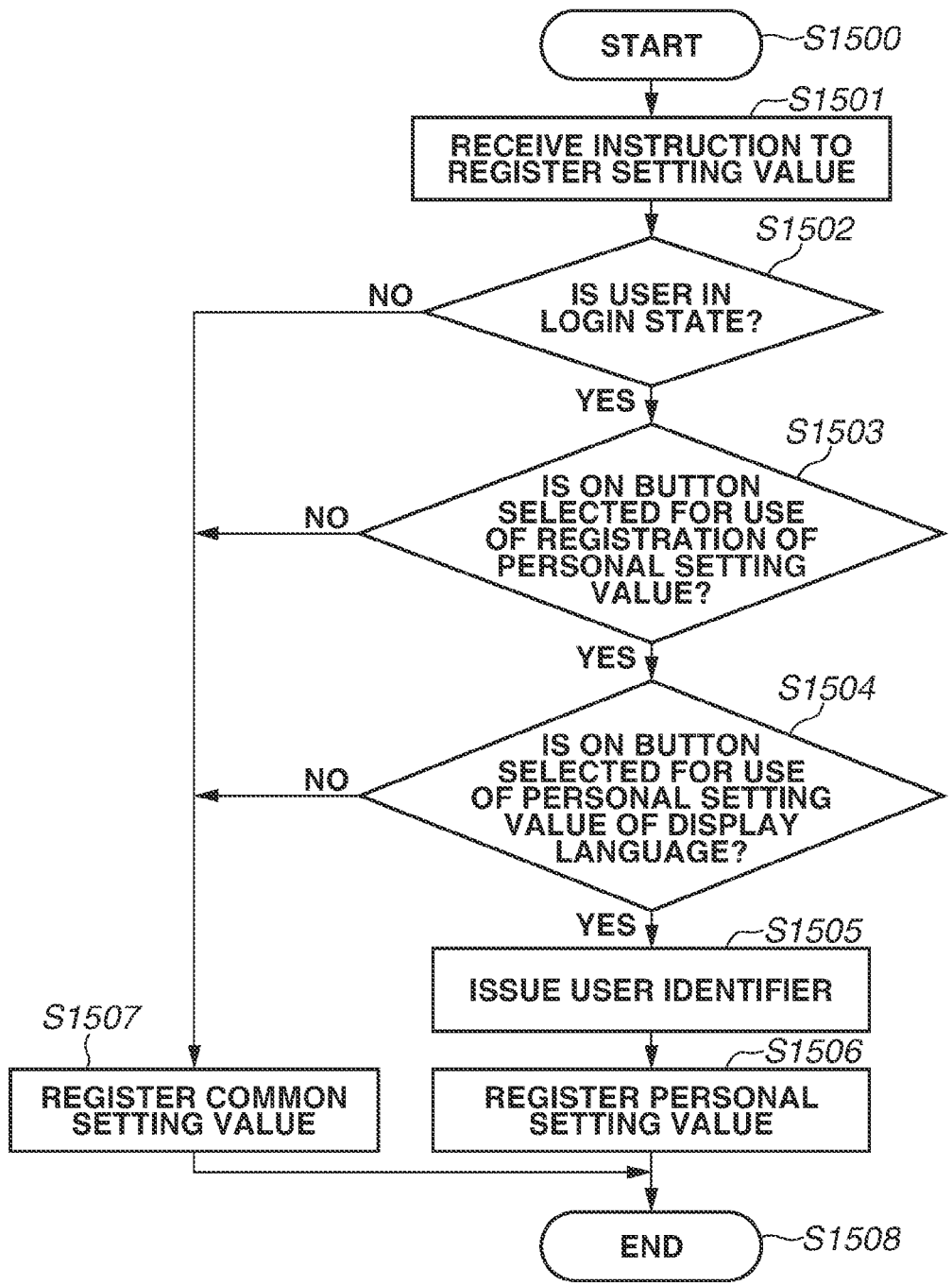
FIG. 26 is a flowchart illustrating an example of processing for registering a display language setting value according to the fourth to sixth exemplary embodiments.

FIG. 26 is a flowchart illustrating an example of processing for registering the display language setting value that is performed by the image forming apparatus 2200 according to the present exemplary embodiment. Each process illustrated in the flowchart of FIG. 26 is realized by the CPU 2001 of the image forming apparatus 2200 executing the control program stored in the ROM 2003 or the HDD 2004.

In step S1500, the display operation control unit 2401 starts the processing in a state where a job setting can be received from the liquid crystal display unit 2301.

In step S1501, the display operation control unit 2401 receives an instruction to change the setting value related to the display language setting information (a registration instruction) from a user. When the user presses the "CHANGE DISPLAY LANGUAGE/KEYBOARD" button 2731 on the display setting change screen 2730, the screen transitions to the display language setting change screen 2800. Then, the user selects an arbitrary display language from the language selection list 2801 on the display language setting change screen 2800 and presses the OK button, whereby the display operation control unit 2401 receives the instruction to change the setting value (the registration instruction).

In step S1502, the authentication control unit 2402 determines whether the user is in the login state. The authentication method has been already described above, so the description thereof is omitted here. If the authentication control unit 2402 determines that the authentication state is the login state (YES in step S1502), the processing proceeds to step S1503. If the authentication control unit 2402 determines that the authentication state is the not-login state (NO in step S1502), the processing proceeds to step S1507. This allows the image forming apparatus 2200 to set the customization restriction according to the authentication state of the user.

In step S1507, the setting value storage control unit 2403 stores the setting value of the display language setting information for which the change instruction has been received in step S1501 into the setting DB 2430 as the common setting value (the processing for reflecting the setting value). The display operation control unit 2401 may be configured to display a message or the like indicating that the setting of the common setting value is changed, on the operation unit 2012 at this time.

In step S1503, the customization control unit 2450 determines whether to register the setting information in the image forming apparatus 2200 as the personal setting information. If the ON button 21201 (register the personal setting value) is selected on the customization setting screen 21200 (YES in step S1503), the processing proceeds to step S1504. On the other hand, if the OFF button 21202 (not register the personal setting value) is selected on the customization setting screen 21200 (NO in step S1503), the processing proceeds to step S1507. The processing of step S1507 is as described above, so the description thereof is omitted here.

In step S1504, the customization control unit 2450 determines whether to register the display language setting value as the personal setting value. If the customization setting item 21301a for "DISPLAY LANGUAGE" is set to ON (register the personal setting value) in the customization detailed setting screen 21300 (YES in step S1504), the processing proceeds to step S1505. On the other hand, the item 21301a is set to OFF (not register the personal setting value) (NO in step S1504), the processing proceeds to step S1507. The processing of step S1507 is as described above, so the description thereof is omitted here.

In step S1505, the authentication control unit 2402 acquires the user identifier of the user who is currently in the login-state, from the user information DB 2420, and issues the user identifier.

In step S1506, the setting value storage control unit 2403 stores the setting value of the display language setting information received in step S1501 into the setting DB 2430 as the personal setting value of the display language setting information while associating the setting value with the user identifier issued in step S1505 (the processing for reflecting the setting value). The display operation control unit 2401 may be configured to display a message indicating that the setting of the personal setting value is changed, on the operation unit 2012 at this time.

In step S1508, the setting value storage control unit 2403 ends the processing regarding the registration of the display language setting value.

By the above-described processing, the image forming apparatus 2200 can switch whether to register the setting value for which the change instruction is received, as the common setting value or the personal setting value. More specifically, the image forming apparatus 2200 can switch which setting value the changed setting value should be registered as, according to the authentication state of the user and whether the user is permitted to use the personal setting value.

Figure 27:
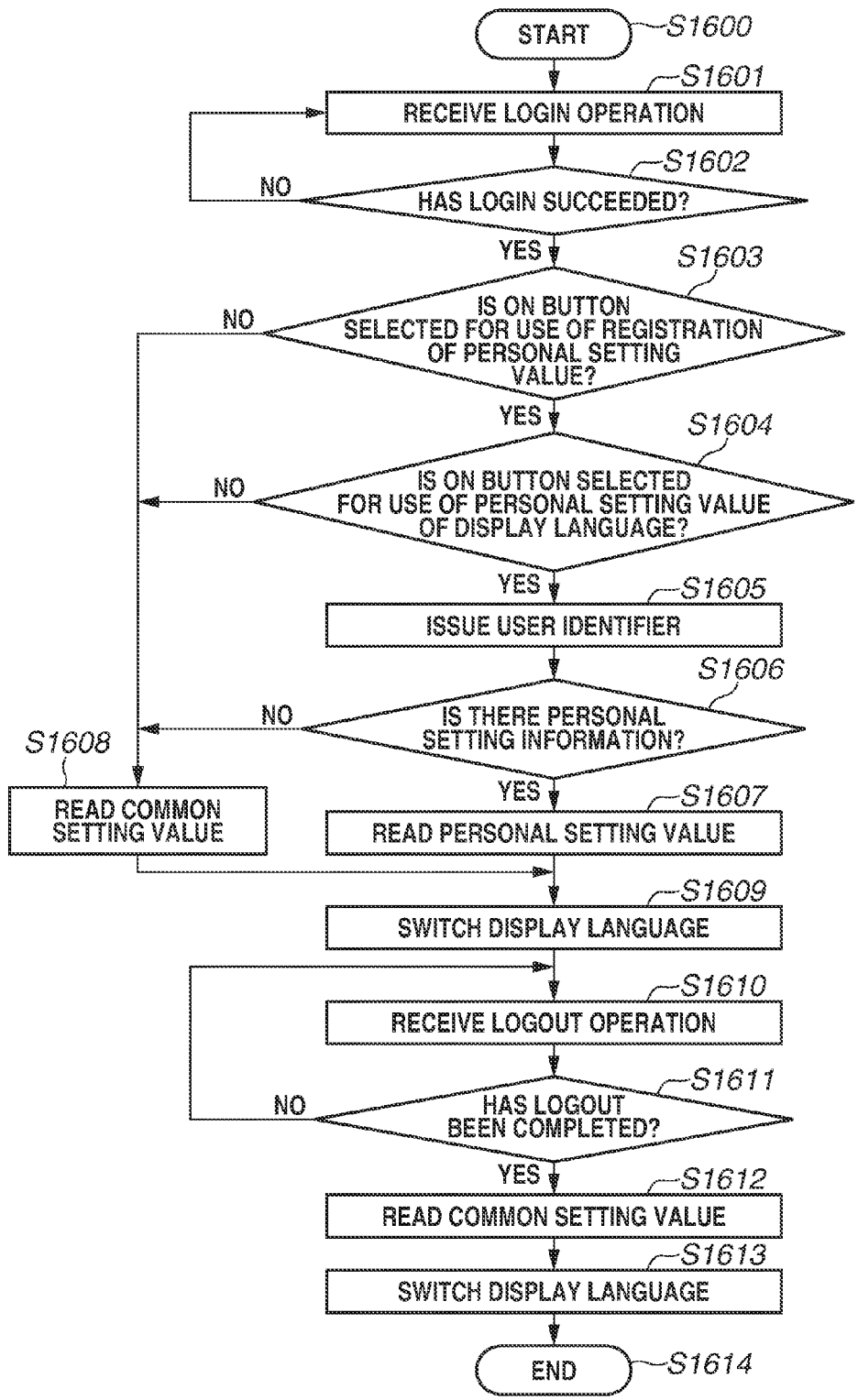
FIG. 27 is a flowchart illustrating an example of display language switching processing according to the fourth to sixth exemplary embodiments.

FIG. 27 is a flowchart illustrating an example of processing for switching the display language that is performed by the image forming apparatus 2200 according to the present exemplary embodiment. Each process illustrated in the flowchart of FIG. 27 is realized by the CPU 2001 of the image forming apparatus 2200 executing the control program stored in the ROM 2003 or the HDD 2004. In this example, the flowchart illustrated in FIG. 27 will be described assuming that the above-described switching processing is performed with the setting information illustrated in FIGS. 19A, 19B, 19C, and 19D being registered in the setting DB 2430.

In step S1600, the display operation control unit 2401 starts the processing in a state where an operation can be received from the liquid crystal display unit 2301.

In step S1601, the display operation control unit 2401 receives a login operation from a user via the login screen 2500.

In step S1602, the authentication control unit 2402 determines whether the login authentication has succeeded. If the authentication control unit 2402 determines that the authentication has succeeded (YES in step S1602), the processing proceeds to step S1603. If the authentication control unit 2402 determines that the authentication has failed (NO in step S1602), the processing returns to step S1601. The authentication method has been already described above, so the description thereof is omitted here.

In step S1603, the customization control unit 2450 determines whether to read the setting value in the image forming apparatus 2200 as the personal setting value. If the ON button 21201 (register the personal setting value) is selected on the customization setting screen 21200 (YES in step S1603), the processing proceeds to step S1604. On the other hand, if the OFF button 21202 (not register the personal setting value) is selected on the customization setting screen 21200 (NO in step S1603), the processing proceeds to step S1608.

In step S1604, the customization control unit 2450 determines whether to read the display language setting value as the personal setting value. If the customization setting item 21301a for "DISPLAY LANGUAGE" is set to ON (register the personal setting value) in the customization detailed setting screen 21300 for the personal settings (YES in step S1604), the processing proceeds to step S1605. On the other hand, if the item 21301a is set to OFF (not register the personal setting value) (NO in step S1604), the processing proceeds to step S1608.

In step S1605, the authentication control unit 2402 acquires the user identifier of the user who is currently in the login-state from the user information DB 2420, and issues the user identifier.

In step S1606, the setting value storage control unit 2403 determines whether there is any personal setting value registered as the setting value for the key "display language" in the setting DB 2430, targeting the username corresponding to the user identifier issued in step S1605. If the setting value storage control unit 2403 determines that there is the personal setting value (YES in step S1606), the processing proceeds to step S1607, in which the setting value storage control unit 2403 acquires the personal setting value from the setting DB 2430. On the other hand, if the setting value storage control unit 2403 determines that there is no personal setting value (NO in step S1606), the processing proceeds to step S1608, in which the setting value storage control unit 2403 acquires the common setting value from the setting DB 2430. Referring to the setting information illustrated in FIGS. 19A, 19B, 19C, and 19D by way of example, if the target is "User B", there is the personal setting value "Chinese" for the key "display language". Therefore, in step S1607, the setting value storage control unit 2403 acquires the setting value "display language— Chinese". On the other hand, if the target is "User C", no personal setting value is registered as a setting value for the key "display language". Therefore, in step S1608, the setting value storage control unit 2403 acquires "display language—English" that is the common setting value. Even in a case where the processing of step S1608 is performed after the processing of step S1603 or S1604 is performed, the setting value storage control unit 2403 acquires the common setting value from the setting DB 2430.

In step S1609, the customization control unit 2450 reflects the setting value of the display language setting information acquired in step S1607 or S1608 onto the operation unit 2012, thereby performing the processing for switching the display language.

In step S1610, the display operation control unit 2401 receives a logout instruction via the operation unit 2012. When the user presses a logout button displayed on the operation unit 2012 while the user is in the login state, the display operation control unit 2401 receives the logout instruction. Further, the display operation control unit 2401 may be configured to determine that the logout instruction is received if no operation is performed for a certain time period in the login state, and a predetermined timeout occurs.

In step S1611, the display operation control unit 2401 determines whether the logout has been completed. If the display operation control unit 2401 determines that the logout has been completed (YES in step S1611), the processing proceeds to step S1612. If the display operation control unit 2401 determines that the logout has not been completed yet (NO in step S1611), the processing returns to step S1610, in which the display operation control unit 2401 repeats the processing until completion of the logout.

In steps S1612 and S1613, processing for returning the display language setting value to the common setting value is performed, if the user's logout has been completed and the authentication state is the not-login state. Referring to the setting information illustrated in FIG. 19D by way of example, in step S1612, the setting value storage control unit 2403 acquires "English" that is the common setting value for the key "display language" for the target "common" from the setting DB 2430.

In step S1613, the customization control unit 2450 reflects the common setting value acquired in step S1612 onto the operation unit 2012, thereby performing the processing for switching the display language. In a case where the setting value changed by the user is registered as the common setting value in the above-described processing illustrated in FIG. 26, in step S1608 illustrated in FIG. 27, the setting value storage control unit 2403 reads the changed common setting value. Then, in step S1609, the customization control unit 2450 switches the display language to the display language according to the changed common setting value read in step S1608. In this case, the information processing apparatus 2200 may be configured in such a manner that the above-described user returns the changed common setting value to the common setting value before the change, after the logout has been completed. As a result, in step S1612, the setting value storage control unit 2403 reads the common setting value before the change. Therefore, in step S1613, the customization control unit 2450 can return the display language to the display language according to the common setting value before the change. Further, in a case where the image forming apparatus 2200 is configured in such a manner that a change history of the common setting information is stored in the setting DB 2430, the customization control unit 2450 may be configured to automatically return the display language to the display language according to the common setting value before the change, based on the stored change history.

In step S1614, the customization control unit 2450 ends the processing regarding the switching of the display language.

By the above-described processing, the image forming apparatus 2200 can switch which setting value should be reflected into the setting value of the setting item, the common setting value or the personal setting value. More specifically, the image forming apparatus 2200 can switch which setting value should be reflected, according to the authentication state of the user and whether the user is permitted to use the personal setting value.

In this manner, according to the present exemplary embodiment, the image forming apparatus 2200 can switch which setting value should be changed, the common setting value or the personal setting value, according to whether the user is permitted to use the personal setting value. This allows the user to change the setting of the common setting value to use the image forming apparatus 2200, even when the user cannot change the setting of the personal setting value. As a result, the image forming apparatus 2200 can prevent the general user from changing the setting value against the demand from the administrator or the like, while maintaining the convenience of the general user.

Fifth Exemplary Embodiment

In the fourth exemplary embodiment, the description has been given of the case in which all of the users change any of the personal setting value and the common setting value, focusing on the processing for changing the display language setting value by way of example. In the present exemplary embodiment, the description will be given of a method for permitting only a part of the users to change the common setting value in a case where the users cannot change the personal setting value, focusing on processing for changing the setting of the initial screen displayed after a login (hereinafter referred to as the initial screen) by way of example. For example, there is such an administrator's demand that the administrator wants to set a "management screen" as the initial screen to manage actual use records of the apparatus. Therefore, the administrator may want the general user not to change the setting of the initial screen. In the following description, processing performed by the image forming apparatus 2200 in such a situation will be described. In the fifth exemplary embodiment, a hardware configuration of a prerequisite apparatus is similar to the fourth exemplary embodiment. Similar features of the fifth exemplary embodiment to the fourth exemplary embodiment will not be described in detail below.

Figure 28:
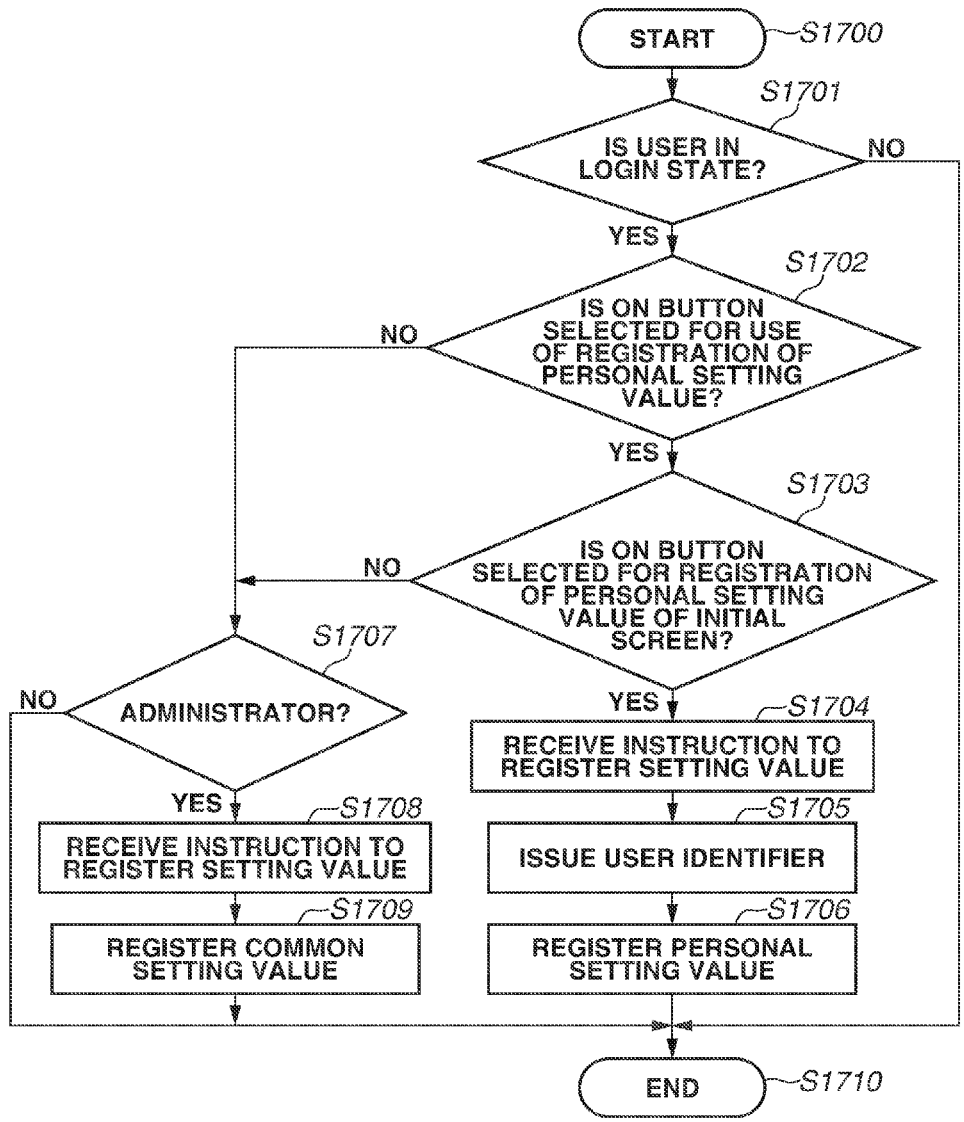
FIG. 28 is a flowchart illustrating an example of processing for registering an initial screen setting value according to the fourth to sixth exemplary embodiments.

FIG. 28 is a flowchart illustrating an example of processing for registering the setting value of the initial screen setting information that is performed by the image forming apparatus 2200 according to the present exemplary embodiment. Each process illustrated in the flowchart of FIG. 28 is realized by the CPU 2001 of the image forming apparatus 2200 executing the control program stored in the ROM 2003 or the HDD 2004.

In step S1700, the display operation control unit 2401 starts the processing in a state where a job setting can be received from the liquid crystal display unit 2301.

In step S1701, the authentication control unit 2402 determines whether a user is in the login state. The authentication method has been already described above, so the description thereof is omitted here. If the authentication control unit 2402 determines that the authentication state is the login state (YES in step S1701), the processing proceeds to step S1702. On the other hand, if the authentication control unit 2402 determines that the authentication state is the not-login state (NO in step S1701), the user mode control unit 2404 causes the "SCREEN TO BE DISPLAYED AFTER STARTUP/RECOVERY" button 2732 on the display setting change screen 2730 to be grayed out, thereby prohibiting the user from selecting this button. Then, the processing proceeds to step S1710 while omitting the processing for changing the setting of the initial screen, and the processing illustrated in FIG. 28 is ended.

Processing of step S1702 is similar to the processing of step S1503, so the description thereof is omitted here.

In step S1703, the customization control unit 2450 determines whether to register the initial screen setting value as the personal setting value. If the customization setting item 21301c for "INITIAL SCREEN AFTER LOGIN" is set to ON (register the personal setting value) in the customization detailed setting screen 21300 (YES in step S1703), the processing proceeds to step S1704. On the other hand, if the item 21301c is set to OFF (not register the personal setting value)(NO in step S1703), the processing proceeds to step S1707.

In step S1704, the display operation control unit 2401 receives an instruction to change the setting value regarding the initial screen setting information (a registration instruction) from the user. When the user presses the "SCREEN TO BE DISPLAYED AFTER STARTUP/RECOVERY" button 2732 on the display setting change screen 2730, the screen transitions to the initial screen setting change screen 2810. Then, the user selects an arbitrary initial screen from the initial screen selection list 2811 on the initial screen setting change screen 2810 and presses the OK button, whereby the display operation control unit 2401 receives the instruction to change the setting value (the registration instruction).

Processing of step S1705 is similar to the processing of step S1505, so the description thereof is omitted here.

In step S1706, the setting value storage control unit 2403 stores the setting value of the initial screen setting information received in step S1704 into the setting DB 2430 as the personal setting value of the initial screen setting information while associating the setting value with the user identifier issued in step S1705 (the processing for reflecting the setting value). The display operation control unit 2401 may be configured to display the message indicating that the setting of the personal setting value is changed, on the operation unit 2012 at this time.

In step S1707, the authentication control unit 2402 determines whether the user is the user having the administrator authority. If the authentication control unit 2402 determines that the user is the user having the administrator authority (YES in S1707), the processing proceeds to step S1708. On the other hand, if the authentication control unit 2402 determines that the user is a user not having the administrator authority (NO in step S1707), the "SCREEN TO BE DISPLAYED AFTER STARTUP/RECOVERY" button 2732 on the display setting change screen 2730 is grayed out, thereby prohibiting the user from selecting this button. Then, the processing proceeds to step S1710 while omitting the processing for changing the setting of the initial screen, and the processing illustrated in FIG. 28 is ended. This allows the image forming apparatus 2200 to set the customization restriction according to the user's authority. The administrator authority described here is an example of a predetermined user authority.

Processing of step S1708 is similar to the processing of step S1704, so the description thereof is omitted here.

In step S1709, the setting value storage control unit 2403 stores the setting value of the initial screen setting information for which the change instruction has been received in step S1708, into the setting DB 2430 as the common setting value (the processing for reflecting the setting value). The display operation control unit 2401 may be configured to display the message or the like indicating that the setting of the common setting value is changed, on the operation unit 2012 at this time.

In step S1710, the setting value storage control unit 2403 ends the processing regarding the registration of the setting value of the initial screen setting information.

By the above-described processing, the image forming apparatus 2200 can switch whether to register the setting value for which the change instruction is received, as the common setting value or the personal setting value. More specifically, the image forming apparatus 2200 can switch which setting value the changed setting value should be registered as, according to the user's authority and whether the user is permitted to use the personal setting value.

Figure 29:
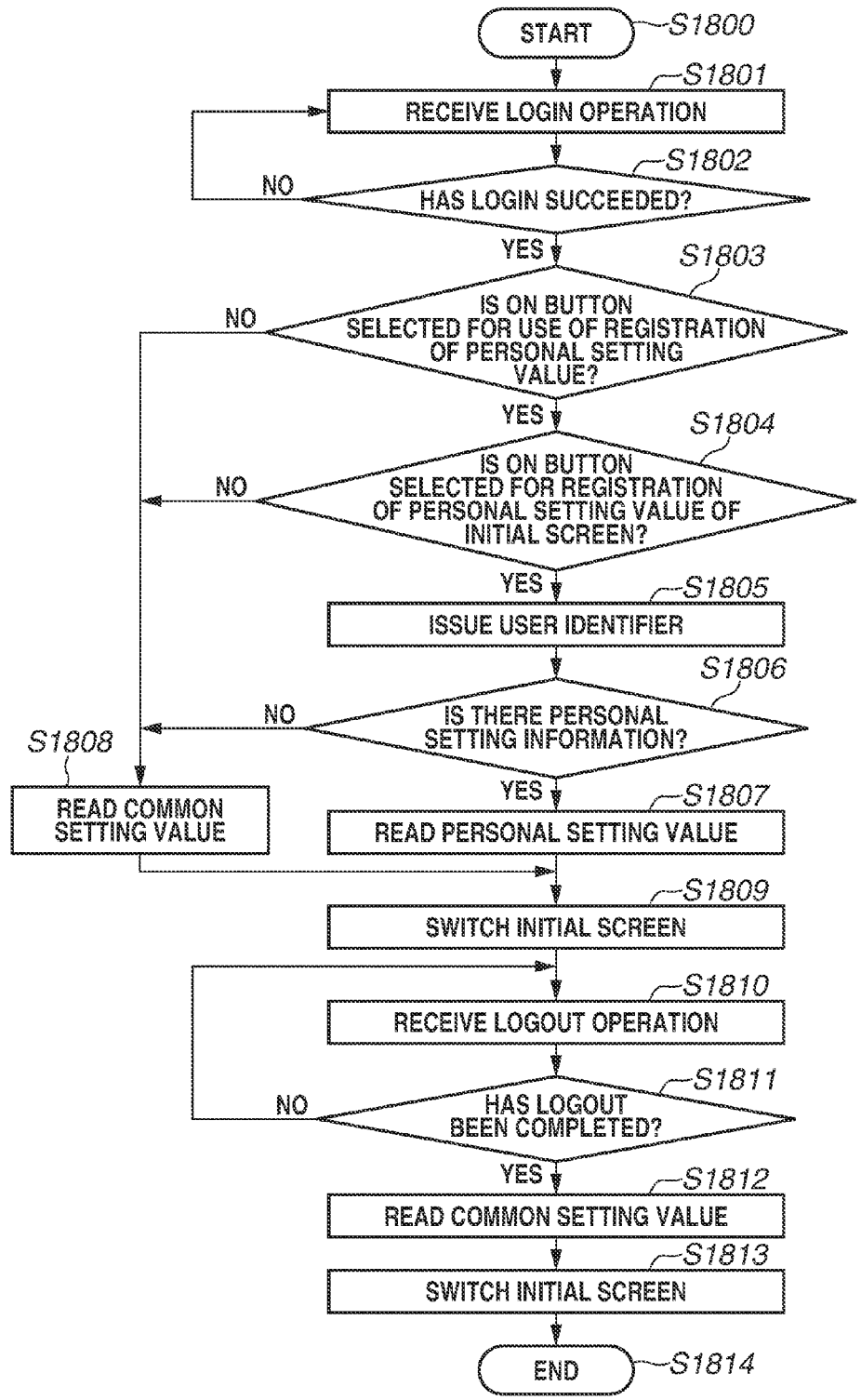
FIG. 29 is a flowchart illustrating an example of initial screen switching processing according to the fourth to sixth exemplary embodiments.

FIG. 29 is a flowchart illustrating an example of processing for switching the initial screen that is performed by the image forming apparatus 2200 according to the present exemplary embodiment. Each process illustrated in the flowchart of FIG. 29 is realized by the CPU 2001 of the image forming apparatus 2200 executing the control program stored in the ROM 2003 or the HDD 2004. In this example, the flowchart illustrated in FIG. 29 will be described assuming that the above-described switching processing is performed with the setting information illustrated in FIGS. 19A, 19B, 19C, and 19D being registered in the setting DB 2430.

Processing from steps S1800 to S1803 is similar to the processing from steps S1600 to S1603 illustrated in FIG. 27, so the description thereof is omitted here.

In step S1804, the customization control unit 2450 determines whether to read the setting value of the "initial screen" as the personal setting value. If the customization setting item 21301c for "INITIAL SCREEN AFTER LOGIN" is set to ON (register the personal setting value) in the customization detailed setting screen 21300 for the personal settings (YES in step S1804), the processing proceeds to step S1805. On the other hand, if the item 21301c is set to OFF (not register the personal setting value) (NO in step S1804), the processing proceeds to step S1808.

Processing of step S1805 is similar to the processing of step S1605, so the description thereof is omitted here.

In step S1806, the setting value storage control unit 2403 determines whether there is any personal setting value registered as the setting value for the key "initial screen" in the setting DB 2430, targeting the username corresponding to the user identifier issued in step S1805. If the setting value storage control unit 2403 determines that there is the personal setting value (YES in step S1806), the processing proceeds to step S1807, in which the setting value storage control unit 2403 acquires the personal setting value from the setting DB 2430. On the other hand, if the setting value storage control unit 2403 determines that there is no personal setting value (NO in step S1806), the processing proceeds to step S1808, in which the setting value storage control unit 2403 acquires the common setting value from the setting DB 2430. Referring to the setting information illustrated in FIGS. 19A, 19B, 19C, and 19D by way of example, if the target is "User A", there is the personal setting value "top menu" for the key "initial screen". Therefore, in step S1807, the setting value storage control unit 2403 acquires the setting value "initial screen—top menu". On the other hand, if the target is "User B", no personal setting value is registered for the key "initial screen". Therefore, in step S1808, the setting value storage control unit 2403 acquires "initial screen—copy" that is the common setting value. Even in a case where the processing of step S1808 is performed after the processing of step S1803 or S1804 is performed, the setting value storage control unit 2403 acquires the common setting value from the setting DB 2430.

In step S1809, the customization control unit 2450 reflects the setting value of the initial screen setting information acquired in step S1807 or S1808 onto the operation unit 2012, thereby performing the processing for switching the initial screen.

Processing of steps S1810 and S1811 is similar to the processing of steps S1610 and S1611, respectively, so the description thereof is omitted here.

In steps S1812 and S1813, processing for returning the setting value of the initial screen to the common setting value is performed, if the user's logout has been completed and the authentication state is the not-login state. Referring to the setting information illustrated in FIG. 19D by way of example, in step S1812, the setting value storage control unit 2403 acquires "copy" that is the common setting value for the key "initial screen" of the target "common" from the setting DB 2430. In step S1813, the customization control unit 2450 reflects the common setting value acquired in step S1812 onto the operation unit 2012, thereby performing the processing for switching the initial screen.

In step S1814, the customization control unit 2450 ends the processing regarding the switching of the initial screen.

By the above-described processing, the image forming apparatus 2200 can switch which setting value should be reflected to the setting value of the setting item, the common setting value or the personal setting value. More specifically, the image forming apparatus 2200 can switch which setting value should be reflected, according to the user's authority and whether the user is permitted to use the personal setting value.

In this manner, according to the present exemplary embodiment, the image forming apparatus 2200 can switch which setting value should be changed, the common setting value or the personal setting value, according to the user's authority and whether the user is permitted to use the personal setting value. Especially, taking the user's authority into consideration allows the image forming apparatus 2200 to set more detailed customization restriction, thereby further improving the convenience of both the administrator and the general user.

Sixth Exemplary Embodiment

In the fourth and fifth exemplary embodiments, the descriptions have been given of the cases in which the image forming apparatus 2200 changes the setting of the personal setting value or the common setting value for the setting item in the user mode. In the present exemplary embodiment, the description will be given of a case in which the image forming apparatus 2200 changes the setting of the personal setting value or the common setting value for a job setting in each function. In the following description, the present exemplary embodiment will be described based on an example in which the image forming apparatus 2200 changes the setting of the default job setting value for the copy function. In the sixth exemplary embodiment, a hardware configuration of a prerequisite apparatus is similar to the fourth and fifth exemplary embodiments. Similar features of the sixth exemplary embodiment to the fourth and fifth exemplary embodiments will not be described in detail below.

Figure 30:
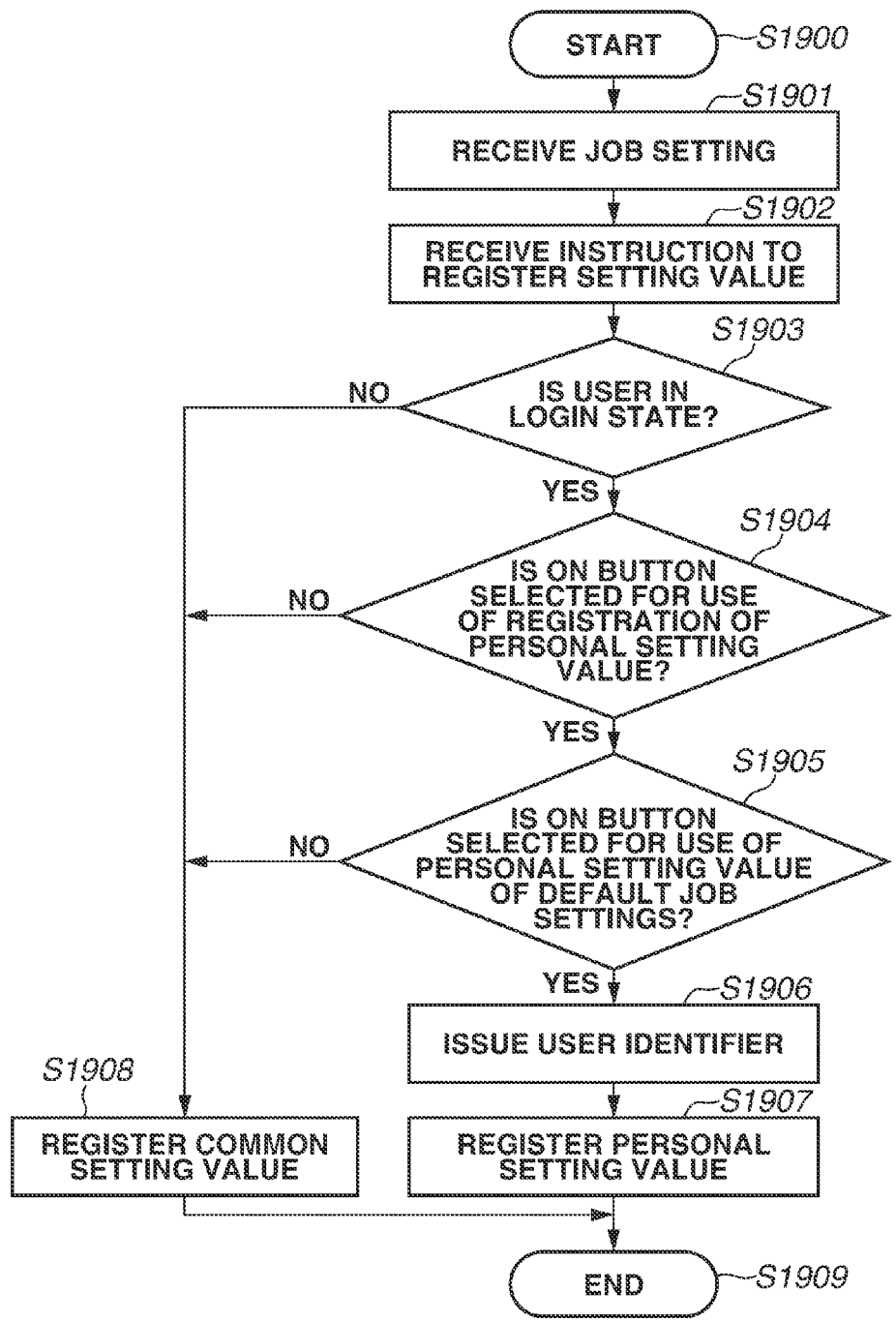
FIG. 30 is a flowchart illustrating an example of processing for registering a default job setting value according to the fourth to sixth exemplary embodiments.

FIG. 30 is a flowchart illustrating an example of processing for registering the default job setting value for the copy function that is performed by the image forming apparatus 2200 according to the present exemplary embodiment. Each process illustrated in the flowchart of FIG. 30 is realized by the CPU 2001 of the image forming apparatus 2200 executing the control program stored in the ROM 2003 or the HDD 2004.

In step S1900, the display operation control unit 2401 starts the processing in a state where a job setting can be received from the liquid crystal display unit 2301.

In step S1901, the display operation control unit 2401 receives an arbitrary job setting operation from a user via the copy job setting screen 2900 displayed on the liquid crystal display unit 2301 on the operation unit 2012. For example, suppose that the user inputs the setting "from one-sided to two-sided" and the setting "text" as the two-sided setting and the original type setting, respectively.

In step S1902, the display operation control unit 2401 receives from the user an instruction to register the setting value regarding the default job setting information. When the user presses the tool button 2901 on the copy job setting screen 2900, the default setting change screen 2910 is displayed. When the user presses the "REGISTER" button 2911, the setting change confirmation list screen 2920 is displayed. The default job setting value for the copy function that has been set by the user in step S1901 is displayed as a list in the setting change confirmation list 2921. If the user presses the "YES" button 2922 at this time, the display operation control unit 2401 receives processing for registering the default job setting value for the copy function.

Processing of step S1903 is similar to the processing of step S1502, so the description thereof is omitted here.

In step S1908, the setting value storage control unit 2403 stores the default job setting value of the default job setting information for which the registration instruction has been received in step S1902, into the setting DB 2430 as the common setting value (the processing for reflecting the setting value). The display operation control unit 2401 may be configured to display the message or the like indicating that the setting of the common setting value is changed, on the operation unit 2012 at this time.

Processing of step S1904 is similar to the processing of step S1503, so the description thereof is omitted here.

In step S1905, the customization control unit 2450 determines whether to register the default job setting value as the personal setting value. If the customization setting item 21301*d* for "CHANGE DEFAULT SETTINGS" is set to ON (register the personal setting value) in the customization detailed setting screen 21300 (YES in step S1905), the processing proceeds to step S1906. On the other hand, if the item 21301*d* is set to OFF (not register the personal setting value) (NO in step S1905), the processing proceeds to step S1908. The processing of step S1908 is as described above, so the description thereof is omitted here.

Processing of step S1906 is similar to the processing of step S1505, so the description thereof is omitted here.

In step S1907, the setting value storage control unit 2403 stores the setting value of the default job setting information for the copy function that has been received in step S1902, into the setting DB 2430 as the personal setting value of the default job setting information while associating the setting value with the user identifier issued in step S1906 (the processing for reflecting the setting value). The display operation control unit 2401 may be configured to display the message indicating that the setting of the personal setting value is changed, on the operation unit 2012 at this time.

In step S1909, the setting value storage control unit 2403 ends the processing regarding the registration of the default job setting value for the copy function.

By the above-described processing, the image forming apparatus 2200 can switch whether to register the setting value for which the change instruction is received, as the common setting value or the personal setting value, according to the login state of the user and whether the user is permitted to use the personal setting value. Further, the image forming apparatus 2200 can set the customization restriction while separately handling the items related to the display of the operation unit 2012 such as the display language, the accessibility, and the initial screen, and the items related to the job settings such as the default settings.

FIG. 31 is a flowchart illustrating an example of processing for switching the default job settings for the copy function that is performed by the image forming apparatus 2200 according to the present exemplary embodiment. Each process illustrated in the flowchart of FIG. 31 is realized by the CPU 2001 of the image forming apparatus 2200 executing the control program stored in the ROM 2003 or the HDD 2004. In this example, the flowchart illustrated in FIG. 31 will be described assuming that the above-described switching processing is performed with the setting information illustrated in FIGS. 19A, 19B, 19C, and 19D being registered in the setting DB 2430.

In step S2000, the display operation control unit 2401 starts the processing in a state where an operation can be received from the liquid crystal display unit 2301.

Processing from steps S2001 to S2003 is similar to the processing from steps S1601 to S1603, so the description thereof is omitted here.

In step S2004, the customization control unit 2450 determines whether to read the setting value of the "default settings" as the personal setting value. If the customization setting item 21301*d* for "CHANGE DEFAULT SETTINGS" is set to ON (register the personal setting value) in the customization detailed setting screen 21300 for the personal settings (YES in step S2004), the processing proceeds to step S2005. On the other hand, if the item 21301*d* is set to OFF (not register the personal setting value) (NO in step S2004), the processing proceeds to step S2008.

Processing of step S2005 is similar to the processing of step S1605, so the description thereof is omitted here.

In step S2006, the setting value storage control unit 2403 determines whether there is any personal setting value registered as the setting value for a key "default settings for copy" in the setting DB 2430, targeting the username corresponding to the user identifier issued in step S2005. If the setting value storage control unit 2403 determines that there is the personal setting value (YES in step S2006), the processing proceeds to step S2007, in which the setting value storage control unit 2403 acquires the personal setting value from the setting DB 2430. On the other hand, if the setting value storage control unit 2403 determines that there is no personal setting value (NO in step S2006), the processing proceeds to step S2008, in which the setting value storage control unit 2403 acquires the common setting value from the setting DB 2430. Referring to the setting information illustrated in FIGS. 19A, 19B, 19C, and 19D by way of example, if the target is "User A", there is the personal setting value "color: full color, and multiple-page layout: 2-in-1" for the key "default settings for copy". Therefore, in step S2007, the setting value storage control unit 2403 acquires the setting value "default settings for copy—color: full color, and multiple-page layout: 2-in-1". On the other hand, if the target is "User B", no personal setting value is registered for the key "default settings for copy". Therefore, in step S2008, the setting value storage control unit 2403 acquires "default settings for copy—two-sided: from book to two-sided, and finishing: group" that is the common setting value. Even in a case where the processing of step S2008 is performed after the processing of step S2003 or S2004 is performed, the setting value storage control unit 2403 acquires the common setting value from the setting DB 2430.

In step S2009, the customization control unit 2450 reflects the setting value of the default setting information for the copy function that has been acquired in step S2007 or step S2008, onto the operation unit 2012 at a timing when the copy job setting screen 2900 is displayed on the operation unit 2012. In this manner, the customization control unit 2450 performs the processing for switching the default settings.

Processing of steps S2010 and S2011 is similar to the processing of steps S1610 and S1611, respectively, so the description thereof is omitted here.

In steps S2012 and S2013, processing for returning the setting value of the "default settings for copy" to the common setting value is performed, if the user's logout has been completed and the authentication state is the not-login state. Referring to the setting information illustrated in FIG. 19D by way of example, in step S2012, the setting value storage control unit 2403 acquires "two-sided: from book to two-sided, and finishing: group" that is the common setting value for the key "default settings for copy" of the target "common" from the setting DB 2430.

In step S2013, the customization control unit 2450 reflects the common setting value acquired in step S2012, onto the operation unit 2012 at a timing when the copy job setting screen 2900 is displayed on the operation unit 2012.

In step S2014, the customization control unit 2450 ends the processing for switching the default settings.

By the above-described processing, the image forming apparatus 2200 can switch which setting value should be reflected to the setting value of the setting item, the common setting value or the personal setting value. More specifically, the image forming apparatus 2200 can switch which setting value should be reflected, according to whether the user is permitted to use the personal setting value, in particular, whether the user is permitted to use the personal setting value for the setting item related to the function.

In this manner, according to the present exemplary embodiment, the image forming apparatus 2200 can switch which setting value should be changed, the common setting value or the personal setting value, according to whether the user is permitted to use the personal setting value. Further, the image forming apparatus 2200 can set the customization restriction while separately handling the setting items in the function, which allows the image forming apparatus 2200 to set the more detailed customization restriction. As a result, the convenience of both the administrator and the general user can be further improved.

In the fourth to sixth exemplary embodiments, when registering the setting value and switching the display, the image forming apparatus 2200 determines whether the personal setting information can be registered, immediately before accessing the setting value in the setting DB 2430. Therefore, in a case where the image forming apparatus 2200 registers the personal setting value when registering the setting value, and after the registration, the customization setting is changed by the administrator so as to prohibit the registration of the personal setting value, the image forming apparatus 2200 may acquire, display, and reflect the common setting value when switching the display.

Further, in a case where the user is prohibited from changing the setting of the personal setting value, the user can change the setting of the common setting value. If the administrator wants to prohibit the user from changing the setting of the common setting value as well, the administrator may permit only a part of the users to change the setting of the common setting value in a similar manner to the fifth exemplary embodiment.

Further, even in a case where the general user temporarily changes the setting of the common setting value, if no operation is performed for a predetermined time period, for example, the image forming apparatus 2200 may return the common setting value to an initial value predetermined by the administrator.

In this manner, as the description has been given of the method used in the image forming apparatus 2200 including the customization function of enabling the user to freely set the initial setting value, for prohibiting the user from changing the setting as the personal setting value while permitting the user to change the setting as the common setting value, for the item prohibited from being customized. As a result, the image forming apparatus 2200 can prevent the general user from changing the setting against the demand from the administrator or the like. Further, even in a case where the image forming apparatus 2200 is set so as to prohibit the user from changing the personal setting value, the user can use the image forming apparatus 2200 by temporarily changing the common setting value, and therefore can operate the image forming apparatus 2200 under an environment desired by each user.

In this manner, according to the above-described fourth to sixth exemplary embodiments, it is possible to provide the technique for preventing the general user from changing the setting value against the demand from the administrator or the like while maintaining the convenience of the general user.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

According to the exemplary embodiments of the present invention, it becomes possible to appropriately determine an initial screen to be displayed when an information processing apparatus starts to be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2014-051884 filed Mar. 14, 2014, and No. 2014-105286 filed May 21, 2014, which are hereby incorporated by reference herein in their entirety.

REFERENCE SIGNS LIST

101 MFP
110 control unit
116 operation unit
120 scanner
201 authentication management unit
204 setting information storage unit
2200 image forming apparatus

The invention claimed is:

1. An information processing apparatus comprising:
one or more processors;
memory storing instructions that, when executed by the one or more processors, cause the information processing apparatus to perform operations including:
setting, as a first setting, a common initial screen that is made common to each user of the information processing apparatus based on an operation performed by an administrator user having an administrator authority,
setting, as a second setting, a user initial screen that is made specific to each user of the information processing apparatus based on an operation performed by each user, and
setting, as a third setting and based on an operation performed by the administrator user having the administrator authority, whether to display the user initial screen for each user; and
a display configured to display a screen,
wherein, in a case where it is set by the third setting that the user initial screen for each user is to be displayed and the information processing apparatus starts to be used, the display displays the user initial screen set by the second setting, and wherein, in a case where it is set by the third setting that the user initial screen for each user is not to be displayed and the information processing apparatus starts to be used, the display displays the common initial screen set by the first setting even in a case where priority is placed on the user initial screen by a user for the user.

2. The information processing apparatus according to claim 1, wherein the second setting performs a customization setting for each user that includes a setting of an initial screen.

3. The information processing apparatus according to claim 1, wherein the first setting and the second setting each set, as the initial screen, a screen corresponding to a function specified as an initial function to be activated in a case where the information processing apparatus starts to be used.

4. The information processing apparatus according to claim 1, wherein, in a case where the initial screen is not set by the second setting, the display is configured to display the common initial screen set by the first setting even if it is set by the third setting that the user initial screen for each user is to be displayed.

5. The information processing apparatus according to claim 1, further comprising a receiver configured to receive an input of authentication information from a user,
wherein, when executed by the one or more processors, the stored instructions further cause the information processing apparatus to perform operations including:
authenticating, as a first authentication in a case where the information processing apparatus starts to be used by the user, the user based on the authentication information received by the receiver, and
authenticating, as a second authentication in a case where a function is selected by the user, the user based on the authentication information received by the receiver,
wherein, in a case where the first authentication authenticates a user and the user is successfully authenticated by the first authentication, the display is configured to display an initial screen based on the third setting, and
wherein, in a case where the second authentication authenticates a user and the user is successfully authenticated by the second authentication, the display is configured to display an operation screen corresponding to a function selected by the authenticated user without displaying the initial screen based on the third setting.

6. The information processing apparatus according to claim 1, wherein the common initial screen includes a setting screen related to a print function, a setting screen related to a copy function, a setting screen related to a transmission function, and a main menu screen for selecting a function included in the information processing apparatus.

7. The information processing apparatus according to claim 1, wherein the user initial screen is made specific to a user of the information processing apparatus based on an operation performed by a user not having administrator authority.

8. An information processing apparatus comprising:
one or more processors;
memory storing instructions that, when executed by the one or more processors, cause the information processing apparatus to perform operations including:
setting, as a first setting, a common initial screen that is made common to each user of the information processing apparatus based on an operation performed by an administrator user having an administrator authority,
setting, as a second setting, a user initial screen that is made specific to each user of the information processing apparatus based on an operation performed by each user, and
setting, as a third setting and based on an operation performed by the administrator user having the administrator authority, whether to prioritize for display the common initial screen or the user initial screen; and
a display configured to display, in a case where the information processing apparatus starts to be used, an initial screen based on a content set by the third setting unit.

9. The information processing apparatus according to claim 8, wherein the second setting performs a customization setting for each user that includes a setting of an initial screen.

10. The information processing apparatus according to claim 8, wherein the first setting and the second setting each set, as the initial screen, a screen corresponding to a function specified as an initial function to be activated in a case where the information processing apparatus starts to be used.

11. The information processing apparatus according to claim 8, wherein, in a case where the initial screen is not set by the second setting, the display is configured to display the common initial screen set by the first setting even if it is set by the third setting that the user initial screen for each user is to be displayed.

12. The information processing apparatus according to claim 8, wherein, in a case where an initial screen is set by neither the first setting nor the second setting, the display is configured to display a main menu screen for selecting a function included in the information processing apparatus.

13. The information processing apparatus according to claim 8, further comprising a receiver configured to receive an input of authentication information from a user,
wherein, when executed by the one or more processors, the stored instructions further cause the information processing apparatus to perform operations including:
authenticating, as a first authentication in a case where the information processing apparatus starts to be used by the user, the user based on the authentication information received by the receiver, and
authenticating, as a second authentication in a case where a function is selected by the user, the user based on the authentication information received by the receiver,
wherein, in a case where the first authentication authenticates a user and the user is successfully authenticated by the first authentication, the display is configured to display an initial screen based on the third setting, and
wherein, in a case where the second authentication authenticates a user and the user is successfully authenticated by the second authentication, the display is configured to display an operation screen corresponding to a function selected by the authenticated user without displaying the initial screen based on the third setting.

14. The information processing apparatus according to claim 8, wherein, in a case where it is set by the third setting that the common initial screen set by the first setting is to be preferentially displayed, the display is configured to display the common initial screen set by the first setting and, after execution of a function corresponding to the common initial screen set by the first setting is completed, display the user initial screen set by the second setting.

15. The information processing apparatus according to claim 14, wherein, while the function corresponding to the common initial screen set by the first setting is being executed and in a case where an instruction to display a screen that does not correspond to the function is received from a user, the display is configured to display an operation screen corresponding to the instruction without displaying the user initial screen set by the second setting.

16. The information processing apparatus according to claim 8, wherein the common initial screen includes a setting screen related to a print function, a setting screen related to a copy function, a setting screen related to a transmission function, and a main menu screen for selecting a function included in the information processing apparatus.

17. An information processing apparatus comprising:
one or more processors;
memory storing instructions that, when executed by the one or more processors, cause the information processing apparatus to perform operations including:
acquiring identification information of a user who has logged in to the information processing apparatus,
managing the identification information of the user and identification information of a group to which the user belongs, in association with each other,
setting, as a first setting, a common initial screen that is made common to each user of the information processing apparatus based on an operation performed by an administrator user having an administrator authority,
setting, as a second setting, a user initial screen that is made specific to each user of the information processing apparatus based on an operation performed by each user setting, as a second setting, a user initial screen that is made specific to each user of the information processing apparatus based on an operation performed by each user,
setting, as a third setting, a group initial screen for each group based on an operation performed by the administrator user having the administrator authority,
setting, as a fourth, a display order of a plurality of initial screens set by the first, second, and third settings, based on an operation performed by the administrator user having the administrator authority; and
a display configured to display an initial screen based on the order set by the fourth setting, in a case where the information processing apparatus starts to be used and, after execution of a function corresponding to the displayed initial screen is completed, further display an initial screen based on the order.

18. The information processing apparatus according to claim 17, further comprising a receiver configured to receive an input of authentication information from a user,
wherein, in a case where the user is authenticated based on the authentication information received by the receiver in a case where the information processing apparatus starts to be used, the display is configured to display the initial screen based on the order set by the fourth setting unit, and
wherein, in a case where the user is authenticated based on the authentication information received by the receiver in a case where a function is selected by the user, the display is configured to display an operation screen corresponding to the function selected by the authenticated user, without displaying the initial screen based on the fourth setting unit.

19. A method for controlling an information processing apparatus, the method comprising:

setting, as a first setting, a common initial screen that is made common to each user of the information processing apparatus based on an operation performed by an administrator user having an administrator authority,
setting, as a second setting, a user initial screen that is made specific to each user of the information processing apparatus based on an operation performed by each user, and
setting, as a third setting and based on an operation performed by the administrator user having the administrator authority, whether to display the user initial screen for each user; and
displaying, in a case where it is set by the third setting that the user initial screen for each user is to be displayed and the information processing apparatus starts to be used, the user initial screen set by the second setting, and
displaying, in a case where it is set by the third setting that the user initial screen for each user is not to be displayed and the information processing apparatus starts to be used, the common initial screen set by the first setting even in a case where priority is placed on the user initial screen by a user for the user.

20. A non-transitory computer-readable storage medium storing a program causing a computer to execute the method for controlling an information processing apparatus according to claim 19.

21. A method for controlling an information processing apparatus, the method comprising:
setting, as a first setting, a common initial screen that is made common to each user of the information processing apparatus based on an operation performed by an administrator user having an administrator authority;
setting, as a second setting, a user initial screen that is made specific to each user of the information processing apparatus based on an operation performed by each user;
setting, as a third setting and based on an operation performed by the administrator user having the administrator authority, whether to prioritize for display the common initial screen or the user initial screen; and
displaying, in a case where the information processing apparatus starts to be used, an initial screen based on a content set by the third setting.

22. A non-transitory computer-readable storage medium storing a program causing a computer to execute the method for controlling an information processing apparatus according to claim 21.

23. A method for controlling an information processing apparatus, the method comprising:
acquiring identification information of a user who has logged in to the information processing apparatus;
managing the identification information of the user and identification information of a group to which the user belongs, in association with each other;
setting, as a first setting, a common initial screen that is made common to each user of the information processing apparatus based on an operation performed by an administrator user having an administrator authority;
setting, as a second setting, a user initial screen that is made specific to each user of the information processing apparatus based on an operation performed by each user; setting, as a second setting, a user initial screen that is made specific to each user of the information processing apparatus based on an operation performed by each user;

setting, as a third setting, a group initial screen for each group based on an operation performed by the administrator user having the administrator authority;

setting, as a fourth setting, a display order of a plurality of initial screens set by the first, second, and third settings, based on an operation performed by the administrator user having the administrator authority; and displaying an initial screen based on the order set by the fourth setting, in a case where the information processing apparatus starts to be used and, after execution of a function corresponding to the displayed initial screen is completed, further display an initial screen based on the order.

24. A non-transitory computer-readable storage medium storing a program causing a computer to execute the method for controlling an information processing apparatus according to claim 23.

* * * * *